[12] United States Patent
Ohta et al.

(10) Patent No.: US 7,539,306 B2
(45) Date of Patent: May 26, 2009

(54) KEY DELIVERY APPARATUS, TERMINAL APPARATUS, RECORDING MEDIUM, AND KEY DELIVERY SYSTEM

(75) Inventors: Yuusaku Ohta, Neyagawa (JP); Hiroki Yamauchi, Ibaraki (JP); Masaya Miyazaki, Ikeda (JP); Natsume Matsuzaki, Mino (JP); Toshihisa Abe, Izumisano (JP)

(73) Assignee: Panasonic Corporation, Osaka (JP)

( * ) Notice: Subject to any disclaimer, the term of this patent is extended or adjusted under 35 U.S.C. 154(b) by 854 days.

(21) Appl. No.: 10/649,623

(22) Filed: Aug. 28, 2003

(65) Prior Publication Data
US 2004/0078066 A1 Apr. 22, 2004

(30) Foreign Application Priority Data
Aug. 28, 2002 (JP) ............................. 2002-249242

(51) Int. Cl.
*H04N 7/167* (2006.01)
(52) U.S. Cl. ..................... 380/201; 380/277; 380/231; 380/232; 713/171; 705/51; 707/10
(58) Field of Classification Search ................. 380/201, 380/231, 277, 232, 281
See application file for complete search history.

(56) References Cited
U.S. PATENT DOCUMENTS 4,866,707 A * 9/1989 Marshall et al. ............. 714/749
6,351,813 B1 * 2/2002 Mooney et al. ............. 713/185
6,587,837 B1 * 7/2003 Spagna et al. ................ 705/26
7,137,025 B2 * 11/2006 Ito et al. ...................... 713/600
2002/0120579 A1 * 8/2002 Kawaguchi et al. ........... 705/59

(Continued)

FOREIGN PATENT DOCUMENTS
EP 1 018 733 7/2000

(Continued)

OTHER PUBLICATIONS

"*IBM Response to DVB-CPT Call for Proposals for Content Protection & Copy Management: XCP Cluster Protocol*" IBM Response to DVB-CPT Call for Proposals for Content Protection & Copy Management: XCP Cluster Protocal, Oct. 19, 2001, XP001148193, pp. 6-9.

(Continued)

*Primary Examiner*—Nasser G Moazzami
*Assistant Examiner*—Fikremariam Yalew
(74) *Attorney, Agent, or Firm*—Wenderoth, Lind & Ponack, L.L.P.

(57) ABSTRACT

A key delivery apparatus that prevents improper use of contents, and manages a decryption key for decrypting encrypted content and a suppliable number showing how many times the decryption key is suppliable, with respect to one or more terminal apparatuses connected to a network. The key delivery apparatus receives a supply request for the decryption key from a terminal apparatus, and if the terminal apparatus is a legitimate supply target, judges whether the terminal apparatus is a first-type that manages a content-usage period or a second-type that does not manage the content-usage period, and if the suppliable number has a remaining number, supplies to the terminal apparatus, the decryption key and a key-usage period of the decryption key when judged that the terminal apparatus is the first-type and the decryption key when judged that the terminal apparatus is the second-type.

14 Claims, 52 Drawing Sheets

U.S. PATENT DOCUMENTS

| | | | |
|---|---|---|---|
| 2003/0076955 A1* | 4/2003 | Alve et al. | 380/201 |
| 2004/0028228 A1* | 2/2004 | Hamada et al. | 380/201 |
| 2004/0228487 A1* | 11/2004 | Maeda et al. | 380/232 |

FOREIGN PATENT DOCUMENTS

| | | |
|---|---|---|
| EP | 1 061 514 A2 | 12/2000 |
| EP | 1 081 616 | 3/2001 |
| JP | 2000-357213 | 12/2000 |

OTHER PUBLICATIONS

"Content Protection for Recordable Media Specification: SD Memory Card Book, Revision 0.95", Content Protection for Recordable Media Specification: SD Memory Card Book, Revision 0.95, May 28, 2001, XP002226117, pp. 5-11 and pp. 26-27.

"Call for Proposals for Content Protection & Copy Management Technologies", Call for Proposals for Content Protection & Copy Management Technologies, Jul. 5, 2001, XP002230687, pp. 4-6.

"5C Digital Transmission Content Protection White Paper", 5C Digital Transmission Content Protection White Paper, Jul. 14, 1998, XP002213172.

"SDMI Secure Digital Music Initiative", SDMI Portable Device Specification Version 1.0, XX, XX, No. Part 1, Jul. 8, 1999, pp. 1-35, XP 000997330.

* cited by examiner

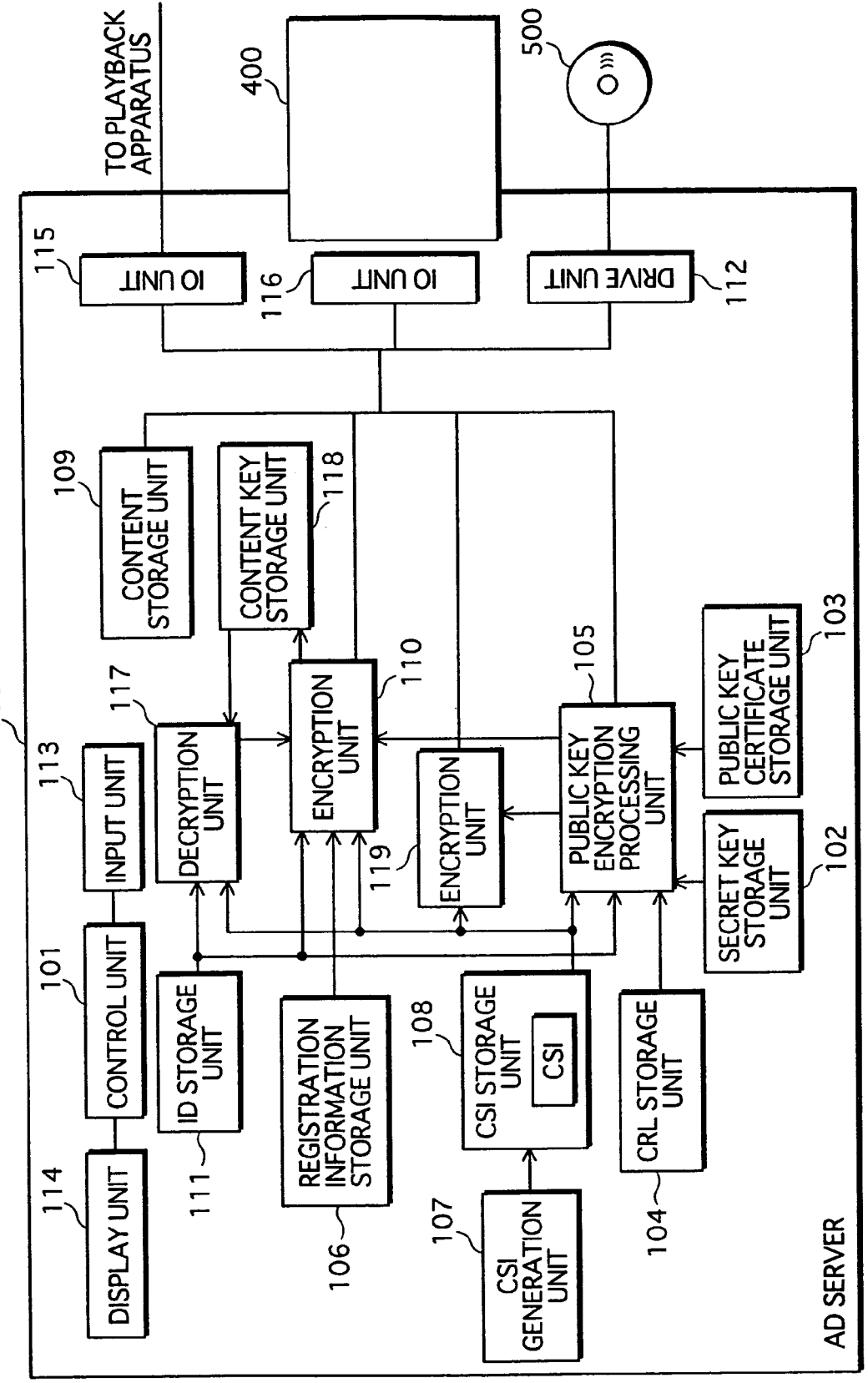

FIG.3A

| REGISTRATION INFORMATION ||
|---|---|
| DEVICE ID | |
| | |
| MAXIMUM | 2 |
| REGISTERED | 0 |
| REMAINING | 2 |
| IC CARD ID | ID_4 |

FIG.3B

| REGISTRATION INFORMATION ||
|---|---|
| DEVICE ID | ID_2 |
| | ID_3 |
| MAXIMUM | 2 |
| REGISTERED | 2 |
| REMAINING | 0 |
| IC CARD ID | ID_4 |

ON-VEHICLE REGISTRATION (2)

FIG.18

| INFORMATION ID | ENCRYPTED CONTENT |
|---|---|
| "C1" | "CNT1" |
| "C2" | "CNT2" |
| "C3" | "CNT3" |
| ... | ... |

| CONTENT KEY ID | CONTENT KEY | CORRESPONDING-INFORMATION ID | TOTAL NO. | REMAINING NO. | TIME PERIOD RESTRICTION |
|---|---|---|---|---|---|
| 1 | CK1 | C1 | 5 | 4 | 24 HRS |
| 2 | CK2 | C2 | 5 | 3 | 24 HRS |
| 3 | CK3 | C3 | 5 | 5 | 24 HRS |
| ... | ... | ... | ... | ... | ... |

T1001

FIG.30
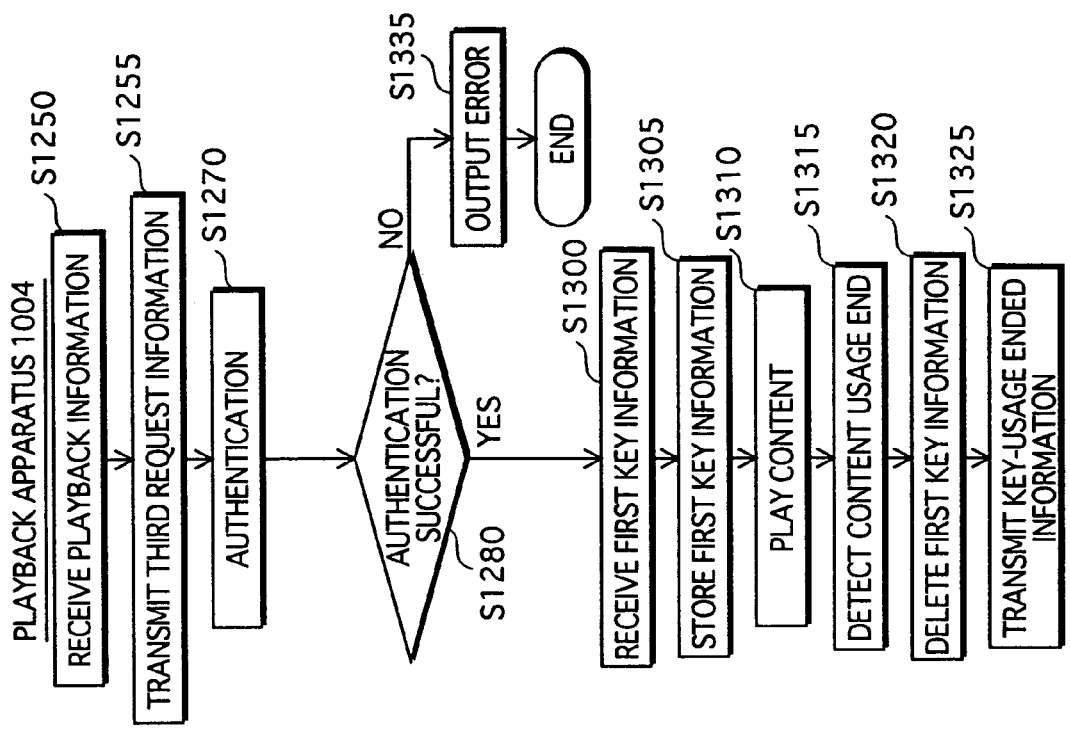
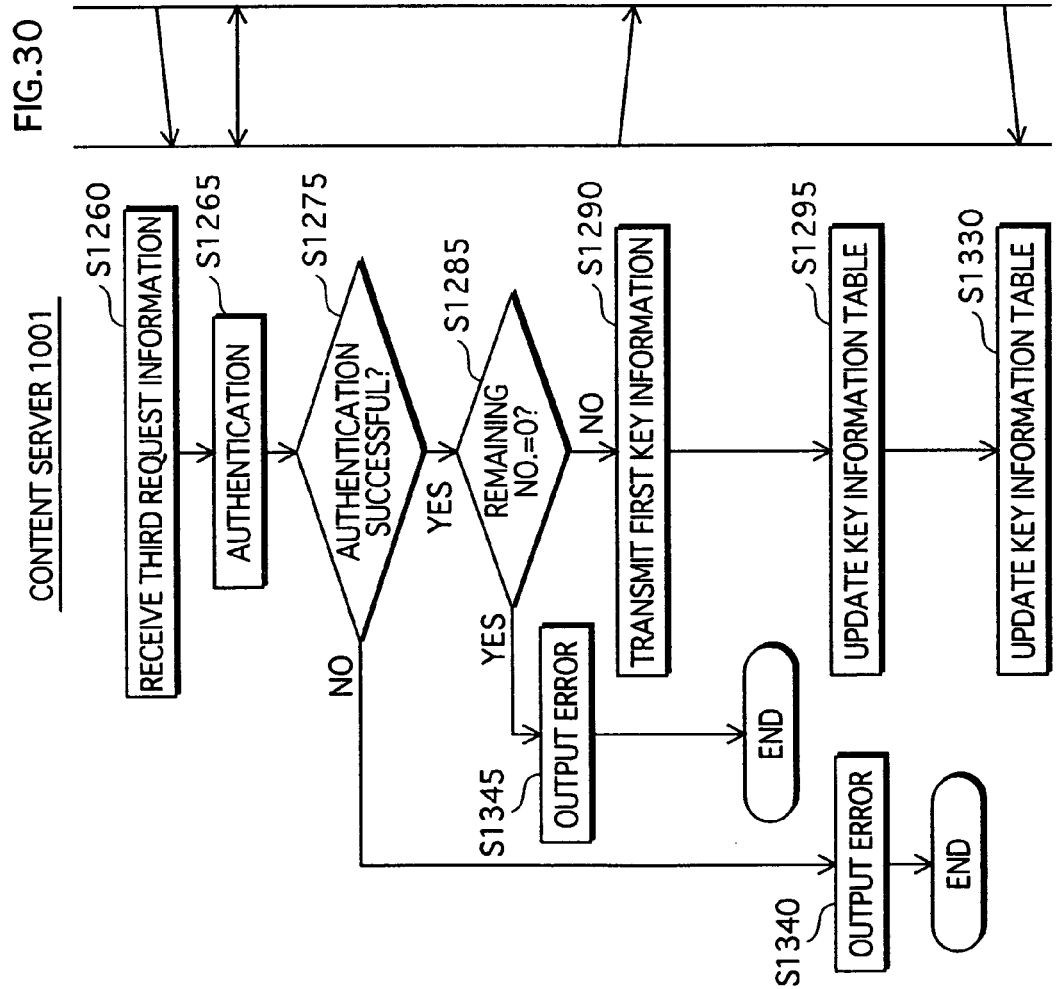

KEY DELIVERY APPARATUS, TERMINAL APPARATUS, RECORDING MEDIUM, AND KEY DELIVERY SYSTEM

This application is based on an application No. 2002-249242 filed in Japan, the content of which is hereby incorporated by reference.

BACKGROUND OF THE INVENTION

1. Field of the Invention

The present invention relates to technology for delivering keys used in decrypting encrypted contents.

2. Related Art

In recent years, copyright protection of digitalized content such as movies, music, game computer programs and so forth has been sought, and the management of the digitalized content has become an important issue.

Unexamined Japanese patent application 2000-357213 discloses technology effective in content management that aims to protect copyright by regulating the number of duplications of a content. With this method, a recording apparatus that is to duplicate a content onto a recording medium while regulating the number of duplications of the content that can be recorded onto the recording medium, conducts mutual authentication with the recording medium, and if authentication is successful, the recording apparatus manages content usage by duplicating the content to the recording medium or deleting the content.

However, with the above method, although the recording apparatus continually manages the use of contents duplicated to an apparatus connected to a network, the management of the contents duplicated to a recording medium is only possible when connected to the recording medium. For this reason, the possibility exists, for example, of the contents duplicated to a recording medium being improperly used by a third party.

SUMMARY OF THE INVENTION

In order to resolve the above issue, the present invention aims to provide a key delivery apparatus, a terminal apparatus, a recording medium, a key delivery system, a key delivery method and a computer program that prevent the improper use of digitalized contents.

The present invention is a key delivery apparatus that manages a decryption key for decrypting an encrypted content and a suppliable number showing how many times the decryption key is suppliable, with respect to a terminal apparatus connected to a network. The key delivery apparatus includes a receiving unit operable to receive, from the terminal apparatus, a supply request for the decryption key, and includes a supply judging unit operable, if the terminal apparatus is a legitimate supply target, to judge whether the terminal apparatus is one of a first-type terminal apparatus that manages a content-usage period and a second-type terminal apparatus that does not manage the content-usage period. The key delivery apparatus includes a key supply unit operable, if the suppliable number has a remaining number, to supply to the terminal apparatus, the decryption key and a key-usage period of the decryption key when it is judged that the terminal apparatus is the first-type terminal apparatus, and the decryption key when judged that the terminal apparatus is the second-type terminal apparatus. Furthermore, the supply judging unit judges the terminal apparatus to be the first-type terminal apparatus if the terminal apparatus records the encrypted content, the decryption key, and the key-usage period onto a portable recording medium.

According to this structure, if the terminal apparatus is a legitimate supply target of a decryption key, the key delivery apparatus judges whether the terminal apparatus is a first-type or a second-type terminal apparatus, and supplies the decryption key with a key-usage period appended when judged to be the first-type, and supplies the decryption key when judged to be the second-type. Since the decryption key is supplied to a first-type terminal apparatus with a key-usage period appended, a first-type terminal apparatus is able to manage content usage by using the supplied key-usage period and decryption key, thus enabling improper content usage to be prevented.

Here, the network may be a home network connected to an external network, contents may be received from outside the home network, and the key delivery apparatus may judge terminal apparatuses connected to the home network to be legitimate supply targets.

According to this structure, the key delivery apparatus judges terminal apparatuses connected to the home network to be legitimate supply targets, and it is thus possible to supply the decryption key to such apparatuses.

Here, the key delivery apparatus may further include a key-information storage unit operable to store the key-usage period subsequent to supply of the decryption key and the key-usage period to the first-type terminal apparatus. The key delivery apparatus may also include a period judging unit operable to judge whether the key-usage period has expired, and include a time management unit operable to add "1" to the suppliable number when it is judged that the key-usage period has expired.

According to this structure, the suppliable number can be managed by managing a key-usage period of a decryption key supplied to a first-type terminal apparatus.

Here, the key delivery apparatus may further include a date-time storage unit operable to store at least one of a first grouping and a second grouping. The first grouping formed from date-time information showing the key-usage period and a supply date-time of the decryption key, and identification information showing the supply target to be the first-type terminal apparatus. The second grouping formed from date-time information showing a supply date-time of the decryption key, and identification information showing the supply target to be the second-type terminal apparatus. The key delivery apparatus may also include a date-time judging unit operable to judge whether a present date-time has reached the supply date-time, and include a date-time supply unit operable, when judged that the present date-time has reached the supply date-time, to supply the decryption key and the key-usage period to the first-type terminal apparatus or the decryption key to the second-type terminal apparatus, based on the identification information.

According to this structure, it is possible to supply a decryption key when a supply date-time stored in the supply date-time storage unit is reached.

Here, the key delivery apparatus may further include a search requesting unit operable to notify, to the first-type terminal apparatus and the second-type terminal apparatus, search information showing the decryption key. The key delivery apparatus may also include a proprietary information receiving unit operable to receive information indicating that the decryption key is being held, from whichever of the first-type terminal apparatus and the second-type terminal apparatus holds the decryption key.

According to this structure, the key delivery apparatus is able to search for a decryption key supply target by transmitting key search information to first-type and second-type apparatuses and receiving information indicating possession of the decryption key.

Here, the key delivery apparatus may store secret information used as a reference in judging whether the terminal apparatus is a legitimate supply target. Further, the supply judging unit may include an authentication subunit operable to judge whether the terminal apparatus holds the secret information. In addition, the supply judging unit may judge the terminal apparatus to be a legitimate supply target when judged that the terminal apparatus holds the secret information.

According to this structure, judgment of whether a terminal apparatus is a legitimate supply target is possible using secret information.

Here, the key supply unit may include a remaining number judging subunit operable to judge whether the suppliable number is greater than a predetermined reference number. Further, the key supply unit may judge the suppliable number to have the remaining number when judged that the suppliable number is greater than the predetermined reference number.

According to this structure, judging whether there is a remaining number is possible using the suppliable number and a reference value.

Here, the key supply unit may further include an encryption subunit operable to encrypt the decryption key and the key-usage period when the decryption key and the key-usage period are to be supplied to the first-type terminal apparatus, and operable to encrypt the decryption key when the decryption key is to be supplied to the second-type terminal apparatus. Further, the key supply unit, when judged that the suppliable number has the remaining number, may supply to the terminal apparatus, (i) the encrypted decryption key and the encrypted key-usage period when judged that the terminal apparatus is the first-type terminal apparatus and (ii) the encrypted decryption key when judged that the terminal apparatus is the second-type terminal apparatus.

According to this structure, it is possible to supply decryption keys safely by encrypting and then supplying them.

Here, the key delivery apparatus may further include a historical information storage unit operable to store historical information showing a connection date-time of the first-type terminal apparatus. The key delivery apparatus may also include a connection judging unit operable to judge, using the connection date-time, whether the first-type terminal apparatus was connected within a predetermined connection period, and include a connection management unit operable to add "1" to the suppliable number when judged that the first-type terminal apparatus was not connected within the connection period.

According to this structure, management of a suppliable number is possible by judging whether a first-type terminal apparatus that stores a decryption key was connected to a key delivery apparatus within a predetermined period.

Here, the key delivery apparatus may further include a frequency storage unit operable to store a usage frequency of the decryption key by the first-type terminal apparatus. The key delivery apparatus may also include a frequency judging unit operable to judge whether the usage frequency has reached a predetermined reference frequency, and include a connection management unit operable to add "1" to the suppliable number when judged that the usage frequency has reached the reference frequency.

According to this structure, management of a suppliable number is possible by judging whether the number of times a decryption key supplied to a first-type terminal apparatus has been used, has reached a predetermined reference frequency.

The present invention is a recording medium that receives supply of a decryption key for decrypting an encrypted content from a key delivery apparatus that manages the decryption key, the recording medium including: a key reception unit operable to receive the decryption key and a key-usage period of the decryption key from the key delivery apparatus, when judged in the key delivery apparatus that supply of the decryption key is possible, and a key-information storage unit operable to store the decryption key and the key-usage period.

According to this structure, it is possible for a recording medium to receive a decryption key having a key-usage period appended, and store the received decryption key and key-usage period.

Here, the recording medium may further include a period judging unit operable to judge whether the key-usage period has expired; and a deletion unit operable to delete the decryption key and the key-usage period when judged that the key-usage period has expired.

According to this structure, a stored decryption key and key-usage period are deleted when the key-usage period lapses. As a result, it is possible to prevent the use of decryption keys whose key-usage period has lapsed.

BRIEF DESCRIPTION OF THE DRAWINGS

These and other objects, advantages and features of the invention will become apparent from the following description thereof taken in conjunction with the accompanying drawings that illustrate specific embodiments of the present invention.

In the drawings:

FIG. 2 is a block diagram showing a structure of an AD server 100;

FIGS. 3A/3B shows a structure of registration information;

FIG. 8 is a flowchart showing SAC establishment processing (cont. from FIG. 7);

FIG. 18 is block diagram showing a structure of a content storage unit 1011;

FIG. 20 shows a data structure of a key information table T1001 included in a key-information storage unit 1031;

FIG. 27 is a flowchart showing content key management processing (cont. from FIG. 28);

FIG. 30 is a flowchart showing operations at a playback time in playback apparatus 1004;

FIG. 44 is a flowchart showing mutual device authentication and key sharing operations conducted between a delivery apparatus and a request apparatus (cont. from FIG. 43);

DETAILED DESCRIPTION OF THE INVENTION

An embodiment of the present invention will now be described in detail with reference to the drawings.

1. Structure of Group Formation/Management System

Figure 1:
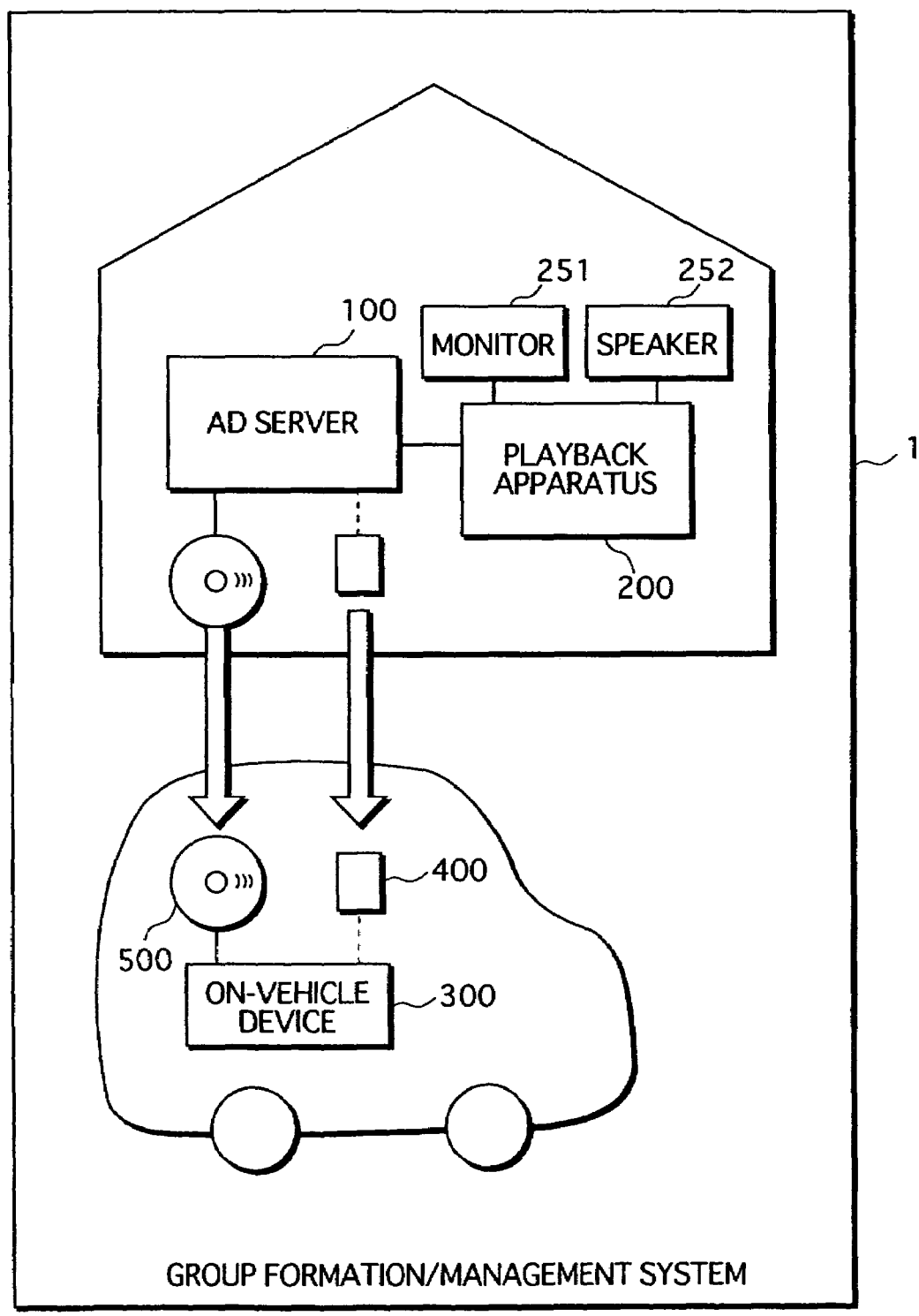
FIG. 1 is a block diagram showing an overall structure of a group formation/management system 1.

As shown in FIG. 1, a group formation/management system 1 is structured from an authorized domain (AD) server 100, a playback apparatus 200, an on-vehicle device 300, an IC card 400, and a DVD 500.

AD server 100 and playback apparatus 200, which is connected to a monitor 251 and a speaker 252, are disposed in a user's home and are connected online. On-vehicle device 300 is mounted in a vehicle owned by the user. IC card 400 and DVD 500 are connectable to AD server 100 and on-vehicle device 300. IC card 400 is affiliated with AD server 100, and AD server 100 only operates when IC card 400 is connected thereto.

Group formation/management system 1 is a system in which AD server 100 manages an authorized domain (AD), being a range within which content usage is permitted.

AD server 100 receives and manages the registration of client devices, and AD server 100 and registered client devices share common secret information (CSI) generated by AD server 100. Mutual authentication using shared CSI is conducted among devices within the same authorized domain, and when authorization is successful, transmission/reception, copying and the like of contents is conducted among these devices. Because the CSI differs between authorized domains, devices not holding the CSI of the authorized domain managed by AD server 100 cannot transmit/receive or copy contents available within the authorized domain of AD server 100.

Playback apparatus 200 is connected to AD server 100 and is thus able to conduct authentication and to register as a client device. Also, on-vehicle device 300, although not connected to AD server 100, is able to register as a client device by having CSI stored on IC card 400 and notifying the CSI from IC card 400 to on-vehicle device 300.

1.1 Structure of AD Server 100

As shown in FIG. 2, AD server 100 is structured from a control unit 101, a secret-key storage unit 102, a public-key-certificate storage unit 103, a CRL storage unit 104, a public-key-encryption processing unit 105, a registration-information storage unit 106, a CSI generation unit 107, a CSI storage unit 108, a content storage unit 109, an encryption unit 110, an ID storage unit 111, a drive unit 112, an input unit 113, a display unit 114, an input/output (IO) unit 115, an input/output (IO) unit 116, a decryption unit 117, a content-key storage unit 118, and an encryption unit 119.

AD server 100 is specifically a computer system structured from a microprocessor, a ROM, a RAM, a hard disk unit and the like. A computer program is stored on the RAM or the hard disk unit. AD server 100 carries out functions as a result of the microprocessor operating in accordance with the computer program.

AD server 100 conducts processing to (i) register devices, (ii) manage copying of CSI and withdrawals, (iii) deliver content, and (iv) copy content.

Each of the elements will now be described.

(1) IO Units 115, 116, and Drive Unit 112

IO unit 115 conducts transmission/reception of data with playback apparatus 200. IO unit 116, when the connection of IC card 400 is detected, outputs the detection to control unit 101. Also, IO unit 116 conducts transmission/reception of data with IC card 400. Drive unit 112 writes/reads data to/from DVD 500.

(2) Secret-Key Storage Unit 102, Public-Key-Certificate Storage Unit 103, CRL Storage Unit 104, Content Storage Unit 109, ID Storage Unit 111, and Content-Key Storage Unit 118

ID storage unit 111 stores an ID_1, which is an identifier (ID) unique to AD server 100.

Public-key-certificate storage unit 103 stores a public key certificate (PKC) Cert_1.

PKC Cert_1 certifies that a public key PK_1 is the legitimate public key of AD server 100. PKC Cert_1 includes signature data Sig_CA1, public key PK_1, and ID_1. Signature data Sig_CA1 is generated by a certification authority (CA) performing a signature algorithm S on public key PK_1 and ID_1. Here, a CA is a reliable third party authority, and issues public key certificates certifying the legitimacy of the public keys of devices belonging to group formation/management system 1. Moreover, signature algorithm S is, as one example, an ElGamal signature over a finite field. Since ElGamal signatures are known technology, a description is omitted here.

Secret-key storage unit 102 is a tamper-resistant area that cannot be viewed from outside, and stores a secret key SK_1 corresponding to public key PK_1.

CRL storage unit 104 stores a certificate revocation list (CRL). A CRL is a list, issued by a CA, in which are registered the IDs of invalidated devices, which are devices that have conducted improper processing, devices whose secret key has been disclosed, and the like. Moreover, it need not be device IDs that are registered in a CRL, but may be the serial numbers of public key certificates held by invalidated devices. A CRL is distributed to devices, for example, via a broadcast, the Internet or stored on a recording medium such as DVD, and devices obtain the most recent CRL. Moreover, a detailed disclosure of CRLs can be found in the American National Standards Institute's ANSI X9.57: "Public Key Cryptography for the Financial Services Industry: Certificate Management," 1997.

Content storage unit 109 stores encrypted content which is encrypted using content keys. Moreover, although the method of acquiring content is not the subject of the present invention and a description is thus omitted here. Acquisition methods include, for example, acquiring content using the Internet, broadcasts or the like, or acquiring content from a recording medium such as a DVD.

Content-key storage unit 118 receives an encrypted content key a from encryption unit 110, and stores the encrypted content key a.

(3) Public-Key-Encryption Processing Unit 105

Public-key-encryption processing unit 105 conducts authentication at a time of communicating with another device, and establishes a secure authenticated channel (SAC). A SAC refers to a safe communication channel that enables encrypted communication. As a result of processing to establish a SAC, it is possible to confirm that the device being authenticated is a legitimate device recognized by the CA. A detailed description of the SAC establishment method is given later. Also, unit 105, as a result of the authentication, shares a session key SK.

(4) Registration-Information Storage Unit 106

Registration-information storage unit 106 is a tamper-resistant area, and stores registration information as shown in FIG. 3A. Registration information is information for managing the number of devices registerable in AD server 100 and the ID of registered devices, and includes DEVICE ID, MAXIMUM, REGISTERED, REMAINING, and IC CARD ID categories.

DEVICE ID is an area storing the ID of devices registered in AD server 100. When playback apparatus 200 and on-vehicle device 300 are registered in AD server 100, an ID_2 and an ID_3, being the respective IDs of devices 200 and 300, are stored, as shown in FIG. 3B.

MAXIMUM shows the maximum number of devices registerable in AD server 100, the maximum number being two in the present embodiment. REGISTERED shows the number of devices already registered in AD server 100. REMAINING shows the remaining number of devices registerable in AD server 100.

In an initial state in which no client devices are registered in the authorized domain managed by AD server 100, the registered number (REGISTERED) is "0", and the remaining number (REMAINING) has the same value as the maximum number (MAXIMUM). When a client device is registered in the authorized domain by AD server 100, "1" is added to the registered number, and "1" is subtracted from the remaining number.

IC CARD ID prestores the ID of IC card 400 affiliated with AD server 100, and cannot be rewritten.

(5) CSI Generation Unit 107, CSI Storage Unit 108

CSI storage unit 108 is a tamper-resistant area storing a CSI that cannot be read from the outside, and stores, when no devices are registered in AD server 100, "0" as a value showing that no devices are registered.

CSI generation unit 107 generates CSI when a device is initially registered in AD server 100, under the control of control unit 101. Also, when all of the devices are withdrawn, CSI storage unit 108 rewrites the stored value to "0".

Here, CSI is arbitrary data generated by CSI generation unit 107, and has a 200-bit length in the present embodiment. Moreover, the bit length of the CSI is not limited to this, and may be any length that is not readily estimatable, and that cannot be easily tested.

CSI generation unit 107 stores generated CSI in CSI storage unit 108. Also, unit 107 outputs generated CSI to IC card 400 when connected.

Moreover, CSI may be updated regularly or irregularly.

(6) Encryption Unit 110, and Encryption Unit 119

Encryption unit 119, at a time of playback apparatus 200 being registered and under the control of control unit 101, performs an encryption algorithm E on CSI using a session key SK received from public-key-encryption processing unit 105 to generate encrypted CSI, and transmits the encrypted CSI to playback apparatus 200 via IO unit 115. Here, encryption algorithm E is, as one example, a Data Encryption Standard (DES) algorithm. Since DES algorithms are known technology, a description is omitted here.

Encryption unit 110, at a time of storing a content key in content-key storage unit 118, reads ID_1 from ID storage unit 111 and reads CSI from CSI storage unit 108. Unit 110 concatenates the read ID_1 and CSI in the stated order to generate an encryption key a, performs an encryption algorithm E on the content key using encryption key a to generate encrypted content key a, and outputs encrypted content key a to content-key storage unit 118.

Encryption unit 110, at a time of writing an encrypted content onto DVD 500 and under the control of control unit 101, reads ID_2 and ID_3, which are the IDs of the registered devices, from DEVICE ID of the registered information in registration-information storage unit 106. Unit 110 concatenates ID_2 and CSI in the stated order to generate an encryption key b, and concatenates ID_3 and CSI in the stated order to generate an encryption key c. An encrypted content key b and an encrypted content key c are generated respectively using encryption key b and encryption key c, and are written to DVD 500.

(7) Decryption Unit 117

Decryption unit 117, under the control of control unit 101, reads ID_1 stored in ID storage unit 111 and reads CSI stored in CSI storage unit 108. Unit 117 performs a decryption algorithm D on encrypted content key a read from content-key storage unit 118, using a decryption key generated by concatenating the read ID_1 and CSI in the stated order, to obtain a content key. Unit 117 outputs the obtained content key to encryption unit 110. Here, decryption algorithm D is an algorithm for conducting the reverse processing of encryption algorithm E.

(8) Control Unit 101, Input Unit 113, and Display Unit 114

Input unit 113 receives inputs from a user, and outputs the received inputs to control unit 101.

At a time of starting processing, control unit 101, on receipt of an IC card ID from connected IC card 400, confirms whether the received ID matches the IC card ID in the registration information. If not matched, control unit 101 displays on display unit 114 the fact that the connected IC card is not the IC card affiliated with AD server 100, and ends the processing. If matched, control unit 101 continues the processing as follows.

Registration of Playback Apparatus 200

On receipt of a registration request from playback apparatus 200 via IO unit 115, control unit 101 controls public-key-encryption processing unit 105, and establishes a SAC using a CSI initial value "0", by the SAC establishment method to be described later (here, the CSI initial value "0" used at a time of registration indicates that playback apparatus 200 has yet to be registered). From the result of the device authentication at a time of establishing the SAC, control unit 101 judges whether the target device has an authorized public key pair and whether the target device is unregistered. If the target device has the authorized public key pair and CSI having a "0" value, authentication is judged to be successful. If the target device does not hold CSI having a "0" value, control unit 101 judges the target device to already be registered in another authorized domain. Moreover, whether or not the authorized domain in which the target device is registered is the authorized domain managed by AD server 100 may be judged by confirming whether the CSI of the target device matches the CSI stored in CSI storage unit 108.

When judged that the target device is unregistered, control unit 101 reads registration information from registration-information storage unit 106, and judges whether the remaining number of devices is "0". If the remaining number is not "0", control unit 101 judges whether the registered number is "0". If the registered number is "0", control unit 101 controls CSI generation unit 107 to generate CSI, and stores the generated CSI in CSI storage unit 108. If the registered number is not "0", control unit 101 reads CSI from CSI storage unit 108, has the generated or read CSI encrypted by encryption unit 110 to generate encrypted CSI, and outputs the encrypted CSI to playback apparatus 200 via IO unit 115. On receipt from playback apparatus 200 of a receipt notification showing that the outputted CSI has been received, control unit 101 adds "1" to the registered number in the registration information, subtracts "1" from the remaining number, and ends the processing.

If authentication is unsuccessful, or if the target device is registered, or if the remaining number is "0", control unit 101 transmits a registration failure notification to playback apparatus 200 showing that registration is not possible, and ends the processing.

Also, at a time of CSI being generated by CSI generation unit 107, control unit 101 establishes a SAC with IC card 400 and shares session key SK, performs encryption algorithm E on the generated CSI using session key SK to generate encrypted CSI, and transmits the encrypted CSI to IC card 400.

Registration of On-Vehicle 300

(a) On receipt of an input from input unit 113 showing the copying of CSI when IC card 400, whose ID has already been confirmed, is connected, control unit 101 judges whether the remaining number is "0", and if not "0", transmits a permission right to IC card 400 showing that a once-only copy of CSI is permitted. Control unit 101, on receipt from IC card 400 of a receipt notification, ends the processing.

When the remaining number is "0", control unit 101 displays the fact that copying is not possible on display unit 114, and ends the processing.

(b) When IC card 400 is connected to AD server 100, AD server 100 confirms that the IC card ID has been registered in the registration information, and on receipt of a copy notification showing that CSI has been copied, control unit 101 extracts the ID of the CSI copy target (i.e., on-vehicle device 300), which is included in the copy notification, and stores the extracted ID as a device ID in the registration information. Also, control unit 101 transmits a receipt notification to IC card 400 showing that the copy target ID has been received.

Moreover, although the above description relates here to CSI having been generated, when CSI has not been generated, CSI is generated and transmitted to IC card 400 in the same manner as when playback apparatus 200 is registered.

Content Delivery

On receipt of a content delivery request from playback apparatus 200 via IO unit 115, control unit controls public-key-encryption processing unit 105 to establish a SAC using the SAC establishment method to be described later, and shares session key SK. Since CSI stored in CSI storage unit 108 is used in authentication conducted at the time of establishing the SAC, when authentication is successful, control unit 101 judges that the target device is registered because of the target device holding CSI generated in AD server 100, and when authentication is unsuccessful, control unit 101 judges that the target device is not registered in AD server 100.

When authentication is unsuccessful, control unit 101 transmits a delivery failure notification to playback apparatus 200 showing that distribution of contents is not possible.

When authentication is successful, control unit 101 controls decryption unit 117 to decrypt encrypted content key a stored in content-key storage unit 118 to obtain a content key. Next, control unit 101 controls encryption unit 110 to encrypt the content key using session key SK to generate an encrypted content key s, and transmits encrypted content key s to playback apparatus 200. Also, control unit 101 reads an encrypted content from content storage unit 109, and transmits the encrypted content to playback apparatus 200.

Recording of a Content onto DVD

On receipt of an input from input unit 113 indicating to record a content onto DVD 500, control unit 101 controls decryption unit 117 to decrypt encrypted content key a stored in content-key storage unit 118 to obtain a content key. Next, control unit 101 controls encryption unit 110 to encrypt the content key using encryption key b and encryption key c generated respectively using ID_2 and ID_3 registered in the registration information to generate encrypted content key b and encrypted content key c, and writes the encrypted content keys b and c to DVD 500. Also, control unit 101 reads an encrypted content from content storage unit 109 and writes the encrypted content to DVD 500.

Moreover, the content key may be encrypted using an encryption key generated based on an ID unique to DVD 500, or an encryption key generated based on the DVD 500 ID and CSI.

Withdrawal

On receipt from playback apparatus 200 of a withdrawal request that includes ID_2, control unit 101 controls public-key-encryption processing unit 105 to establish a SAC using the SAC establishment method to be described later. At this time, control unit 101 conducts authentication using CSI stored in CSI storage unit 108. From the authentication result at the time of establishing the SAC, control unit 101 judges whether the device that sent the request is registered, and if the target device is unregistered, control unit 101 transmits an unregistered notification to playback apparatus 200 showing playback apparatus 200 to be unregistered, since it is impossible to withdraw in this case.

When playback apparatus 200 is registered, control unit 101 transmits a deletion notification to playback apparatus 200 indicating to delete CSI. On receipt of a deletion-completed notification from playback apparatus 200 showing that deletion of the CSI has been completed, control unit 101 deletes ID_2 from DEVICE ID in the registration information, subtracts "1" from the registered number, and adds "1" to the remaining number.

1.2 Structure of Playback Apparatus 200

Figure 4:
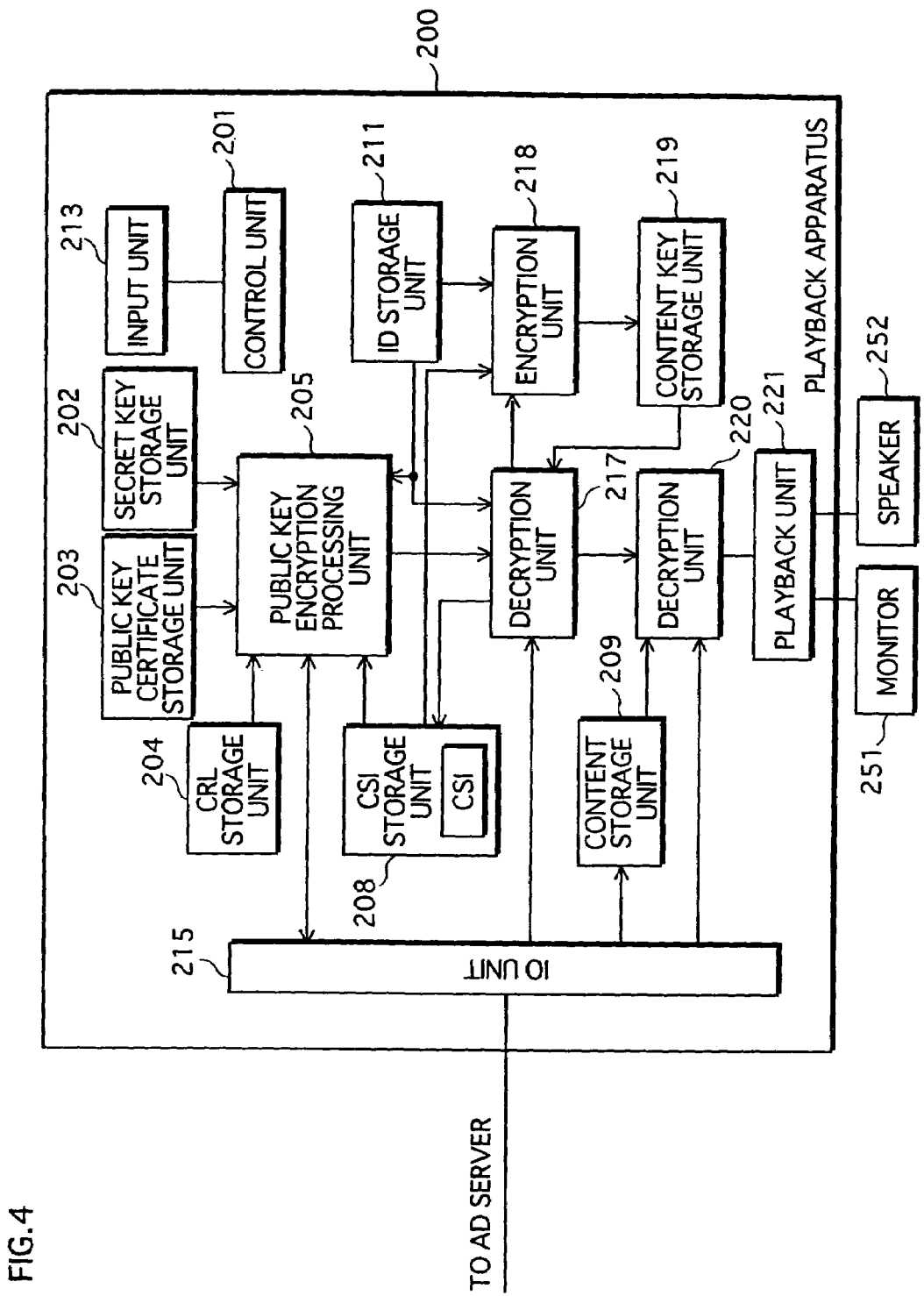
FIG. 4 is a block diagram showing a structure of a playback apparatus 200.

As shown in FIG. 4, playback apparatus 200 is structured from a control unit 201, a secret-key storage unit 202, a public-key-certificate storage unit 203, a CRL storage unit 204, a public-key-encryption processing unit 205, a CSI storage unit 208, a content storage unit 209, an ID storage unit 211, an input unit 213, an input/output (IO) unit 215, a decryption unit 217, an encryption unit 218, a content-key storage unit 219, a decryption unit 220, and a playback unit 221. A monitor 251 and a speaker 252 are connected to playback unit 221.

Playback apparatus 200 is a computer system the same AD server 100, and a computer program is stored in the RAM or the hard disk unit. Playback apparatus 200 carries out functions as a result of the microprocessor operating in accordance with the computer program.

(1) IO Unit 215

IO unit 215 conducts transmission/reception of data with AD server 100.

(2) Secret-Key Storage Unit 202, Public-Key-Certificate Storage Unit 203, CRL Storage Unit 204, CSI Storage Unit 208, and ID Storage Unit 211

CRL storage unit 204 stores the most recent CRL.

ID storage unit 211 stores ID_2, which is the ID unique to playback apparatus 200.

CSI storage unit 208 is a tamper-resistant area, and stores "0" showing playback apparatus 200 to be unregistered. When playback apparatus 200 is registered in AD server 100, CSI storage unit 208 stores CSI acquired from AD server 100.

Public-key-certificate storage unit 203 stores a PKC Cert_2 issued by the CA. PKC Cert_2 includes a public key PK_2 of playback apparatus 200, ID_2 of playback apparatus 200, and signature data Sig_CA2 generated by the CA performing signature algorithm S on public key PK_2 and ID_2.

Secret-key storage unit 202 is a tamper-resistant area, and stores a secret key SK 2 corresponding to public key PK_2 of playback apparatus 200.

(3) Public-Key-Encryption Processing Unit 205

Public-key-encryption processing unit 205 establishes a SAC by the SAC establishment method to be described later, at a time of communicating with AD server 100, and shares session key SK. Unit 205 outputs the shared session key SK to decryption unit 217.

(4) Decryption Unit 217, and Decryption Unit 220

Decryption unit 217, at a time of a content being distributed from AD server 100, performs decryption algorithm D on encrypted content key s delivered from AD server 100, using session key SK shared by public-key-encryption processing unit 205, to obtain a content key. Here, decryption algorithm D is an algorithm for conducting the reverse processing of encryption algorithm E.

Also, at a time of playing a content once stored, decryption unit 217 reads ID_2 from ID storage unit 211, reads CSI from CSI storage unit 208, and concatenates the reads ID_2 and CSI in the stated order to generate a decryption key b. Decryption unit 217 performs decryption algorithm D on encrypted content key b read from content-key storage unit 219, using the generated decryption key b, to obtain a content key, and outputs the obtained content key to decryption unit 220.

Decryption unit 220 reads an encrypted content stored in content storage unit 209, performs decryption algorithm D on the encrypted content using the content key received from decryption unit 217 to obtain a content, and outputs the obtained content to playback unit 221.

(5) Encryption Unit 218

Encryption unit 218, at a time of storing a content acquired from AD server 100, reads ID_2 from ID storage unit 211, and reads CSI from CSI storage unit 208. Unit 218 concatenates the read ID_2 and CSI in the stated order to generate encryption key b, and performs encryption algorithm E on the content key received from decryption unit 217 using the generated encryption key b to generate encrypted content key b, and outputs encrypted content key b to content-key storage unit 219.

(6) Content Storage Unit 209, and Content-Key Storage Unit 219

Content storage unit 209 stores encrypted contents transmitted from AD server 100.

Content-key storage unit 219 stores encrypted content key b encrypted by encryption unit 218.

(7) Control Unit 201, and Input Unit 213

Registration

On receipt by input unit 213 of an input indicating to start the registration processing, control unit 201 reads ID_2 from ID storage unit 211, transmits a registration request that includes ID_2 to AD server 100 via IO unit 215, and establishes a SAC by the SAC establishment method to be described later.

Control unit 201, on receipt from AD server 100 of a registration failure notification, displays the fact that registration is not possible on monitor 251, and ends the registration processing.

Control unit 201, on receipt from AD server 100 of encrypted CSI, controls decryption unit 217 to decrypt the encrypted CSI to obtain CSI, and stores the obtained CSI in CSI storage unit 208. Also, unit 201 transmits a receipt notification to AD server 100 showing that the CSI has been received.

Content Delivery

On receipt by input unit 213 of an input indicating to acquire and playback a content, control unit 201 transmits a delivery request to AD server 100.

Control unit 201, on receipt of a delivery failure notification from AD server 100, displays the fact that delivery is not possible on monitor 251, and ends the processing.

When a received content is to be played, control unit 201, on receipt of encrypted content key s from AD server 100, controls decryption unit 217 to decrypt encrypted content key s to obtain a content key. Also, on receipt of an encrypted content from AD server 100, control unit 201 controls decryption unit 220 to decrypt the encrypted content to obtain a content, and has playback unit 221 play the content.

Playback After Accumulating Contents

On receipt by input unit 213 of an input indicating to acquire and accumulate contents, control unit 201 conducts the same processing as above to acquire contents. Once contents have been acquired, control unit 201 has decryption unit 217 decrypt encrypted content key s received from AD server 100, and controls encryption unit 218 to encrypt the decrypted content key, and stores the encrypted content key in content-key storage unit 219 as encrypted content key b. Also, on receipt of encrypted contents from AD server 100, control unit 201 stores the encrypted contents in content storage unit 209.

On receipt by input unit 213 of an input which indicates playback of content stored in content storage unit 209, control unit 201 controls (i) decryption unit 217 to decrypt encrypted content key b, (ii) decryption unit 220 to decrypt the encrypted content to obtain decrypted content, and (iii) playback unit 221 to play the content.

Withdrawal on receipt by input unit 213 of an input indicating to start withdrawal processing, control unit 201 establishes a SAC by the SAC establishment method to be described later.

Control unit 201, on receipt of an unregistered notification from AD server 100, displays on monitor 251 the fact that playback apparatus 200 is not registered in AD server 100, and ends the processing.

Control unit 201, on receipt of a deletion notification from AD server 100, deletes CSI stored in CSI storage unit 208, and stores "0" in CSI storage unit 208 showing playback apparatus 200 to be unregistered. Also, control unit 201 transmits a deletion-completed notification that notifies AD server 100 that deletion of the CSI has been completed.

(8) Playback Unit 221

Playback unit 221 generates video signals from contents received from decryption unit 220, and outputs the generated video signals to monitor 251. Also, unit 221 generates audio signals from the received contents, and outputs the generated audio signals to speaker 252.

1.4 Structure of On-Vehicle Device 300

Figure 5:
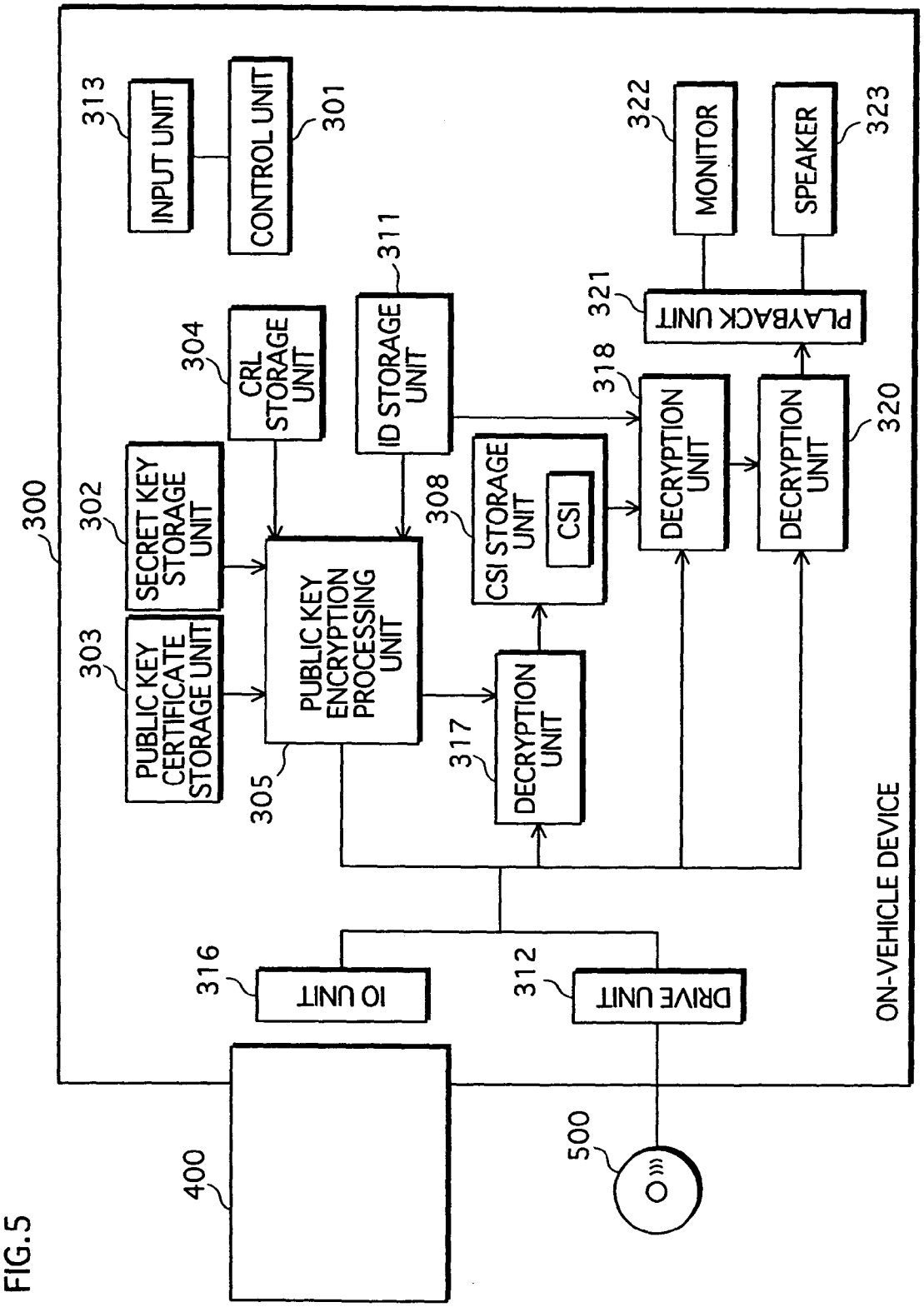
FIG. 5 is a block diagram showing a structure of an on-vehicle device 300.

As shown in FIG. 5, on-vehicle device 300 is structured from a control unit 301, a secret-key storage unit 302, a public-key-certificate storage unit 303, a CRL storage unit 304, a public-key-encryption processing unit 305, a CSI storage unit 308, an ID storage unit 311, a drive unit 312, an input unit 313, an input/output (IO) unit 316, decryption units 317, 318 and 320, a playback unit 321, a monitor 322 and a speaker 323.

On-vehicle device 300 is a computer system the same as AD server 100, and a computer program is stored on the RAM or the hard disk unit. On-vehicle device 300 carries out functions as a result of the microprocessor operating in accordance with the computer program.

(1) Drive Unit 312, and IO Unit 316

Drive Unit 312 reads encrypted content key c from DVD 500, and outputs encrypted content key c to decryption unit 318. Also, unit 312 reads an encrypted content and outputs the encrypted content to decryption unit 320.

IO unit 316 conducts transmission/reception of data with IC card 400, under the control of control unit 301.

(2) Secret-Key Storage Unit 302, Public-Key-Certificate Storage Unit 303, CRL Storage Unit 304, CSI Storage Unit 308, and ID Storage Unit 311

CRL storage unit 304 stores the most recent CRL.

ID storage unit 311 stores ID_3, which is the ID unique to on-vehicle device 300.

CSI storage unit 308 is a tamper-resistant area, and stores "0" showing on-vehicle device 300 to be unregistered. On receipt from IC card 400 of CSI generated by AD server 100, unit 308 stores the received CSI.

Public-key-certificate storage unit 303 stores a PKC Cert_3 issued by the CA. PKC Cert_3 includes a public key PK_3 and ID_3 of on-vehicle device 300, and signature data Sig_CA3 generated by the CA performing signature algorithm S on public key PK_3 and ID_3.

Secret-key storage unit 302 is a tamper-resistant area, and stores a secret key SK_3 corresponding to public key PK_3.

(3) Public-Key-Encryption Processing Unit 305

Public-key-encryption processing unit 305 conducts authentication with IC card 400, under the control of control unit 301, and establishes a SAC by the SAC establishment method to be described later. Also, unit 305 outputs session key SK shared, at this time, to decryption unit 317.

(4) Decryption Units 317, 318, and 320

Decryption unit 317, on receipt of encrypted CSI from IC card 400 and under the control of control unit 301, performs decryption algorithm D on the encrypted CSI using session key SK received from public-key-encryption processing unit 305 to obtain CSI, and outputs the obtained CSI to CSI storage unit 308.

At a time of playing a content, decryption unit 318, on receipt of encrypted content key c from drive unit 312, reads ID_3 from ID storage unit 311 and reads CSI from CSI storage unit 308. Unit 318 concatenates the read ID_3 and CSI in the stated order to generate decryption key c. Unit 318 performs decryption algorithm D on encrypted content key c using decryption key c to obtain a content key, and outputs the obtained content key to decryption unit 320.

Decryption unit 320 receives an encrypted content from drive unit 312 and a content key from decryption unit 318. Unit 320 performs decryption algorithm D on the encrypted content using the received content key to obtain a content, and outputs the obtained content to playback unit 321.

(5) Control Unit 301, and Input Unit 313

Control unit 301, when IC card 400 is connected to on-vehicle device 300, controls public-key-encryption processing unit 305 to establish a SAC. At this time, unit 301 uses the "0" stored in CSI storage unit 308 as CSI. If device authentication is unsuccessful, unit 301 ends the processing. Also, when a registered notification is received from IC card 400, unit 301 displays the fact that on-vehicle device 300 is registered on monitor 322, and ends the processing. Unit 301, on receipt of encrypted CSI from IC card 400 via IO unit 316, controls decryption unit 317 to decrypt the encrypted CSI to obtain CSI, and stores the obtained CSI in CSI storage unit 308. Also, unit 301 transmits a receipt notification to IC card 400 showing that the CSI has been received.

Moreover, copying of CSI from on-vehicle device 300 to other devices is not conducted.

Control unit 301, on receipt of an input from input unit 313 indicating to view a content recorded on DVD 500, controls drive unit 312 to read encrypted content key c and an encrypted content from DVD 500. Unit 301 has encrypted content key c decrypted by decryption unit 318 to obtain a content key, and has the encrypted content decrypted by decryption unit 320 to obtain a content. Also, unit 301 controls playback unit 321 to play the obtained content.

(6) Playback Unit 321, Monitor 322, and Speaker 323

Playback unit 321 generates video signals and audio signals from received content, outputs the generated video and audio signals to monitor 322 and speaker 323 respectively, and plays the content.

1.3 Structure of IC Card 400

Figure 6:
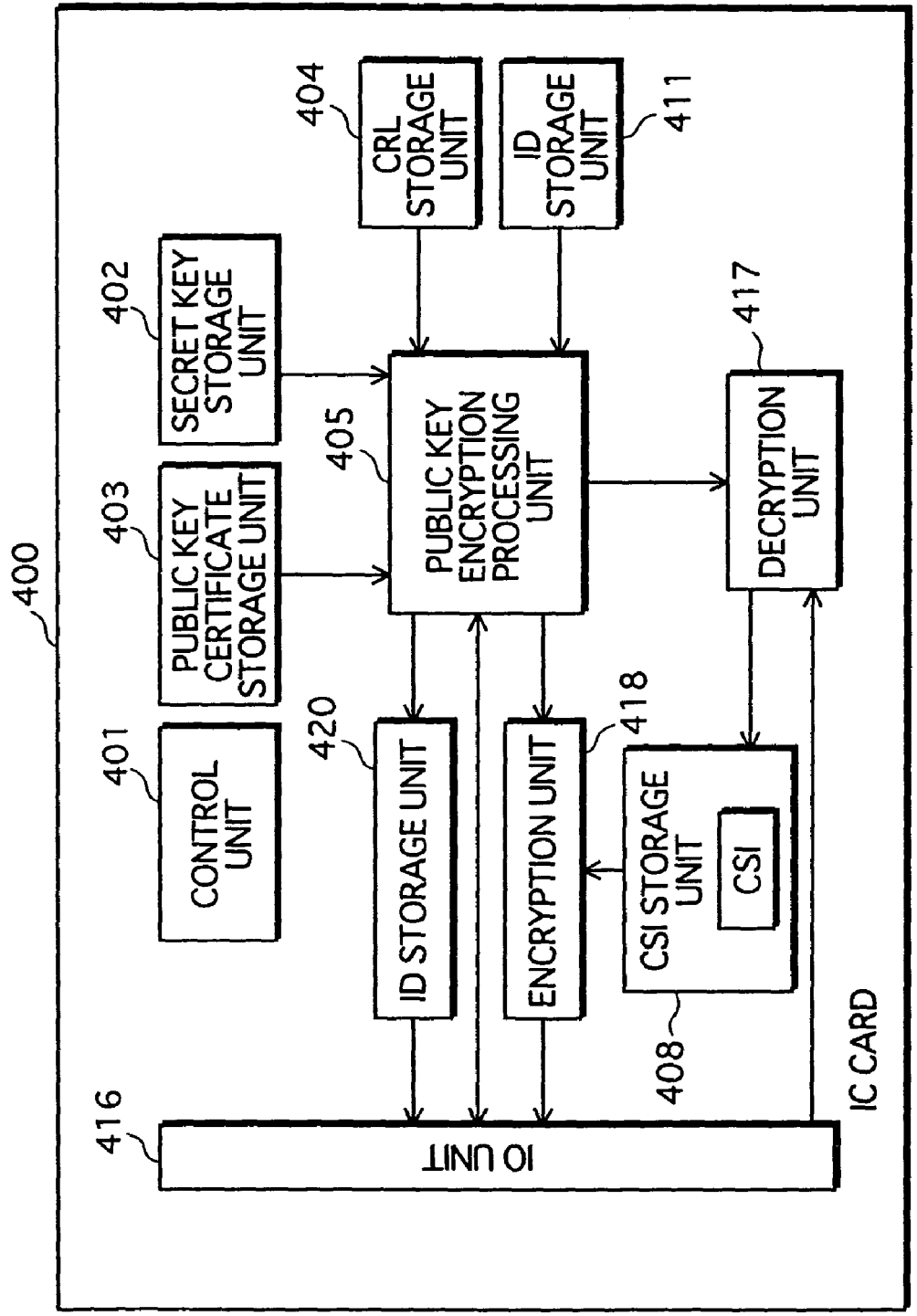
FIG. 6 is a block diagram showing a structure of an IC card 400.

As shown in FIG. 6, IC card 400 is structured from a control unit 401, a secret-key storage unit 402, a public-key-certificate storage unit 403, a CRL storage unit 404, a public-key-encryption processing unit 405, a CSI storage unit 408, an ID storage unit 411, an input/output (IO) unit 416, a decryption unit 417, an encryption unit 418, and an ID storage unit 420.

IC card 400 is connectable to AD server 100 and on-vehicle device 300. IC card 400 is used as a device within the authorized domain at a time of registering devices, such as on-vehicle device 300, that are not connectable with AD server 100.

(1) Secret-Key Storage Unit 402, Public-Key-Certificate Storage Unit 403, CRL Storage Unit 404, CSI Storage Unit 408, ID Storage Unit 411, and ID Storage Unit 420

CRL storage unit 404 stores the most recent CRL.

ID storage unit 411 stores an ID_4, which is an ID unique to IC card 400.

CSI storage unit 408 is a tamper-resistant area, and when a client device has not been registered in AD server 100, stores "0" showing that a client device has yet to be registered. When CSI is generated by AD server 100, unit 408 stores CSI obtained from AD server 100 in correspondence with "0", which is the copy frequency. Here, the copy frequency is the number of times that copying of CSI to other client devices is permitted.

Public-key-certificate storage unit 403 stores a PKC Cert_4 issued by the CA. PKC Cert_4 includes a public key PK_4 and ID_4 of IC card 400, and signature data Sig_CA4 generated by the CA performing signature algorithm S on public key PK_4 and ID_4.

Secret-key storage unit 402 is a tamper-resistant area, and stores a secret key SK_4 corresponding to public key PK_4.

ID storage unit 420 is an area storing the ID of a CSI copy target.

(2) Public-Key-Encryption Processing Unit 405

Public-key-encryption processing unit 405, under the control of control unit 401, establishes a SAC with AD server 100, shares session key SK, and outputs the shared session key SK to decryption unit 417.

Also, unit 405 establishes a SAC with on-vehicle device 300 and shares session key SK, and outputs the shared session key SK to encryption unit 418.

(3) Decryption Unit 417

Decryption unit 417, on receipt of encrypted CSI via IO unit 416 and under the control of control unit 401, performs decryption algorithm D on the encrypted CSI using session key SK received from public-key-encryption processing unit 405 to obtain CSI, and stores the obtained CSI in CSI storage unit 408.

(4) Encryption Unit 418

Encryption unit 418, under the control of control unit 401, reads CSI from CSI storage unit 408, receives session key SK from public-key-encryption processing unit 405, performs encryption algorithm E on the CSI using session key SK to generate encrypted CSI, and transmits the encrypted CSI to on-vehicle device 300.

(5) Control Unit 401, and IO Unit 416

When IC card 400 is connected to AD server 100, control unit 401 reads ID_4 from ID storage unit 411, and transmits the read ID_4 to AD server 100.

At a time of receiving CSI from AD server 100, control unit 401 controls public-key-encryption processing unit 405 to establish a SAC with AD server 100 and share session key SK, and on receipt of encrypted CSI, unit 401 has the encrypted CSI decrypted by decryption unit 417 to obtain CSI, and stores the obtained CSI in CSI storage unit 408.

At a time of registering on-vehicle device 300, control unit 401, on receipt of a permission right from AD server 100, adds "1" to the copy frequency stored in correspondence with the CSI, and transmits a receipt notification to AD server 100.

When IC card 400 is connected to on-vehicle device 300, control unit 401 controls public-key-encryption processing unit 405 to establish a SAC, and shares session key SK. At this time, unit 401 conducts authentication using the initial value "0" as CSI, and from the authentication result, judges whether on-vehicle device 300 is unregistered. If authentication is unsuccessful, unit 401 judges on-vehicle device 300 to be registered, transmits a registered notification to on-vehicle device 300, and ends the processing. When authentication is successful, unit 401 judges on-vehicle device 300 to be unregistered, and stores ID_3 of on-vehicle device 300 received at the time of authentication in ID storage unit 420. Unit 401 reads CSI stored in CSI storage unit 408, has the read CSI encrypted by encryption unit 418 to generate encrypted CSI, and transmits the encrypted CSI to on-vehicle device 300. Unit 401, on receipt of a receipt notification from on-vehicle device 300, subtracts "1" from the copy frequency and ends the processing. Control unit 401, when IC unit 400 is connected to AD server 100, reads ID_4 from ID storage unit 411, and transmits the read ID_4 to AD server 100. Also, unit 401 reads the ID of the CSI copy target from ID storage unit 420, and sends a copy notification that includes the read ID to AD server 100. On receipt from AD server 100 of a receipt notification, unit 401 ends the processing.

2. Operations of Group Formation/Management System 1

2.1 SAC Operations

Figure 7:
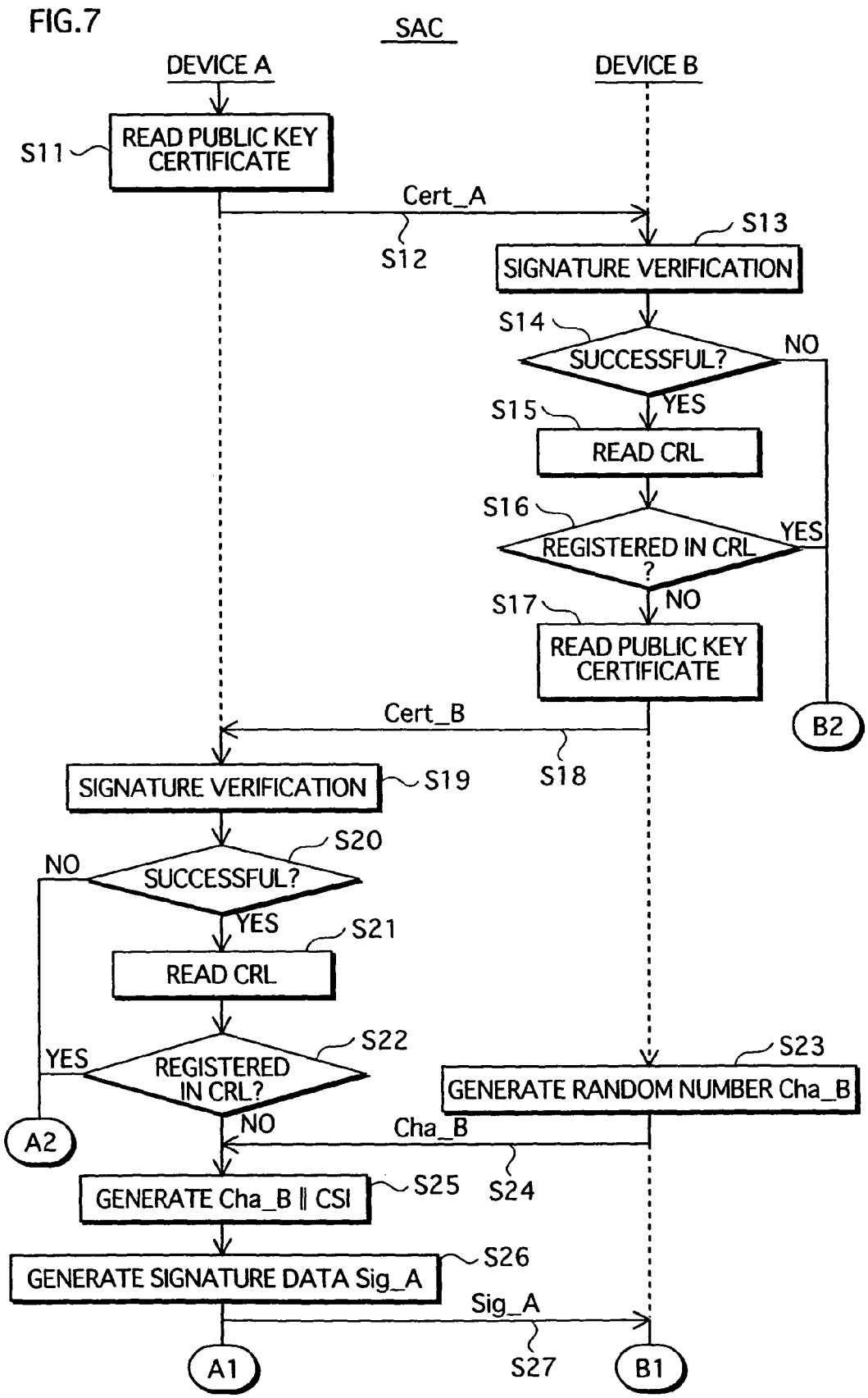
FIG. 7 is a flowchart showing SAC establishment processing (cont.
Figure 8:
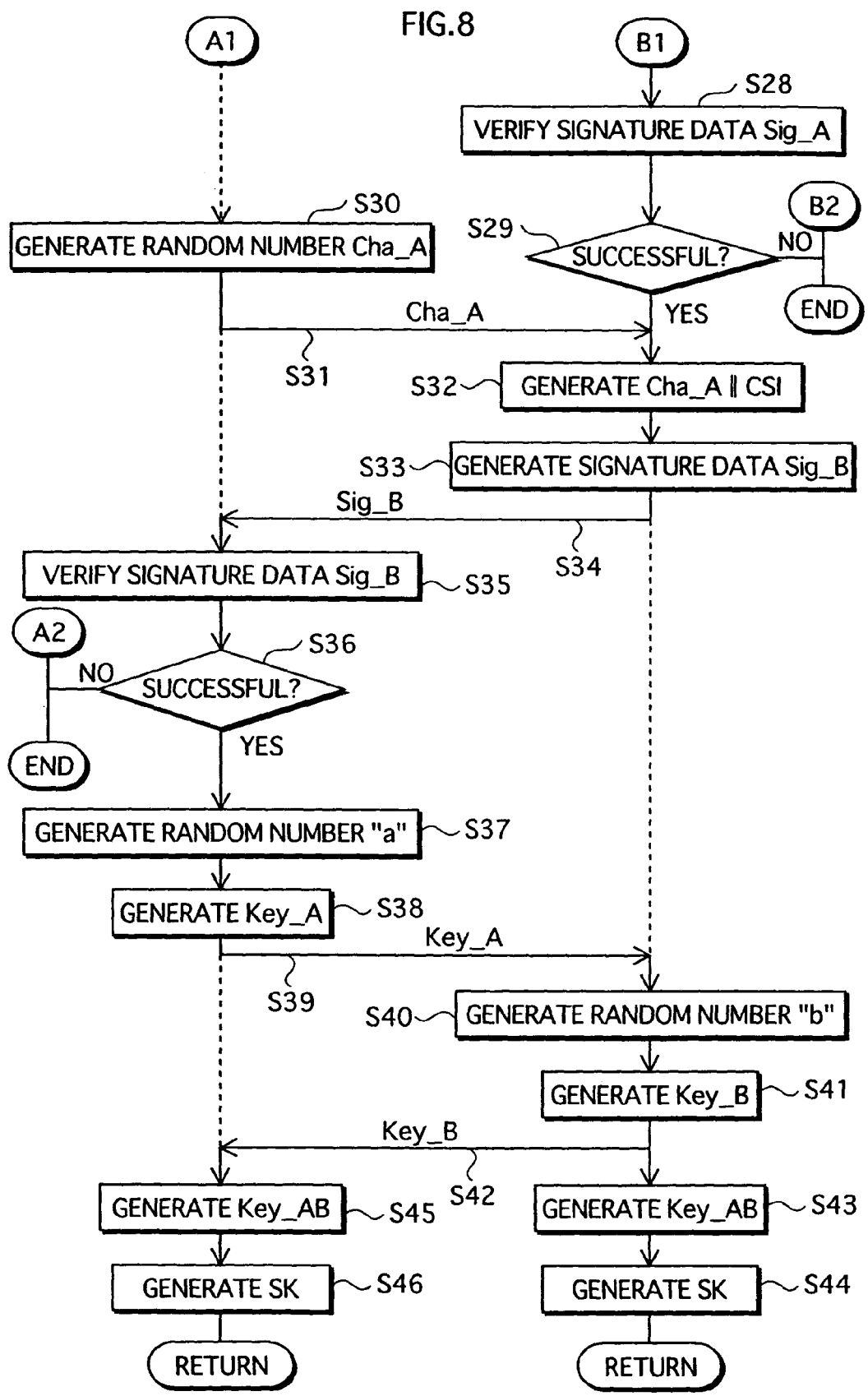
in FIG. 8)

Operations at a time of establishing a SAC will be described using FIGS. 7 and 8.

Moreover, since this SAC establishment method is used in the mutual authentication of any of AD server 100, playback apparatus 200, on-vehicle device 300, and IC card 400, the devices conducting authentication here are referred to simply as device A and device B. Also, although CSI used in authentication can be "0" showing unregistered or values generated by AD server 100, here it is described simply as "CSI".

Here, Gen( ) is a key generation function and Y is a system-unique parameter. Also, key generation function Gen( ) is a function that satisfies a relation Gen(x,Gen(Y,z))=Gen(Y, Gen(x,z)). Moreover, since key generation functions are realizable by arbitrary known technology, the details of such functions will not be referred to here. As one example, a Diffie-Hellman (DH) public key delivery method is disclosed in Nobuichi IKENO, Kenji KOYAMA, *Modern Cryptosystems*, IEICE.

Device A reads PKC Cert_A (step S11), and transmits the read PKC Cert_A to device B (step S12).

Device B, having receiving PKC Cert_A, conducts signature verification by performing a signature verification algorithm V on signature data Sig_CA included in the PKC Cert_A, using a public key PK_CA of the CA (step S13). If verification is unsuccessful (step S14=NO), device B ends the processing. If verification is successful (step S14=YES), device B reads a CRL (step S15), and judges whether ID_A included in the received PKC Cert_A is registered in the CRL (step S16). If judged to be registered (step S16=YES), device B ends the processing. If judged to be not registered (step S16=NO), device B reads PKC Cert_B of device B (step S17), and transmits the read PKC Cert_B to device A (step S18).

Device A, on receipt of PKC Cert_B, conducts signature verification by performing signature verification algorithm V on signature data Sig_CA included in the PKC Cert_B, using public key PK_CA (step S19). If verification is unsuccessful (step S20=NO), device A ends the processing. If verification is successful (step S20=YES), device A reads a CRL (step S21), and judges whether ID_B included in the received PKC Cert_B is registered in the CRL (step S22). If judged to be registered (step S22=YES), device A ends the processing. If judged to be not registered (step S22=NO), device A continues the processing.

Device B generates a random number Cha_B (step S23), and transmits generated random number Cha_B to device A (step S24).

Device A, on receipt of random number Cha_B, concatenates Cha_B and CSI in the stated order to generate Cha_B∥CSI (step S25), performs signature algorithm S on the generated Cha_B∥CSI using a secret key SK_A of device A to generate signature data Sig_A (step S26), and transmits the generated signature data Sig_A to device B (step S27).

Device B, on receipt of signature data Sig_A, conducts signature verification by performing signature verification algorithm V on the received signature data Sig_A using PK_A included in Cert_A received at step S12 (step S28), and if verification is unsuccessful (step S29=NO), device B ends the processing, and if successful (step S29=YES), device B continues the processing.

Device A generates a random number Cha_A (step S30), and transmits generated random number Cha_A to device B (step S31).

Device B, concatenates the received Cha_A and CSI in the stated order to generate Cha_A∥CSI (step S32), performs signature algorithm S on the generated Cha_A∥CSI using a secret key SK_B of device B to generate signature data Sig_B (step S33), and transmits the generated signature data Sig_B to device A (step S34).

Device A, on receipt of signature data Sig_B, conducts signature verification by performing signature verification algorithm V on signature data Sig_B using PK_B included in Cert_B received at step S18 (step S35), and if verification is unsuccessful (step S36=NO), device A ends the processing. If successful (step S36=YES), device A generates a random number "a" (step S37), generates Key_A=Gen(a,Y) using generated random number "a" (step S38), and transmits the generated Key_A to device B (step S39).

Device B, on receipt of Key_A, generates a random number "b" (step S40), and generates Key_B=Gen(b,Y) using generated random number "b" (step S41). Device B transmits the generated Key_B to device A (step S42). Also, device B generates Key_AB=Gen(b,Key_A)=Gen(b,Gen(a,Y)) using generated random number "b" and the received Key_A (step S43), and generates session key SK=Gen(CSI,Key_AB) using Key_AB and the CSI (step S44).

Device A, on receipt of Key_B, generates Key_AB=Gen (a,Key_B)=Gen(a,Gen(b,Y)) using generated random number "a" and the received Key_B (step S45), and generates session key SK=Gen (CSI,Key_AB) using the generated Key_AB and the CSI (step S46).

2.2 Operations for Playback Apparatus 200 Registration

Figure 9:
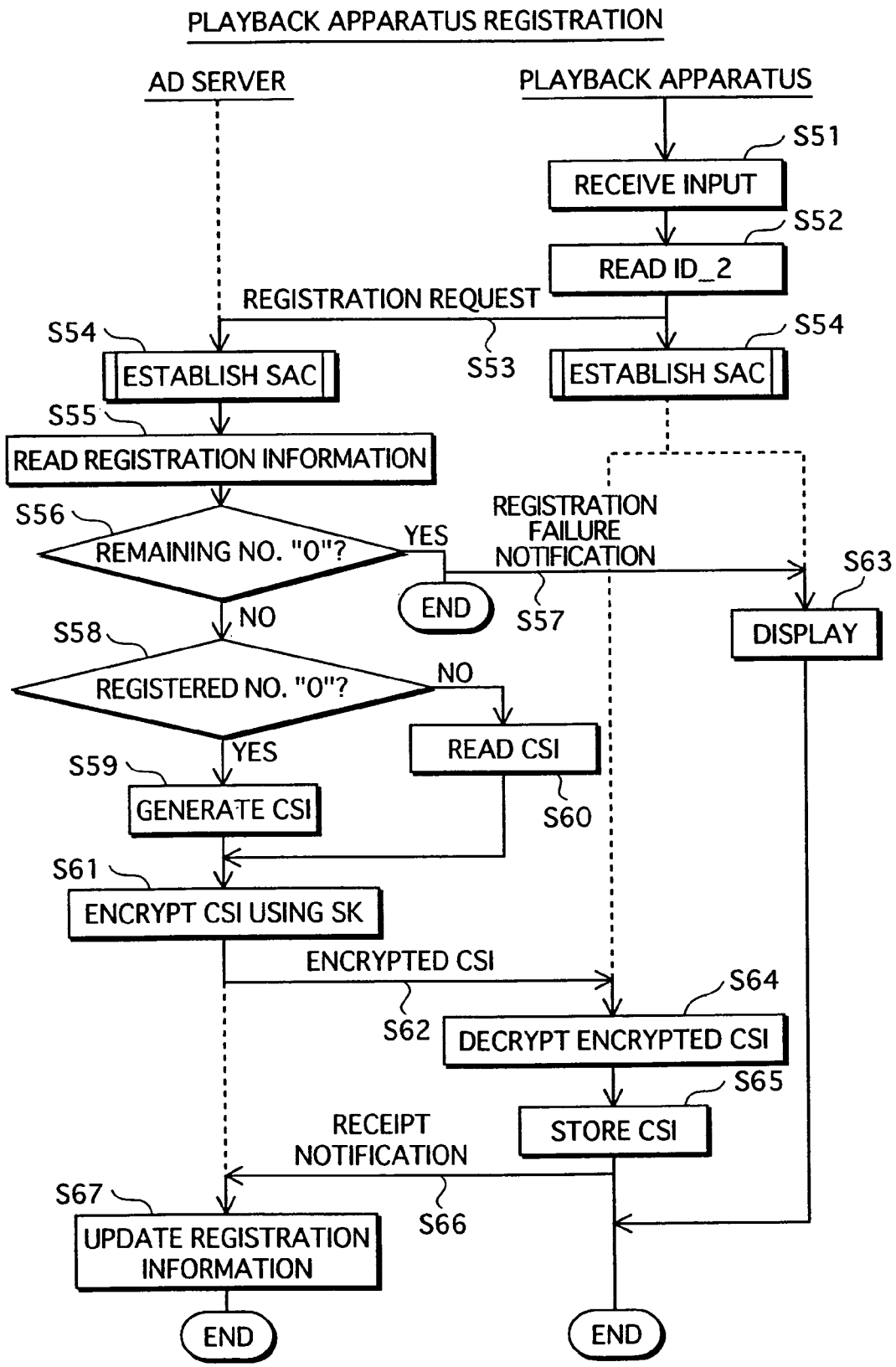
FIG. 9 is a flowchart showing operations by which AD server 100 registers playback apparatus 200.

Operations at a time of AD server 100 registering playback apparatus 200 will now be described using FIG. 9.

Moreover, AD server 100 has IC card 400 connected thereto, and has already confirmed that IC card 400 is an IC card affiliated with AD server 100.

Playback apparatus 200, on receipt of an input from input unit 213 indicating to start the registration processing (step S51), reads ID_2 from ID storage unit 211 (step S52), and transmits a registration request that includes ID_2 to AD server 100 (step S53).

Given that AD server 100 is device A and playback apparatus 200 is device B, a SAC is established by the above-described method (step S54). At this time, AD server 100 uses "0" as CSI and playback apparatus 200 uses CSI stored in CSI storage unit 208.

AD server 100 conducts the signature verification at step S35 using "0" as CSI, and thus judges playback apparatus 200 to be unregistered if verification is successful, and to be registered if verification is unsuccessful. If playback apparatus 200 is judged to be unregistered, AD server 100 reads registration information (step S55), and judges whether the remaining number is "0" (step S56). If "0" (step S56=YES), AD server 100 transmits a registration failure notification to playback apparatus 200 (step S57). If the remaining number is not "0" (step S56=NO), AD server 100 judges whether the registered number is "0" (step S58). If "0" (step S58=YES), CSI is generated by CSI generation unit 107 (step S59). If the registered number is not "0" (step S58=NO), AD server 100 reads CSI from CSI storage unit 108 (step S60). Encryption algorithm E is performed on the generated or read CSI by encryption unit 119 using session key SK, to generate encrypted CSI (step S61), and AD server 100 transmits the encrypted CSI to playback apparatus 200 (step S62).

Playback apparatus 200, if a registration failure notification is received, displays the fact that registration is not possible on monitor 251 (step S63), and ends the processing. If encrypted CSI is received, the encrypted CSI is decrypted by decryption unit 217 to obtain CSI (step S64), and playback apparatus 200 stores the CSI in CSI storage unit 208 (step S65). Also, playback apparatus 200 transmits a receipt notification to AD server 100 (step S66).

On receipt of the receipt notification from playback apparatus 200, AD server 100 writes ID_2 into DEVICE ID in the registration information, adds "1" to the registered number, and subtracts "1" from the remaining number (step S67).

Figure 10:
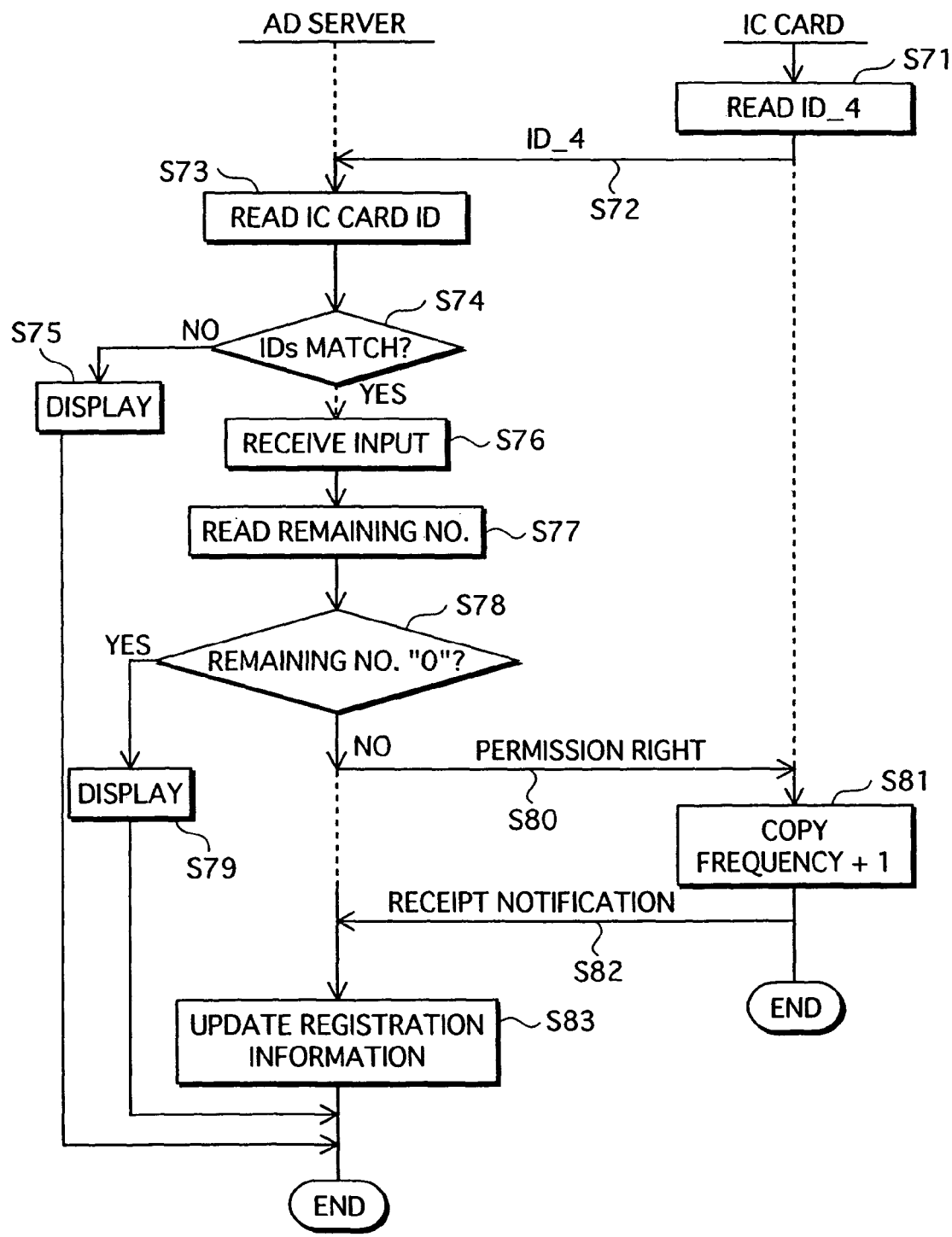
FIG. 10 is a flowchart showing operations by which AD server 100 registers on-vehicle device 300.

2.3 Operations for On-Vehicle Device 300 Registration (1) Operations at a time of permitting the copying of CSI from AD server 100 to IC card 400 will now be described using FIG. 10.

When IC card 400 is connected to AD server 100, IC card 400 reads ID_4 from ID storage unit 411 (step S71), and transmits the read ID_4 to AD server 100 (step S72).

AD server 100, on receipt of ID_4, reads an IC card ID from the registration information (step S73), and judges whether the received ID matches the read ID (step S74). If not matched (step S74=NO), AD server 100 displays on display unit 114 the fact that the connected IC card is not an IC card affiliated with AD server 100 (step S75) and ends the processing. If matched (step S74=YES), AD server 100 continues the processing. In this way, AD server 100 confirms whether the connected IC card is an affiliated IC card, and stands by until an input is received once confirmation is completed.

On receipt by input unit 113 of an input indicating to permit copying of CSI to IC card 400 (step S76), control unit 101 reads the remaining number from registration-information storage unit 106 (step S77), judges whether the remaining number is "0" (step S78), and if "0" (step S78=YES), displays on display unit 114 the fact that registration is not possible (step S79). If the remaining number is not "0" (step S78=NO), control unit 101 transmits a permission right to IC card 400 permitting a once-only copying of CSI (step S80).

IC card 400, on receipt of the permission right from AD server 100, adds "1" to the copy frequency (step S81), and transmits a receipt notification to AD server 100 (step S82).

AD server 100, on receipt of the receipt notification, adds "1" to the registered number in the registration information, subtracts "1" from the remaining number (step S83), and ends the processing.

Figure 11:
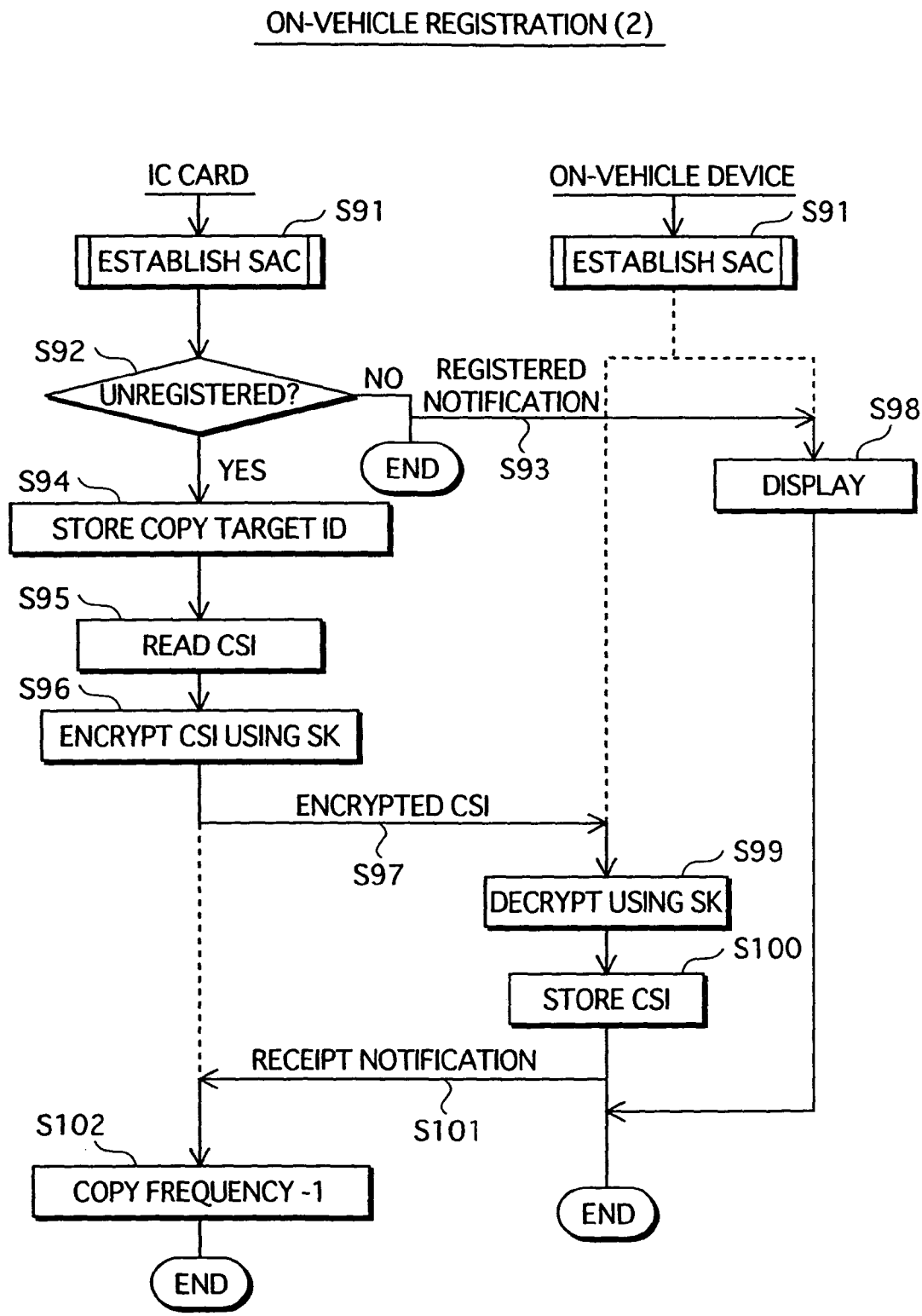
FIG. 11 is a flowchart showing operations by which AD server 100 registers on-vehicle device 300.

(2) Operations at a time of copying CSI from IC card 400 to on-vehicle 300 will now be described using FIG. 11.

When IC card 400 is connected to on-vehicle device 300, the steps S71 to S75 processing are conducted, and IC card 400 is ascertained. Also, IC card 400 and on-vehicle device 300 conducts SAC establishment processing as device A and device B, respectively, and share session key SK (step S91). At this time, IC card 400 conducts authentication using "0", which is the initial value of CSI, and on-vehicle device 300 conducts authentication using a value stored in CSI storage unit 308.

Control unit 401 in IC card 400 conducts the signature verification at step S35 using "0" as CSI, and thus judges on-vehicle device 300 to be unregistered if verification is successful, and to be registered if verification is unsuccessful. If judged to be registered (step S92=NO), IC card 400 transmits a registration failure notification to on-vehicle device 300 (step S93), and ends the processing. If judged to be unregistered (step S92=YES), IC card 400 stores ID_3 of on-vehicle device 300 received at step S18 in ID storage unit 420 (step S94). Encryption unit 418, on receipt of session key SK from public-key-encryption processing unit 405, reads CSI from CSI storage unit 408 (step S95). Encryption unit 418 encrypts the CSI using session key SK to generate encrypted CSI (step S96), and transmits the encrypted CSI to on-vehicle device 300 via IO unit 416 (step S97).

Control unit 301 in on-vehicle device 300, if a registration failure notification is received from IC card 400, displays the fact that registration is not possible on monitor 322 (step S98), and ends the processing. If encrypted CSI is received from IC card 400, decryption unit 317 receives session key SK from public-key-encryption processing unit 305, and decrypts the encrypted CSI using session key SK to obtain CSI (step S99), and stores the obtained CSI in CSI storage unit 308 (step S100). Also, control unit 301 transmits a receipt notification to IC card 400 (step S101).

IC card 400, on receipt of the receipt notification from on-vehicle device 300, subtracts "1" from the copy frequency (step S102) and ends the processing.

(3) Operations at a time of notifying AD server 100 of the copying of CSI will now be described.

When IC card 400 is connected to AD server 100, AD server 100 confirms the ID of IC card 400 to confirm that IC card 400 is an affiliated IC card, and stands by until an input is received once confirmation is completed.

IC card 400 reads ID_3, which is the ID of the copy target, from ID storage unit 420, and transmits a copy notification that includes ID_3 to AD server 100.

AD server 100, on receipt of the copy notification, stores ID_3 included in the copy notification in the registration information as a device ID. Also, AD server 100 transmits a receipt notification to IC card 400 and ends the processing.

IC card 400, on receipt of the receipt notification from AD server 100, ends the processing.

2.4 Content Delivery Operation 1

Figure 12:
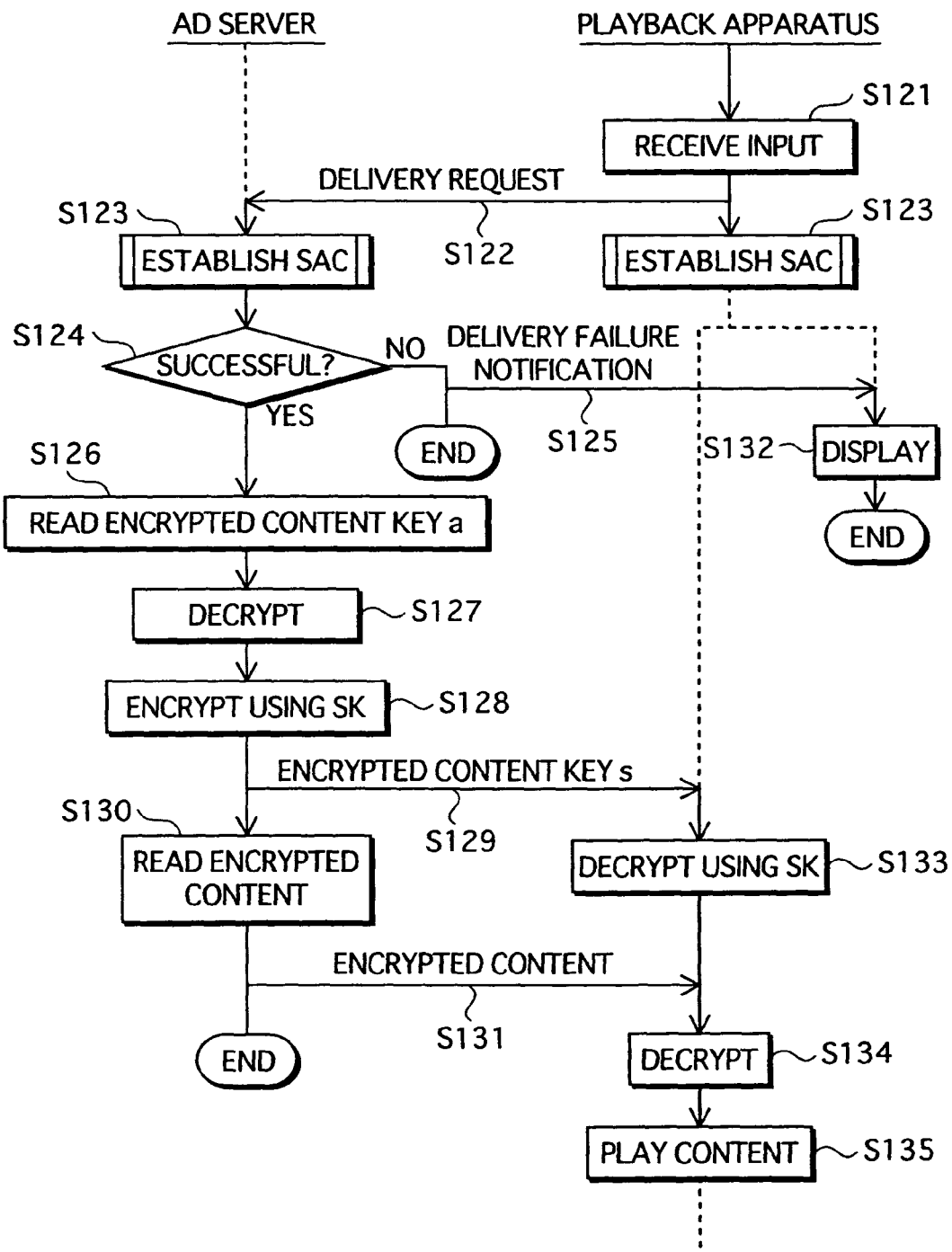
FIG. 12 is a flowchart showing operations to deliver a content.

Operations at a time of delivering content from AD server 100 to playback apparatus 200 and playing the delivered content will now be described using FIG. 12.

Playback apparatus 200, on receipt of an input indicating to acquire content from input unit 213 (step S121), transmits a delivery request for content to AD server 100 (step S122).

AD server 100 and playback apparatus 200 establish a SAC (step S123). At this time, server 100 and device 200 conduct authentication using CSI stored in respective CSI storage units.

AD server 100 confirms that playback apparatus 200 is within the same authorized domain by the processing at step S35.

If authentication is unsuccessful (step S124=NO), AD server 100 transmits a delivery failure notification to playback apparatus 200 (step S125) and ends the processing. If authentication is successful (step S124=YES), AD server 100 reads encrypted content key a from content-key storage unit 118 (step S126), encrypted content key a is decrypted by decryption unit 117 (step S127), and furthermore, the content key is encrypted in encryption unit 110 using session key SK shared at a time of authentication, to generate encrypted content key s (step S128), and AD server 100 transmits encrypted content key s to playback apparatus 200 (step S129). Also, AD server 100 reads an encrypted content from content storage unit 109 (step S130), and transmits the encrypted content to playback apparatus 200 (step S131).

Playback apparatus 200, in the case of a delivery failure notification being received, displays the fact that delivery is not possible on monitor 251 (step S132) and ends the processing. In the case of encrypted content key s being received, encrypted content key s is decrypted in decryption unit 217 using session key SK to obtain a content key (step S133), and the obtained content key is outputted to decryption unit 220. Decryption unit 220 performs decryption algorithm D on the encrypted content received from AD server 100, using the content key received from decryption unit 217, to obtain a content (step S134), and outputs the obtained content to playback unit 221. Playback unit 221 generates video and audio signals from the received content and outputs the generated video and audio signals respectively to monitor 251 and speaker 252, and plays the content (step S135).

2.5 Content Delivery Operation 2

Figure 13:
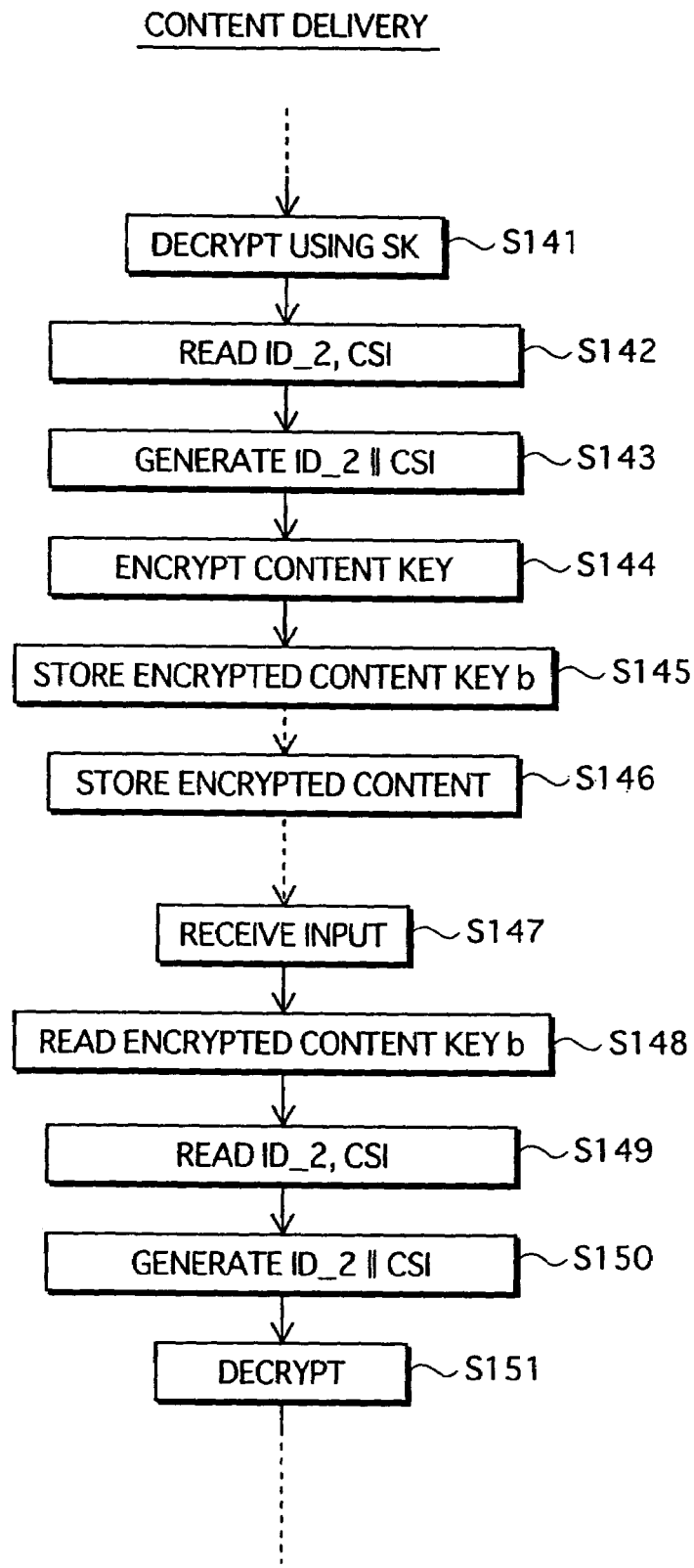
FIG. 13 is a flowchart showing part of the operations to deliver a content.

Operations at a time of playing contents received from AD server 100 once they have been accumulated will now be described using FIG. 13.

The same processing as in steps S121 to S130 is conducted.

Decryption unit 217 decrypts encrypted content key s to obtain a content key (step S141), and outputs the obtained content key to encryption unit 218. Encryption unit 218 reads CSI from CSI storage unit 208 and ID_2 from ID storage unit 211 (step S142). Encryption unit 218 concatenates the read ID_2 and CSI in the stated order to generate ID_2∥CSI (step S143), and sets ID_2∥CSI as encryption key b. Encryption unit 218 encrypts the content key using the generated encryption key b to generate encrypted content key b (step S144), and stores encrypted content key b in content-key storage unit 219 (step S145). Also, on receipt of an encrypted content from AD server 100, control unit 201 stores the received encrypted content in content storage unit 209 (step S146).

On receipt from input unit 213 of an input indicating to play a stored content, decryption unit 217 reads encrypted content key b from content-key storage unit 219 (step S148). Also, decryption unit 217 reads CSI from CSI storage unit 208 and ID_2 from ID storage unit 211 (step 149), concatenates the read ID_2 and CSI to generate ID_2∥CSI (step S150), and sets ID_2∥CSI as a decryption key. Decryption unit 217 performs decryption algorithm D on encrypted content key b using the generated decryption key to obtain a content key (step S151), and outputs the obtained content key to decryption unit 220. Decryption unit 220 and playback unit 221 conduct the steps S133 to S135 processing to play the content.

2.6 Operations at a Time of Recording onto DVD

Figure 14:
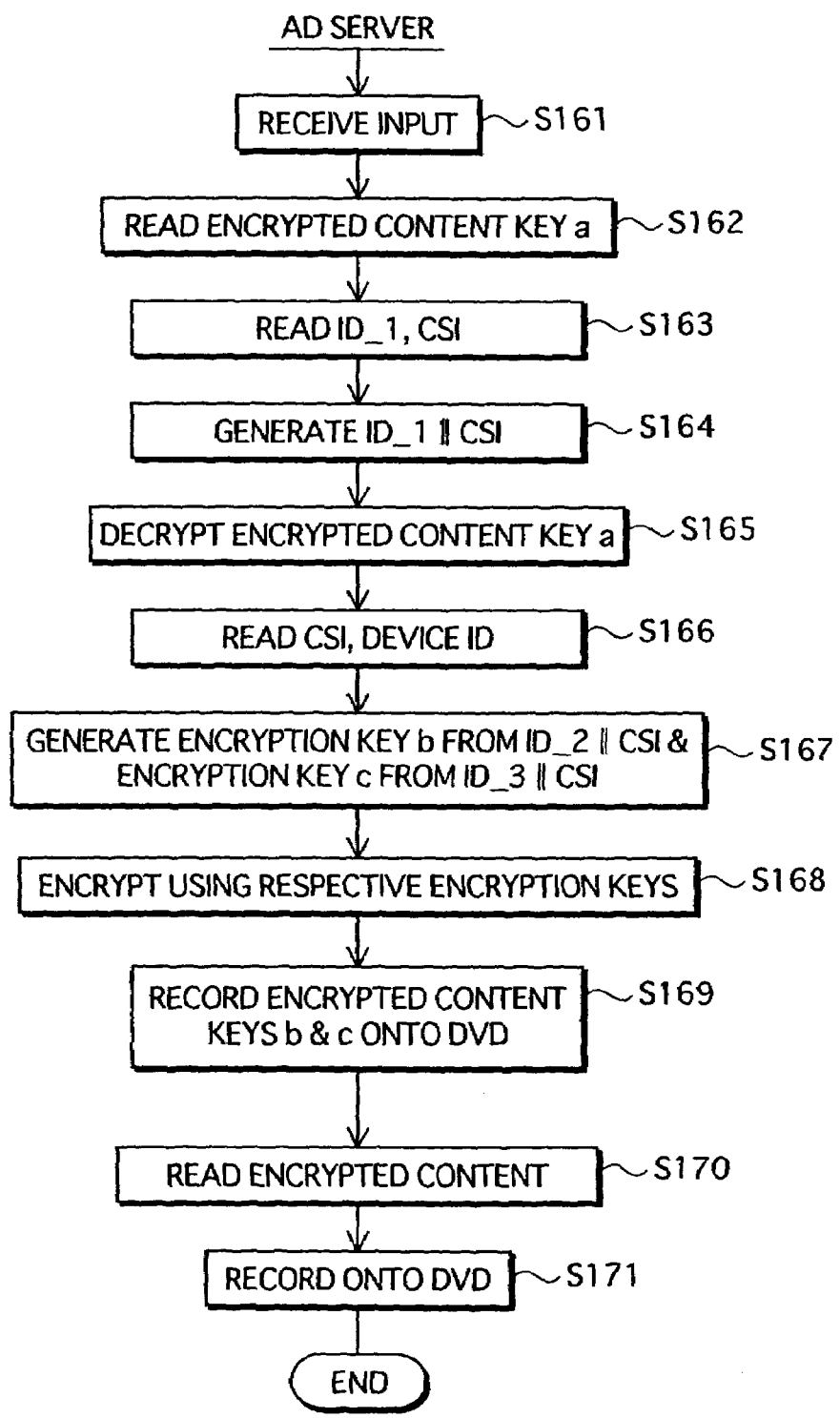
FIG. 14 is a flowchart showing operations to record a content onto a DVD.

Operation at a time of a content being written to DVD 500 by AD server 100 will now be described using FIG. 14.

AD server 100, on receipt from input unit 113 of an input instructing to record a content onto a DVD (step S161), reads encrypted content key a from content-key storage unit 118 (step S162), and reads ID_1 from ID storage unit 111 and CSI from CSI storage unit 108 (step S163). Decryption unit 117 concatenates the read ID_1 and CSI to generate a decryption key (step S164), and decrypts encrypted content key a using the generated decryption key to obtain a content key (step S165), and outputs the obtained content key to encryption unit 110. Encryption unit 110, on receipt of the content key, reads the device IDs from registration-information storage unit 106 and CSI from CSI storage unit 108 (step S166). Encryption unit 110 concatenates the read ID_2 and CSI to generate encryption key b and concatenates the read ID_3 and CSI to generate encryption key c (step S167). Encryption unit 110 encrypts the content key respectively using generated encryption keys b and c to generate encrypted content keys b and c (step S168). Control unit 101 writes encrypted content keys b and c to DVD 500 (step S169). Also, control unit 101 reads an encrypted content from content storage unit 109 (step S170), and writes the encrypted content to DVD 500 (step S171).

2.7 Operations for Playback Apparatus 200 Withdrawal

Figure 15:
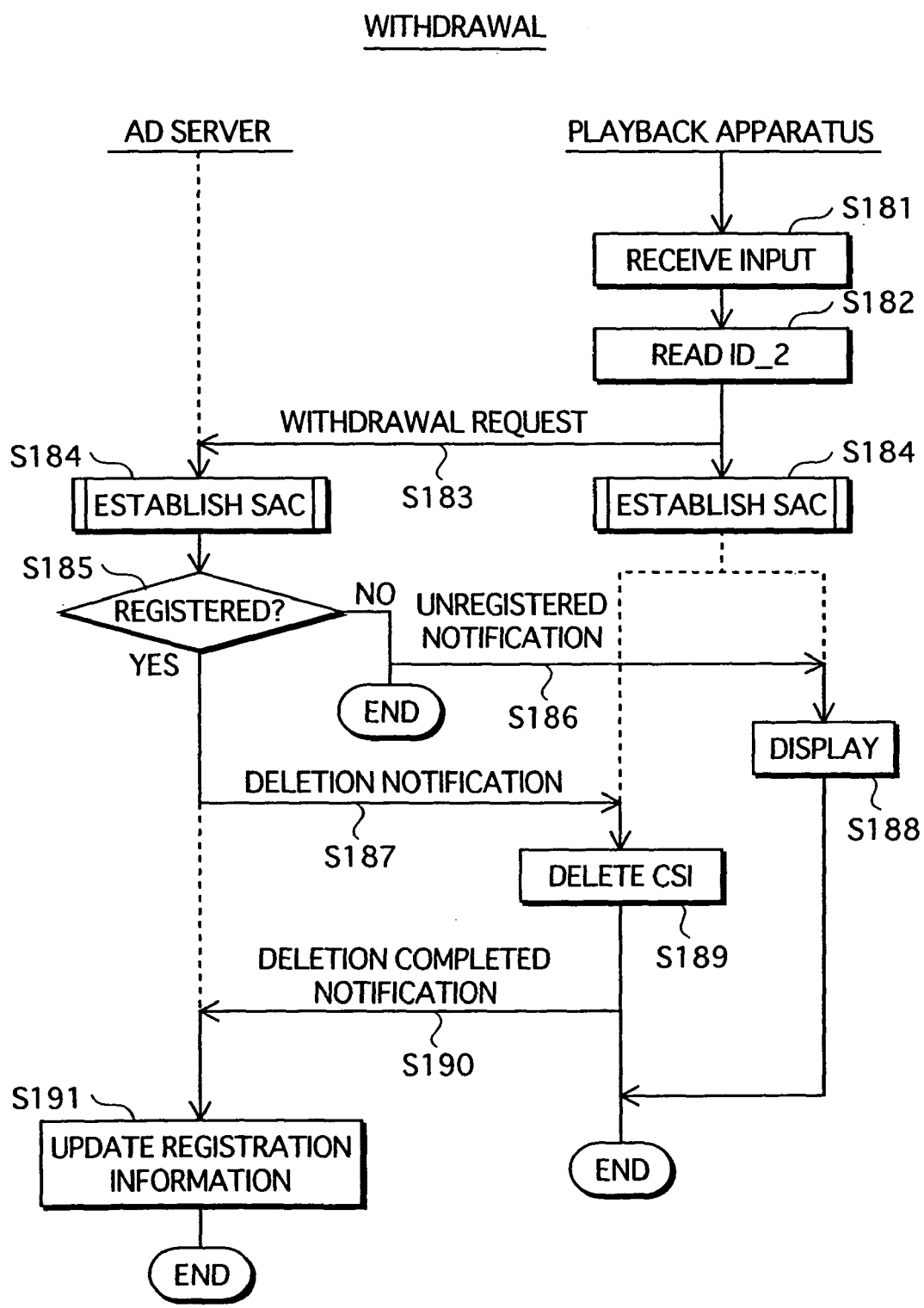
FIG. 15 is a flowchart showing operations to withdraw from AD server 100.

Operations at a time of playback apparatus 200 withdrawing from AD server 100 will now be described using FIG. 15.

Moreover, AD server 100 has IC card 400 connected thereto, and has already confirmed IC card 400.

Playback apparatus 200, on receipt from input unit 213 of an input indicating the withdrawal of playback apparatus 200 (step S181), reads ID_2 from ID storage unit 211 (step S182), and transmits a withdrawal request that includes ID_2 to AD server 100 (step S183).

AD server 100 and playback apparatus 200 conduct authentication and establish a SAC (step S184). At this time, authentication is conducted using CSI stored in respective CSI storage units.

AD server 100 judges whether playback apparatus 200 is registered as a device in the authorized domain of AD server 100 by the step S35 processing, and if unregistered (step S185=NO), transmits an unregistered notification to playback apparatus 200 (step S186). If registered (step S185=YES), AD server 100 transmits a CSI deletion notification to playback apparatus 200 (step S187).

Playback apparatus 200, on receipt of an unregistered notification, displays the fact that playback apparatus 200 is unregistered on monitor 322 (step S188) and ends the processing. On receipt of a deletion notification, playback apparatus 200 deletes CSI from CSI storage unit 208 (step S189). Also, playback apparatus 200 transmits a deletion-completed notification to AD server 100 (step S190).

AD server 100, on receipt of the deletion-completed notification, deletes ID_2 from DEVICE ID in the registration information, subtracts "1" from the registered number, and adds "1" to the remaining number (step S191).

3. Key Delivery Method Variation

Content key delivery in group formation/management system 1 is conducted after group formation. While restrictions are not placed on the delivery time of content keys in the above key delivery method, the following description relates to a key delivery method in which restrictions are placed on the delivery time of content keys.

Moreover, the system within group formation/management system 1 that conducts key delivery is referred to here as a key delivery system.

3.1 Structure of Key Delivery System 1000

A structure of key delivery system 1000 will now be described.

Figure 16:
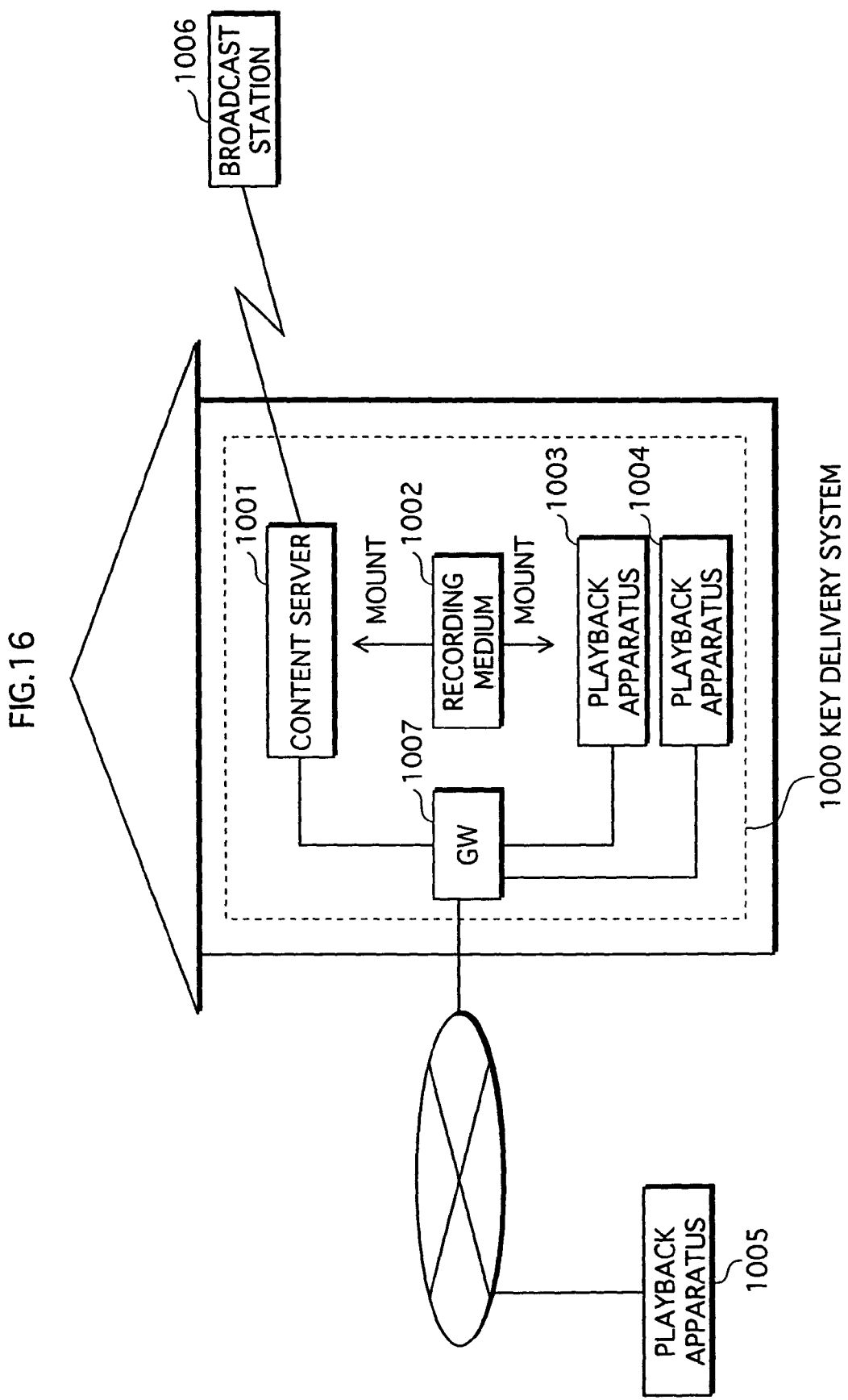
FIG. 16 is block diagram showing a structure of a key delivery system 1000.

As shown in FIG. 16, key delivery system 1000 is structured from a content server 1001, recording medium 1002, playback apparatus 1003, playback apparatus 1004 and gateway (GW) 1007, and forms a single home network. This home network is a group as referred to above. Here, a home network is a network system to which the same subnet is allotted.

GW 1007 is a device that enables communication over a network.

Content server 1001, playback apparatus 1003 and playback apparatus 1004 form a home network via GW 1007, and are also network-connected to a playback apparatus 1005 by the Internet.

Content server 1001 receives contents from a broadcast station 1006, or acquires contents from a content delivery site over the Internet (not depicted). Here, it is assumed in the following description that contents are acquired from broadcast station 1006. Content server 1001 generates content keys for encrypting acquired contents, encrypts received contents using the generated content keys to generate encrypted contents, and stores the encrypted contents in correspondence with information IDs, which are IDs identifying respective encrypted contents. Here, the method used to encrypt contents is common key encryption. This method involves the encryption/decryption of information using the same key and is, as one example, an Advanced Encryption Standard (AES) algorithm. Since AES algorithms are known technology, a description is omitted here.

Here, no restrictions are placed on the duplication of encrypted contents that have been stored. When encrypted contents are duplicated, the duplication is conducted in encrypted content/information ID groupings. Moreover, in the present embodiment, playback apparatus 1004 and recording medium 1002 store one or more encrypted contents that have been generated in content server 1001.

Also, content server 1001 restricts the use of encrypted contents by managing each content key in correspondence with how many content keys can be delivered (hereafter "deliverable number").

Content server 1001, playback apparatus 1004 and recording medium 1002 hold common secret information that is valid only within key delivery system 1000, and when a delivery request for a content key is received, content server 1001 uses this common secret information to conduct authentication with whichever of playback apparatus 1004 and recording medium 1002 sent the delivery request, and thereby confirms the legitimacy of content key delivery (i.e. judges whether the playback apparatus or recording medium forming the delivery-target is a legitimate device).

The authentication method used here is, as one example, a challenge/response handshake using zero knowledge proofs. Since this authentication method is known technology, a description is omitted here. Also, at a time of authentication, secret keys for sharing (referred to as "shared secret keys") are generated by a known key distribution technique, and the encryption/decryption of information is conducted using these shared secret keys.

If authentication is successful, content server 1001 delivers a content key to the source of the content key delivery request, and subtracts "1" from the deliverable number of the content key. At this time, when content key delivery is to be conducted to playback apparatus 1004, content server 1001 delivers first key information formed from a content key ID, a content key and a corresponding-information ID, and the first key information is stored in playback apparatus 1004. Here, a content key ID is an identifier identifying a content key, and a corresponding-information ID is an information ID corresponding to an encrypted content that has been encrypted using the content key. Also, when content key delivery is to be conducted to recording medium 1002, content server 1001 delivers second key information formed from a content key ID, a content key, a corresponding-information ID and a usage period, and the second key information is stored in recording medium 1002. Here, a usage period is information showing a time period during which content key usage is permitted, and is recorded using date-time. Since the content key ID, content key, and corresponding-information ID are the same as above, a description is omitted here.

Also, content server 1001 receives, over the Internet, a content key delivery request from playback apparatus 1005, which is outside of key delivery system 1000, and conducts authentication with playback apparatus 1005, although in this case authentication is not successful. The reason for this is that playback apparatus 1005, when it has an authentication unit, does not hold the common secret information that is valid only in key delivery system 1000, and so authentication with content server 1001 will always end up being unsuccessful. This is also the case when playback apparatus 1005 does not have an authentication unit, since authentication with content server 1001 cannot be conducted. Also, authentication with content server 1001 will again be unsuccessful for the same reasons in the case of a recording medium that does not hold the common secret information only valid in key delivery system 1000.

Content server 1001, on receipt of information indicating that content key usage has ended, adds "1" to the deliverable number of the content key.

Playback apparatus 1004 stores encrypted contents encrypted in content server 1001, and when an encrypted content is to be used, apparatus 1004 transmits a content key delivery request to content server 1001, conducts authentication with content server 1001, and if successful, acquires first key information from content server 1001, decrypts the encrypted content using the content key included in the first key information to generate a content, and plays the generated content. Once playback has ended, playback apparatus 1004 deletes the first key information, and transmits information to content server 1001 indicating that content key usage has ended.

Recording medium 1002 is a portable recording medium having an internal IC, an example of which is a memory card having an internal IC. Recording medium 1002 stores encrypted contents encrypted in content server 1001. When an encrypted content is to be used, recording medium 1002 is mounted in playback apparatus 1003. Playback apparatus 1003, at a time of encrypted content usage, judges whether second key information corresponding to the encrypted content to be used exists in recording medium 1002, and if it exists, playback apparatus 1003 judges whether the usage period included in the second key information has lapsed, and if it has lapsed, playback apparatus 1003 does not conduct playback. If judged to be within the usage period, playback apparatus 1003 decrypts the encrypted content using the content key included in the second key information to generate a content, and plays the generated content.

If judged that second key information, corresponding to the encrypted content to be used, does not exist in recording medium 1002, playback apparatus 1003 transmits a content key delivery request to content server 1001, authentication is conducted between content server 1001 and recording medium 1002, and if successful, playback apparatus 1003 acquires second key information from content server 1001, and stores the acquired second key information on recording medium 1002. Playback apparatus 1003 decrypts the encrypted content using the content key included in the second key information stored on recording medium 1002 to generate a content, and plays the generated content.

Also, content server 1001 is able to use encrypted contents stored on recording medium 1002 using the same operations as playback apparatus 1003. Furthermore, content server 1001 is also able to use encrypted contents stored in content server 1001. In this case, authentication is not conducted at a time of acquiring content keys.

As such, key delivery system 1000 is a system that manages content keys in content server 1001, and restricts the use of content keys within key delivery system 1000 (i.e. restricts the use of contents).

3.2 Structure of Content Server 1001

The structure of content server 1001 will now be described.

Figure 17:
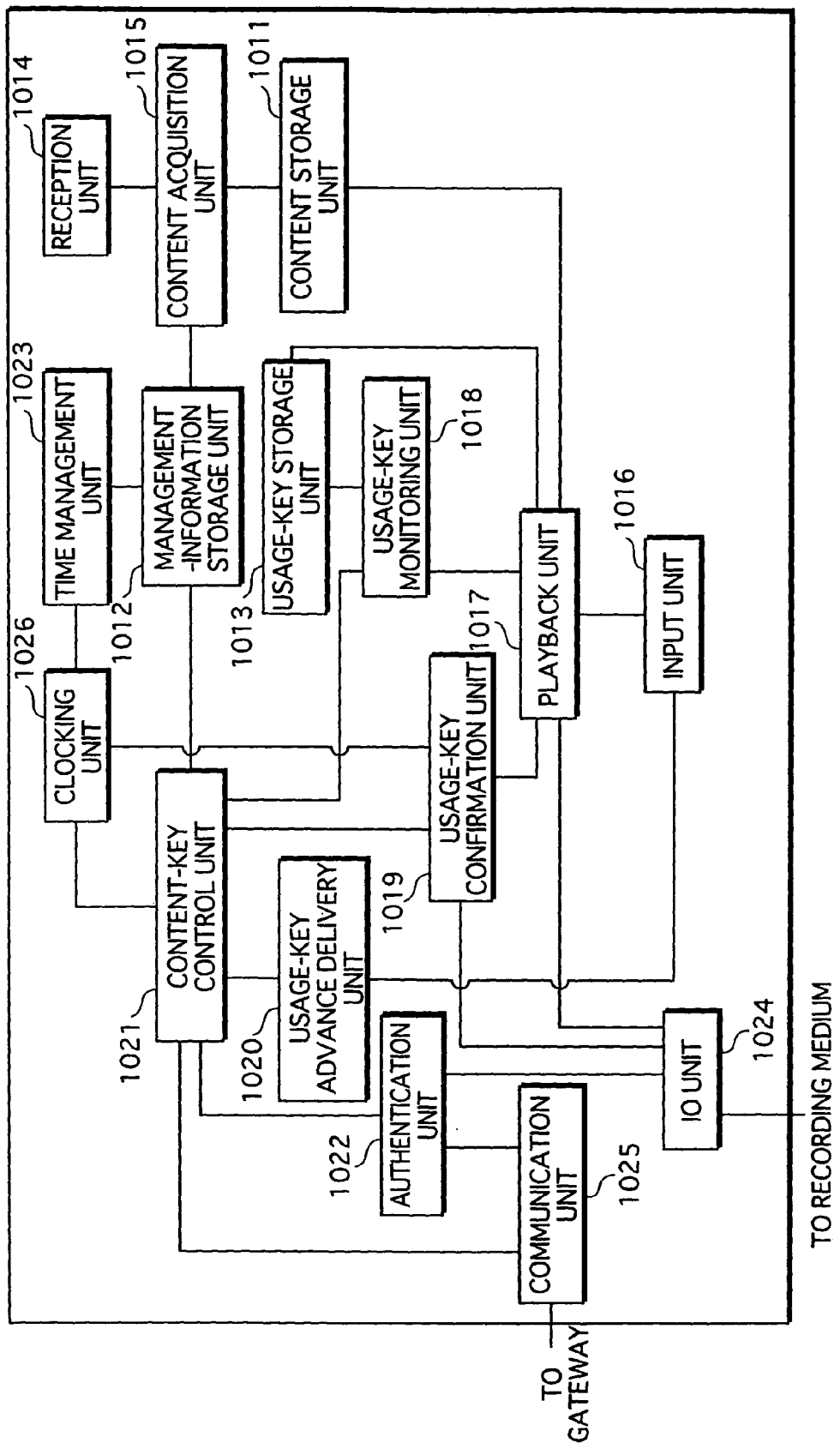
FIG. 17 is block diagram showing a structure of a content server 1001.

As shown in FIG. 17, content server 1001 is structured from content storage unit 1011, a management-information storage unit 1012, a usage-key storage unit 1013, a reception unit 1014, a content acquisition unit 1015, an input unit 1016, a playback unit 1017, a usage-key monitoring unit 1018, a usage-key confirmation unit 1019, a usage-key advance delivery unit 1020, a content-key control unit 1024, an authentication unit 1022, a time management unit 1023, a input/output (IO) unit 1024, a communication unit 1025, and a clocking unit 1026.

Content server 1001 is, specifically, a computer system structured from microprocessor, a ROM, a RAM, a hard disk unit, a network interface and the like. A computer program is stored on the ROM or the hard disk unit. Content server 1001 carries out functions as a result of the microprocessor operating in accordance with the computer program.

(1) Content Storage Unit 1011

Content storage unit 1011 includes an area for storing encrypted contents in correspondence with information IDs, an example of which is shown in FIG. 18.

(2) Management-Information Storage Unit 1012

Figure 19:
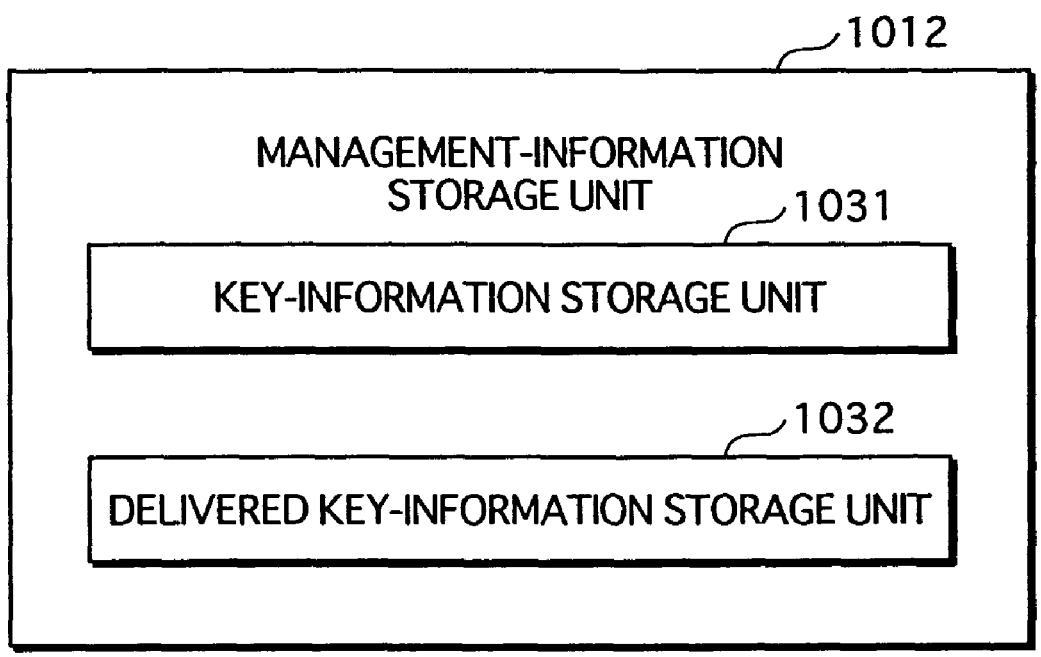
FIG. 19 is block diagram showing a structure of a management information storage unit 1012.

Management-information storage unit 1012 is tamper resistant, and as shown in FIG. 19, includes a key-information storage unit 1031 and a delivered key-information storage unit 1032.

Key-information storage unit 1031 has a key information table T1001, an example of which is shown in FIG. 20. Key information table T1001 includes an area for storing one or more groupings that are each formed from a content key ID, a content key, a corresponding-information ID, a total number, a remaining number, and a time period restriction. Moreover, each of these groupings is referred to collectively as content key information.

A content key ID is an identifier identifying a content key.

A content key is a key used in content encryption, and a different content key is used per content.

A corresponding-information ID is an information ID corresponding to an encrypted content encrypted using a content key. As such, it is possible to correspond content keys with encrypted contents stored in content storage unit 1011.

A "total number" is the sum of the current deliverable number of a content key and the already delivered number of the content key, and a "remaining number" is the current deliverable number of the content key.

A time period restriction records a time period during which a delivered content key can be used. The time period may be recorded in hour-units, minute-units, second-units, day-units, or a combination of these. Here, the time period is recorded in hour-units.

Figure 21:
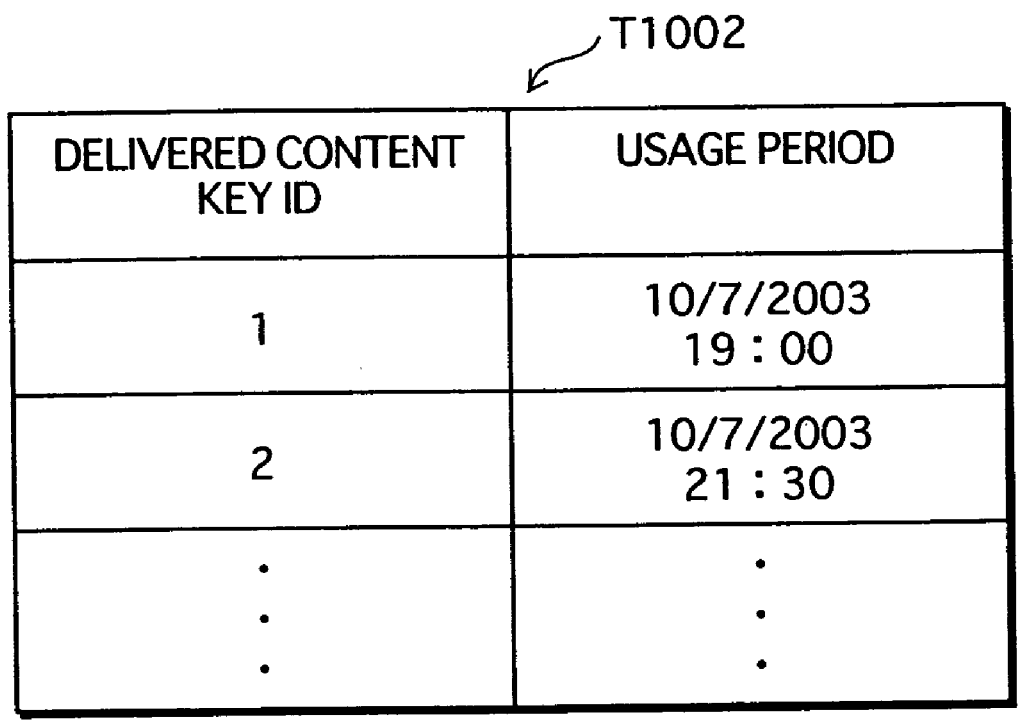
FIG. 21 shows a data structure of a delivered key information table T1002 included in a delivered key-information storage unit 1032.

Delivered key-information storage unit 1032 has a delivered key information table T1002, an example of which is shown in FIG. 21.

Delivered key information table T1002 includes an area for storing one or more groupings that are each formed from a delivered content key ID and a usage period. Moreover, each of these groupings is referred to collectively as content key management information.

A delivered content key ID is a content key ID corresponding to a content key delivered to recording medium 1002.

A usage period shows a time period during which a delivered content key is usable, and is recorded in day-hour-minutes. Moreover, the usage period may be recorded in day-hour-minute-seconds.

(3) Usage-Key Storage Unit 1013

Usage-key storage unit 1013 is tamper-resistant, and stores a content key used in decrypting an encrypted content for use in content server 1001, to generate a content.

(4) Clocking Unit 1026

Clocking unit 1026 clocks time.

(5) Reception Unit 1014

Reception unit 1014 receives contents encrypted for use in broadcasts, and outputs the encrypted contents to content acquisition unit 1015.

(6) Content Acquisition Unit 1015

Content acquisition unit 1015 prestores decryption keys for decrypting contents encrypted for broadcast usage, and total numbers/time period restrictions relating to content keys deliverable to key delivery system 1000.

Content acquisition unit 1015, on receipt from reception unit 1014 of a content encrypted for broadcast usage, decrypts the encrypted content using a prestored decryption key to generate a content. Next, unit 1015 generates a content key using a random number, and encrypts the content using the content key to generate an encrypted content. Unit 1015 calculates an information ID identifying the encrypted content, and stores the calculated information ID and the encrypted content in content storage unit 1011.

Furthermore, content acquisition unit 1015 calculates a content key ID identifying the generated content key, generates content key information using the calculated content key ID and information ID, the generated content key and the prestored total number and time period restriction, and writes the generated content key information into key information table T1001. At this point in time, the remaining number is the same as the total number.

(7) Input Unit 1016

Input unit 1016 receives information relating to content usage, and outputs the received information to playback unit 1017 or usage-key advance delivery unit 1020.

Specifically, input unit 1016 receives, from a user, playback information that includes content storage target information showing whether the storage target of an encrypted content for use is recording medium 1002, and an information ID corresponding to the encrypted content, and outputs the received playback information to playback unit 1017. Here, "0" and "1" are used as content storage target information. "0" shows that the storage target of an encrypted content for use is recording medium 1002. "1" shows that the storage target is other than recording medium 1002. In the given example, "1" shows that the storage target of the encrypted content is content server 1001.

Input unit 1016, on receipt of playback stoppage information from a user indicating to stop content playback, outputs the received playback stoppage information to playback unit 1017.

Also, input unit 1016 receives, from a user, advance request information requesting advance delivery of a content key to recording medium 1002, and outputs the received advance request information to usage-key confirmation unit 1019. Here, advance request information is information that includes the information ID of an encrypted content corresponding to a content key whose advance delivery is requested.

(8) Playback Unit 1017

Playback unit 1017 decrypts encrypted contents stored in content storage unit 1011 to generate contents and play the generated contents, or decrypt contents stored on recording medium 1002 to generate contents and plays the generated contents.

Specifically, playback unit 1017 receives playback information from input unit 1016, and judges whether the storage target of an encrypted content for use is recording medium 1002, using content storage target information included in the received playback information.

When the storage target of the encrypted content is judged to be recording medium 1002, playback unit 1017 outputs the received playback information to usage-key confirmation unit 1019.

When judged that the storage target of the encrypted content is other than recording medium 1002 (i.e. content server 1001), playback unit 1017 outputs the received playback information to usage-key monitoring unit 1018.

Playback unit 1017 receives, from usage-key monitoring unit 1018 or usage-key confirmation unit 1019, key-acquisition completed information that includes storage target information showing whether the storage target of a content key is recording medium 1002. Here, "0" and "1" are used as key storage target information. "0" shows that the storage target of a content key is recording medium 1002. "1" shows that the storage target is other than recording medium 1002. In the given example, "1" shows that the content key storage target is content server 1001.

Playback unit 1017 judges whether the content key storage target is recording medium 1002, using the key storage target information included in the received key-acquisition completed information.

When the content key storage target is judged to be recording medium 1002, playback unit 1017 acquires a content key from recording medium 1002 via IO unit 1024, and furthermore acquires, from recording medium 1002 via IO unit 1024, an encrypted content corresponding to the information ID included in the playback information received from input unit 1016, decrypts the encrypted content using the acquired content key to generate a content, and plays the generated content.

When the content key storage target is judged to be other than recording medium 1002 (i.e. content server 1001), playback unit 1017 acquires the content key included in the first key information stored in usage-key storage unit 1013, and furthermore acquires, from content storage unit 1011, an encrypted content corresponding to the information ID included in the playback information received from input unit 1016, decrypts the encrypted content using the received content key to generate a content, and plays the generated content.

Also, playback unit 1017, on receipt from input unit 1016 of playback stoppage information, stops playback of the content currently being played.

(9) Usage-Key Monitoring Unit 1018

Usage-key monitoring unit 1018 stores, in usage-key storage unit 1013, first key information used in playback unit 1017 when an encrypted content stored in content storage unit 1011 is to be used, and deletes stored first key information when usage of the encrypted content ends.

Specifically, usage-key monitoring unit 1018, on receipt of playback information from playback unit 1017, generates first request information, and outputs the generated first request information to content-key control unit 1021. Here, first request information is information indicating to store a content key in usage-key storage unit 1013, and includes the information ID included in the playback information.

Usage-key monitoring unit 1018 receives first key information from content-key control unit 1021, stores the received first key information in usage-key storage unit 1013, generates key-acquisition completed information in which the key storage target information is "1", and outputs the generated key-acquisition completed information to playback unit 1017.

Furthermore, usage-key monitoring unit 1018 monitors the operations of playback unit 1017, and when detecting the end of content playback or the end of operations by playback unit 1017 due to a content playback stoppage, deletes the first key information stored in usage-key storage unit 1013, generates key-usage ended information showing that content key usage has ended, and outputs the generated key-usage ended information to content-key control unit 1021. Here, key-usage ended information includes the information ID corresponding to the encrypted content that was used.

(10) Usage-Key Confirmation Unit 1019

Usage-key confirmation unit 1019 confirms the usage period of content keys stored on recording medium 1002, and records/deletes content keys.

Specifically, usage-key confirmation unit 1019, on receipt of playback information from playback unit 1017, judges whether there exists second key information corresponding to the information ID included in the received playback information.

If judged that corresponding second key information exists, usage-key confirmation unit 1019 acquires the present date-time from clocking unit 1026, and judges whether the usage period of the content key included in the second key information has lapsed. If judged to be within the usage period, unit 1019 generates key-acquisition completed information in which the key storage information is "0", and outputs the generated key-acquisition completed information to playback unit 1017. If judged that the usage period has lapsed, unit 1019 deletes the second key information and notifies usage-failure information to the user, showing that usage of the content key is not possible.

If judged that corresponding second key information does not exist, usage-key confirmation unit 1019 generates second request information, and outputs the generated second request information to content-key control unit 1021. Also, unit 1019 outputs, to recording medium 1002 via IO unit 1024, information indicating that playback information has been received. Here, second request information is information indicating to output a content key to recording medium 1002, and includes the information ID included in the playback information.

Usage-key confirmation unit 1019 receives encrypted second key information from content-key control unit 1021, and outputs the encrypted second key information to recording medium 1002 via IO unit 1024. Furthermore, unit 1019 generates key-acquisition completed information in which the key storage information is "0", and outputs the generated key-acquisition completed information to playback unit 1017.

(11) Usage-Key Advance Delivery Unit 1020

Usage-key advance delivery unit 1020 conducts advance delivery of content keys to recording medium 1002.

Specifically, usage-key advance delivery unit 1020, on receipt of advance request information, outputs the received advance request information to content-key control unit 1021, and furthermore outputs, to recording medium 1002 via IO unit 1024, information indicating that the advance request information has been received.

Usage-key advance delivery unit 1020 receives, from content-key control unit 1021, encrypted second key information, and outputs the encrypted second key information to recording medium 1002 via IO unit 1024.

(12) Content-Key Control Unit 1021

Content-key control unit 1021 manages content keys to be delivered.

Specifically, content-key control unit 1021 receives first request information, second request information, third request information indicating to conduct content key delivery using a network, or advance request information. Furthermore, unit 1021 receives key-usage ended information from usage-key monitoring unit 1018, or from playback apparatus 1004 via communication unit 1025.

Here, the third request information includes a usage classification and an information ID corresponding to an encrypted content. Also, in the usage classification is recorded either information showing "playback apparatus" or information showing "recording medium". When the usage classification is information showing "playback apparatus", this shows that a content for use is recorded on a playback apparatus, and when the usage classification is information showing "recording medium", this shows that a content for use is recorded onto a recording medium. Moreover, content-key control unit 1021 receives the third request information from playback apparatus 1005.

Content-key control unit 1021 judges whether the received information is key-usage ended information.

If judged to not be key-usage ended information, content-key control unit 1021 further judges whether the received information is first request information.

If judged to be first request information, content-key control unit 1021 acquires, from key information table T1001 using the information ID in the first request information, content key information that includes a corresponding-information ID matching the information ID. Unit 1021 judges whether the remaining number in the acquired content key information is "0". If judged to be "0", unit 1021 notifies none-remaining information to the user indicating that the remaining deliverable number of the content key is "0". If judged to not be "0", unit 1021 generates first key information from the acquired content key information, and outputs the generated first key information to usage-key monitoring unit 1018. Furthermore, unit 1021 subtracts "1" from the remaining number in the acquired content key information to update the content key information, and writes the updated content key information into key information table T1001.

If judged to not be first request information, content-key control unit 1021 outputs authentication identifying information to authentication unit 1022 showing that the received information is one of second request information, third request information whose usage classification is "playback apparatus", third request information whose usage classification is "recording medium", and advance request information.

Content-key control unit 1021, on receipt of authentication-succeeded information from authentication unit 1022 indicating that authentication was successful, acquires and delivers a content key, and updates key information table T1001, as described below.

Content-key control unit 1021 judges whether the received information is one of second request information, third request information, and advance request information.

If judged to be second request information, content-key control unit 1021, the same as with first request information, acquires content key information using the information ID included in the second request information, and judges whether the remaining number in the acquired content key information is "0". If judged to be "0", unit 1021 notifies none-remaining information to the user indicating that the remaining deliverable number of the content key is "0". If judged to not be "0", unit 1021 furthermore acquires the present date-time from clocking unit 1026, and calculates a usage period using the acquired date-time and the time period restriction information included in the content key information. Unit 1021 generates second key information from the calculated usage period and the acquired content key information, encrypts the generated second key information using the shared secret key generated at the time of authentication, and outputs the encrypted second key information to usage-key confirmation unit 1019. Furthermore, unit 1021 subtracts "1" from the remaining number in the acquired content key information to update the content key information, and writes the updated content key information into key information table T1001. Also, unit 1021 generates content key management information from the calculated usage period and the acquired content key information, and writes the generated content key management information into delivered key information table T1002.

If judged that the received information is third request information, content-key control unit 1021, the same as with first request information, acquires content key information using the information ID included in the third request information, and judges whether the remaining number in the acquired content key information is "0". If judged to be "0", unit 1021 notifies none-remaining information to the user indicating that the remaining deliverable number of the content key is "0". If judged to not be "0", unit 1021 furthermore judges whether the usage classification included in the third request information shows "playback apparatus" or "recording medium".

If judged that the usage classification shows "playback apparatus", content-key control unit 1021 generates first key information, encrypts the generated first key information using the shared secret key generated at the time of authentication, and outputs the encrypted first key information to playback apparatus 1004 via communication unit 1025. Furthermore, unit 1021 subtracts "1" from the remaining number in the acquired content key information to update the content key information, and writes the updated content key information into key information table T1001.

If judged that the usage classification shows "recording medium", content-key control unit 1021 furthermore acquires the present date-time from clocking unit 1026, calculates a usage period using the acquired date-time and time period restriction information included in the content key information, generates second key information from the calculated usage period and the acquired content key information, encrypts the generated second key information using the shared secret key generated at the time of authentication, and outputs the encrypted second key information via communication unit 1025 to recording medium 1002 mounted in playback apparatus 1003. Furthermore, unit 1021 subtracts "1" from the remaining number in the acquired content key information to update the content key information, and writes the updated content key information into key information table T1001. Also, unit 1021 generates content key management information from the calculated usage period and the acquired content key information, and writes the generated content key management information into delivered key information table T1002.

If judged that the received information is advance request information, content-key control unit 1021 acquires, from key information table T1001 using the information ID in the advance request information, content key information that includes a corresponding-information ID matching the information ID, and judges whether the remaining number in the acquired content key information is "0". If judged to be "0", unit 1021 notifies none-remaining information to the user indicating that the remaining deliverable number of the content key is "0". If judged to not be "0", unit 1021 furthermore acquires the present date-time from clocking unit 1026, calculates a usage period using the acquired date-time and time period restriction information included in the content key information, generates second key information from the calculated usage period and the acquired content key information, encrypts the generated second key information using the shared secret key generated at the time of authentication, and outputs the encrypted second key information to usage-key advance delivery unit 1020. Furthermore, unit 1021 subtracts "1" from the remaining number in the acquired content key information to update the content key information, and writes the updated content key information into key information table T1001. Also, unit 1021 generates content key management information from the calculated usage period and the acquired content key information, and writes the generated content key management information into delivered key information table T1002.

Content-key control unit 1021, when judged that the received information is key-usage ended information, acquires, from key information table T1001 using the information ID included in the received key-usage ended information, content key information that includes a corresponding-information ID matching the information ID. Unit 1021 adds "1" to the remaining number in the acquired content key information to update the content key information, and writes the updated content key information into key information table T1001.

(13) Authentication Unit 1022

Authentication unit 1022 prestores common secret information, and conducts authentication with playback apparatus 1004, and with recording medium 1002 when mounted in either content server 1001 or playback apparatus 1003.

Specifically, authentication unit 1022, on receipt of authentication identifying information from content-key control unit 1021, conducts authentication using the received authentication identifying information, as described below.

If judged that the authentication identifying information shows second request information or advance request information, authentication unit 1022 conducts authentication mutually with recording medium 1002 mounted in content server 1001.

If judged that the authentication identifying information shows third request information whose usage classification is "playback apparatus", authentication unit 1022 conducts authentication mutually with playback apparatus 1004, and if judged to show third request information whose usage classification is "recording medium", unit 1022 conducts authentication mutually with recording medium 1002 mounted in playback apparatus 1003.

Moreover, authentication unit 1022 generates a shared secret key when commencing the authentication, encrypts information for use in the authentication using the shared secret key, transmits the encrypted information to playback apparatus 1004 or recording medium 1002, and also receives encrypted information from playback apparatus 1004 or recording medium 1002, decrypts the encrypted information, and uses the decrypted information in the authentication.

Authentication unit 1022 judges whether authentication was successful, and if successful, outputs authentication-succeeded information to content-key control unit 1021, and if unsuccessful, notifies authentication-failed information to the user indicating that authentication was not successful.

(14) Time Management Unit 1023

Time management unit 1023 manages usage periods corresponding to delivered content key IDs recorded in delivered key information table T1002, using clocking unit 1026.

Specifically, time management unit 1023 judges using clocking unit 1026 whether usage periods corresponding to delivered content key IDs recorded in delivered key information table T1002 have lapsed. If judged that a usage period has lapsed, unit 1023 deletes the corresponding content key management information, acquires, from key information table T1001, content key information that matches the delivered content key ID that has been deleted, adds "1" to the remaining number in the acquired content key information to update the content key information, and writes the updated content key information into key information table T1001.

(15) IO Unit 1024

IO unit 1024 receives information from recording medium 1002 mounted in content server 1001, and outputs the received information to playback unit 1017, usage-key confirmation unit 1019, usage-key advance delivery unit 1020, and authentication unit 1022.

Also, IO unit 1024 outputs information received from playback unit 1017, usage-key confirmation unit 1019, usage-key advance delivery unit 1020, and authentication unit 1022 to recording medium 1002 mounted in content server 1001.

(16) Communication Unit 1025

Communication unit 1025 transmits information received from content-key control unit 1021 to playback apparatus 1004 or to recording medium 1002 mounted in playback apparatus 1003, and transmits information received from authentication unit 1022 to playback apparatus 1004, recording medium 1002 mounted in playback apparatus 1003, or playback apparatus 1005.

Also, communication unit 1025 outputs information received from playback apparatus 1004, recording medium 1002 mounted in playback apparatus 1003, or playback apparatus 1005 to content-key control unit 1021 or authentication unit 1022.

3.3 Structure of Recording Medium 1002

The structure of recording medium 1002 will now be described.

Figure 22:
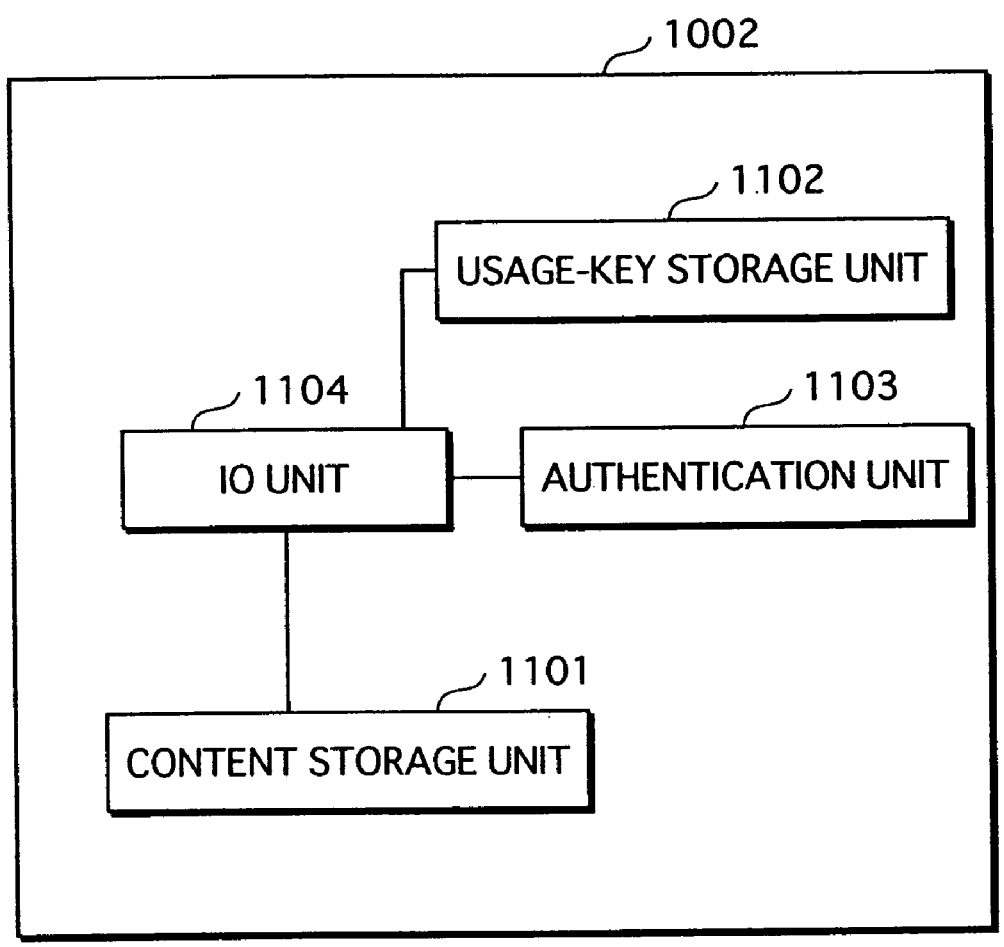
FIG. 22 is block diagram showing a structure of a recording medium 1002.

As shown in FIG. 22, recording medium 1002 is structured from a content storage unit 1101, a usage-key storage unit 1102, an authentication unit 1103, and an input/output (IO) unit 1104.

Recording medium 1002 is, specifically, a computer system structured from microprocessor, a ROM, a RAM, and the like. A computer program is stored on the ROM. recording medium 1002 carries out functions as a result of the microprocessor operating in accordance with the computer program.

(1) Content Storage Unit 1101

Content storage unit 1101 includes an area the same as content storage unit 1011 in content server 1001.

(2) Usage-Key Storage Unit 1102

Figure 23:
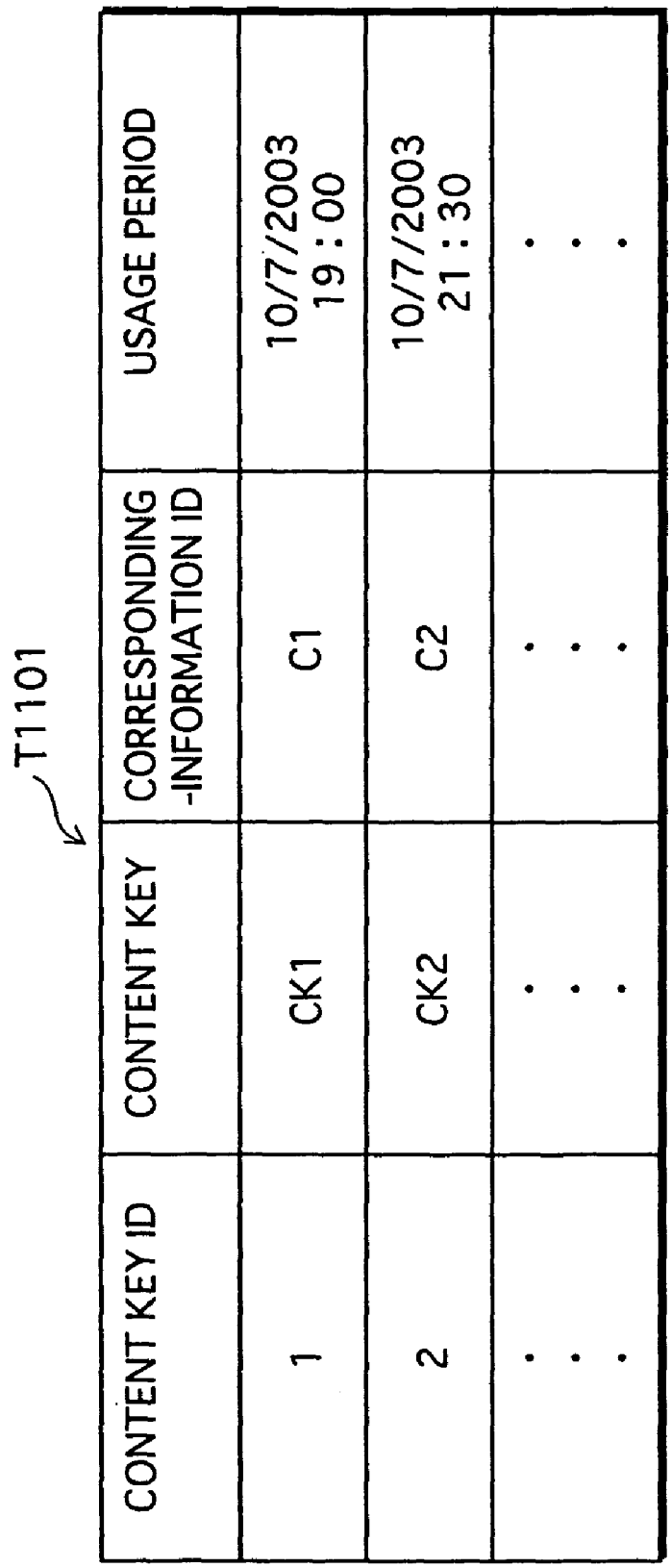
FIG. 23 shows a data structure of a delivered content key table T1001 included in a usage-key storage unit 1102.

Usage-key storage unit 1102 is tamper-resistant, and includes a delivered content key table T1101, an example of which is shown in FIG. 23.

Since the various items in delivered content key table T1101 are the same as the data structuring the second key information, a description is omitted here.

(3) Authentication Unit 1103

Authentication unit 1103 prestores common secret information, and conducts authentication with authentication unit 1022 included in content server 1001.

Specifically, authentication unit 1103 conducts authentication mutually with content server 1001 by receiving, from content server 1001 via IO unit 1104, information indicating that playback information or advance request information has been received, or by receiving, from playback apparatus 1003 via IO unit 1104, information indicating that playback information has been received.

Authentication unit 1103 judges whether authentication was successful, and if successful, outputs authentication-succeeded information to playback apparatus 1003 via IO unit 1104, and if not successful, notifies authentication-failed information to the user.

Also, authentication unit 1103, the same as authentication unit 1022 in content server 1001, generates common secret information when commencing the authentication. Unit 1103 encrypts information for use in the authentication, using the generated common secret information, transmits the encrypted information to content server 1001, and also receives encrypted information from content server 1001, decrypts the encrypted information, and used the decrypted information in the authentication.

(4) IO Unit 1104

IO unit 1104 receives information from an apparatus in which recording medium 1002 is mounted. Unit 1104 judges whether the received information is information relating to authentication, an encrypted content, or encrypted second key information.

If judged to be information relating to authentication, IO unit 1104 outputs the received information to authentication unit 1103, and if judged to be an encrypted content, unit 1104 writes the encrypted content into content storage unit 1101. If judged to be encrypted second key information, unit 1104 decrypts the encrypted second key information using the common secret information generated at the time of authentication to generate second key information, and writes the generated second key information into usage-key storage unit 1102.

Also, IO unit 1104 outputs information received from content storage unit 1101, usage-key storage unit 1102 or authentication unit 1103 to the apparatus in which recording medium 1002 is mounted.

3.4 Structure of Playback Apparatus 1003

The structure of playback apparatus 1003 will now be described.

Figure 24:
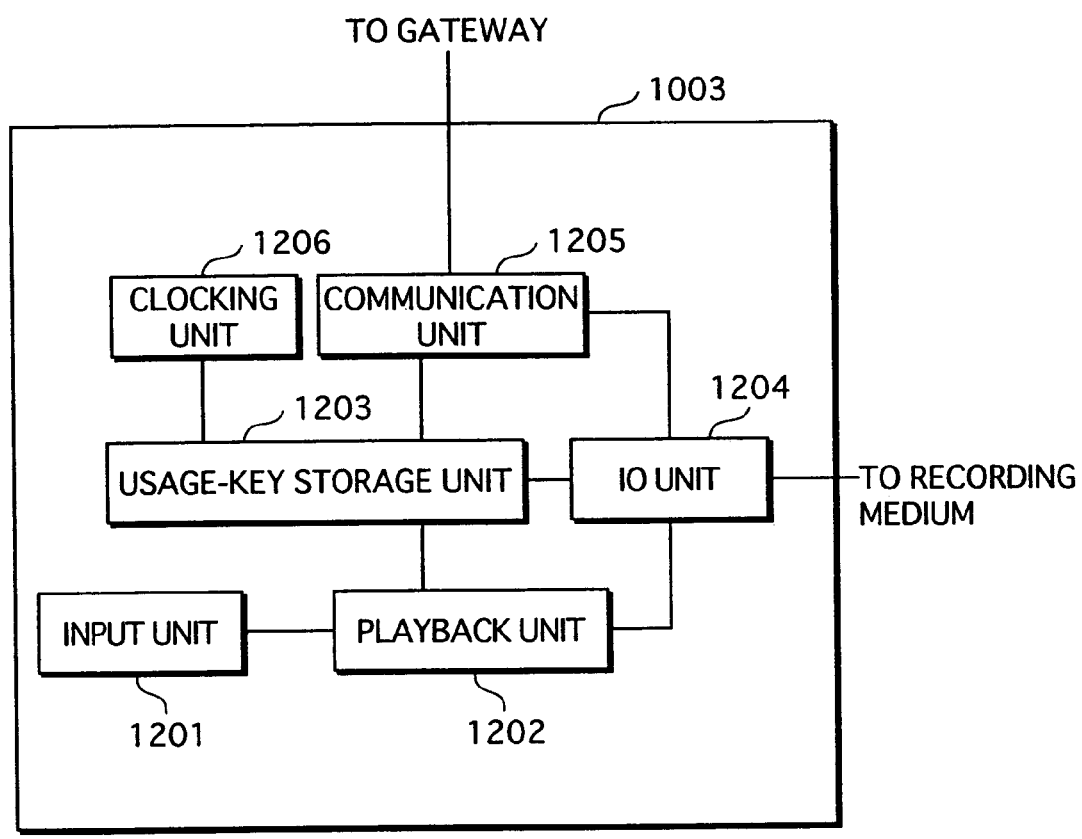
FIG. 24 is block diagram showing a structure of a playback apparatus 1003.

As shown in FIG. 24, playback apparatus 1003 includes an input unit 1201, a playback unit 1202, a usage-key confirmation unit 1203, an input/output (IO) unit 1204, a communication unit 1205, and a clocking unit 1206.

Playback apparatus 1003 is, specifically, a computer system structured from a microprocessor, a ROM, a RAM, a hard disk unit, a network interface, and the like. A computer program is stored on the ROM or the hard disk unit. Playback apparatus 1003 carries out functions as a result of the microprocessor operating in accordance with the computer program.

(1) Clocking Unit 1206

Clocking unit 1206 clocks date-time.

(2) Input Unit 1201

Input unit 1201 receives information relating to content usage, and outputs the received information to playback unit 1202.

Specifically, input unit 1201 receives playback information from a user, and outputs the received playback information to playback unit 1202. Here, the content storage target information included in the playback information is always "0".

Input unit 1201, on receipt from a user of playback stoppage information indicating to stop content playback, outputs the received playback stoppage information to playback unit 1202.

(3) Playback Unit 1202

Playback unit 1202 decrypts encrypted contents stored on recording medium 1002 to generate contents, and plays the generated contents.

Specifically, playback unit 1202, on receipt from input unit 1201 of playback information, outputs the received playback information to usage-key confirmation unit 1203.

Playback unit 1202, on receipt of key-acquisition completed information from usage-key confirmation unit 1203, acquires a content key from recording medium 1002, and furthermore acquires, from content storage unit 1101 in recording medium 1002, an encrypted content corresponding to the information ID included in the playback information received from input unit 1201, decrypts the encrypted content using the acquired content key to generate content, and plays the generated content.

Also, playback unit 1202, on receipt of playback stoppage information from input unit 1201, stops playback of the content currently being played.

(4) Usage-Key Confirmation Unit 1203

Usage-key confirmation unit 1203 confirms the usage periods of content keys stored in recording medium 1002, and records/deletes content keys.

Specifically, usage-key confirmation unit 1203, on receipt of playback information from playback unit 1202, judges whether there exists second key information in recording medium 1002 that corresponds to the information ID included in the received playback information.

If judged that corresponding second key information exists, usage-key confirmation unit 1203 acquires the present date-time from clocking unit 1206, and judges whether the usage period of the content key included in the second key information has lapsed. If judged to be within the usage period, unit 1203 generates key-acquisition completed information in which the key storage target information is "0", and outputs the generated key-acquisition completed information to playback unit 1202. If judged that the usage period has lapsed, unit 1203 deletes the second key information, and notifies usage-failure information to the user showing that content key usage is not possible.

If judged that corresponding second key information does not exist, usage-key confirmation unit 1203 generates third request information that includes a usage classification showing "recording medium" and the information ID from the received playback information, and outputs the generated third request information to content server 1001. Also, unit 1203 outputs, to recording medium 1002 via IO unit 1024, information indicating that the playback information has been received.

Usage-key confirmation unit 1203, on receipt of authentication-succeeded information from authentication unit 1103 via IO unit 1204, furthermore receives encrypted second key information from content server 1001 via communication unit 1205, and outputs the encrypted second key information to recording medium 1002 via IO unit 1204. Furthermore, unit 1203 generates key-acquisition completed information in which the key storage target information is "0", and outputs the generated key-acquisition completed information to playback unit 1202.

(5) IO Unit 1204

IO unit 1204 outputs information received from recording medium 1002 to playback unit 1202, usage-key confirmation unit 1203, or communication unit 1205.

Also, IO unit 1204 outputs information received from playback unit 1202, usage-key confirmation unit 1203, or communication unit 1205 to recording medium 1002.

(6) Communication Unit 1205

Communication unit 1205 outputs information received from content server 1001 to usage-key confirmation unit 1203 or IO unit 1204.

Also, communication unit 1205 transmits information received from usage-key confirmation unit 1203 and IO unit 1204 to content server 1001.

3.5 Structure of Playback Apparatus 1004

The structure of playback apparatus 1004 will now be described.

Figure 25:
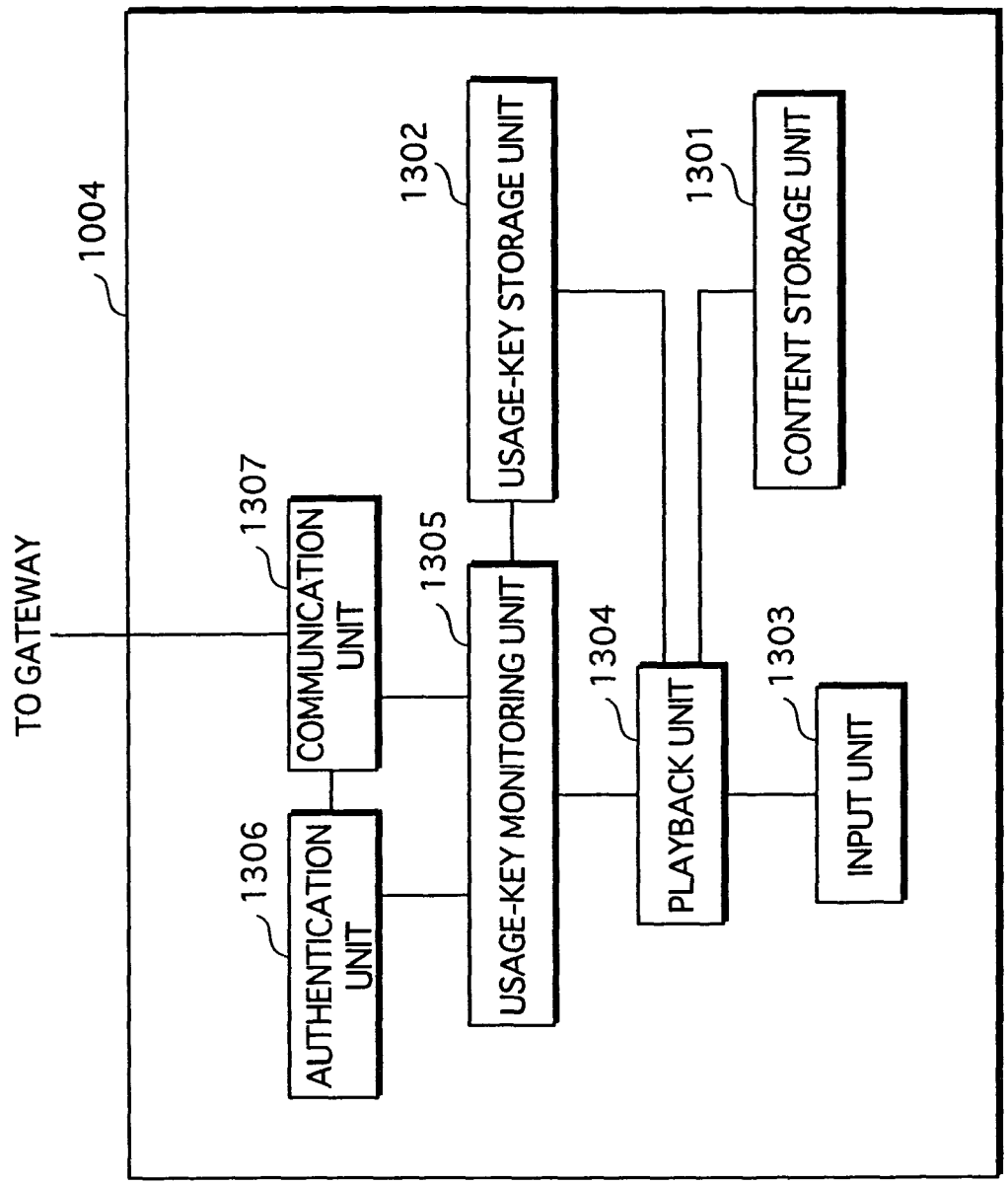
FIG. 25 is block diagram showing a structure of a playback apparatus 1004.

As shown in FIG. 25, playback apparatus 1004 is structure from a content storage unit 1301, a usage-key storage unit 1302, an input unit 1303, a playback unit 1304, a usage-key monitoring unit 1305, an authentication unit 1306, and a communication unit 1307.

Playback apparatus 1004 is, specifically, a computer system structured from a microprocessor, a ROM, a RAM, a hard disk unit, a network interface, and the like. A computer program is stored on the ROM or the hard disk unit. Playback apparatus 1004 carries out functions as a result of the microprocessor operating in accordance with the computer program.

(1) Content Storage Unit 1301

Content storage unit 1301 includes an area the same as content storage unit 1011 in content server 1001.

(2) Usage-Key Storage Unit 1302

Usage-key storage unit 1302 is tamper-resistant, and stores content keys used in decrypting encrypted content for use in playback apparatus 1004, to generate contents.

(3) Input Unit 1303

Input unit 1303 receives information relating to content usage, and outputs the received information to playback unit 1304.

Specifically, input unit 1303 receives playback information from a user, and outputs the received playback information to playback unit 1304. Here, the content storage target information included in the playback information is always "1".

Input unit 1303, on receipt from a user of playback stoppage information indicating to stop content playback, outputs the received playback stoppage information to playback unit 1304.

(4) Playback Unit 1304

Playback unit 1304 decrypts encrypted contents stored in content storage unit 1301 to generate contents, and plays the generated contents.

Specifically, playback unit 1304, on receipt of playback information from input unit 1303, outputs the received playback information to usage-key monitoring unit 1305.

Playback unit 1304, on receipt of key-acquisition completed information from usage-key monitoring unit 1305, acquires the content key included in the first key information from usage-key storage unit 1302, and furthermore acquires, from content storage unit 1301, an encrypted content corresponding to the information ID included in the playback information received input unit 1303, decrypts the encrypted content using the acquired content key to generate a content, and plays the generated content.

Also, playback unit 1304, on receipt of playback stoppage information from input unit 1303, stops playback of the content currently being played.

(5) Usage-Key Monitoring Unit 1305

Usage-key monitoring unit 1305 stores, in usage-key storage unit 1302, content keys to be used when encrypted contents stored in content storage unit 1301 are used in playback unit 1304, and deletes stored content keys when usage of encrypted contents has ended.

Specifically, usage-key monitoring unit 1305, on receipt of playback information from playback unit 1304, generates third request information that includes a usage classification showing "playback apparatus" and the information ID included in the received playback information, outputs the generated third request information to content server 1001, and furthermore outputs information to authentication unit 1306 indicating that the playback information has been received.

Usage-key monitoring unit 1305, on receipt of authentication-succeeded information from authentication unit 1306, furthermore receives encrypted first key information from content server 1001 via communication unit 1307. Unit 1305 decrypts the encrypted first key information using the shared secret key generated at the time of authentication to generate first key information, and stores the generated first key information in usage-key storage unit 1302. Furthermore, unit 1305 generates key-acquisition completed information in which the key storage target information is "1", and outputs the generated key-acquisition completed information to playback unit 1304. In this case, if the key storage target information is "1", this shows that the content key storage target is usage-key storage unit 1302 in playback apparatus 1004.

Furthermore, usage-key monitoring unit 1305 monitors the operations of playback unit 1304, and on detecting that content playback has ended or that the operations of playback unit 1304 have ended due to a content playback stoppage (i.e. on detecting that content usage has ended), deletes the first key information stored in usage-key storage unit 1302, generates key-usage ended information, and outputs the generated key-usage ended information to content server 1001.

(6) Authentication Unit 1306

Authentication unit 1306 prestores common secret information, and conducts authentication with authentication unit 1022 included in content server 1001.

Specifically, authentication unit 1306 conducts authentication mutually with content server 1001 by receiving information from usage-key monitoring unit 1305 indicating that playback information has been received.

Authentication unit 1306 judges whether authentication was successful, and if successful, outputs authentication-succeeded information to usage-key monitoring unit 1305, and if not successful, notifies authentication-failed information to the user indicating that authentication was not successful.

Also, authentication unit 1306, which is the same as authentication unit 1022 in content server 1001, generates a shared secret key when commencing the authentication. Unit 1306 encrypts information for use in the authentication using the shared secret key, transmits the encrypted information to content server 1001, and also receives encrypted information from content server 1001, decrypts the encrypted information, and uses the decrypted information in the authentication.

(7) Communication Unit 1307

Communication unit 1307 outputs information received from content server 1001 to usage-key monitoring unit 1305 or authentication unit 1306.

Also, communication unit 1307 outputs information received from usage-key monitoring unit 1305 or authentication unit 1306 to content server 1001.

3.6 Operations of Key Delivery System 1000

The operations of key delivery system 1000 will now be described.

(1) Content Key Management Processing Operations

Figure 26:
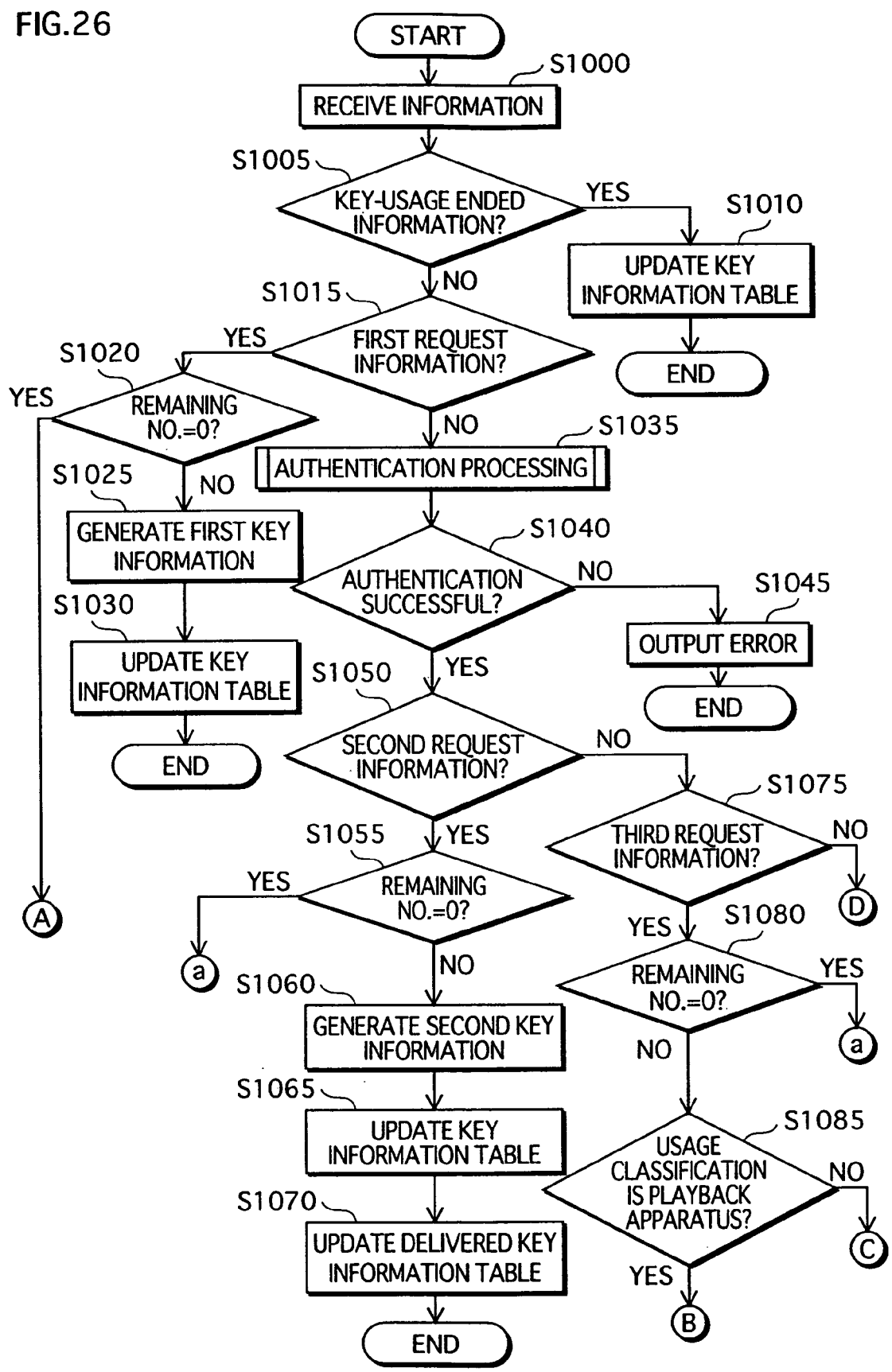
FIG. 26 is a flowchart showing content key management processing (cont.
Figure 27:
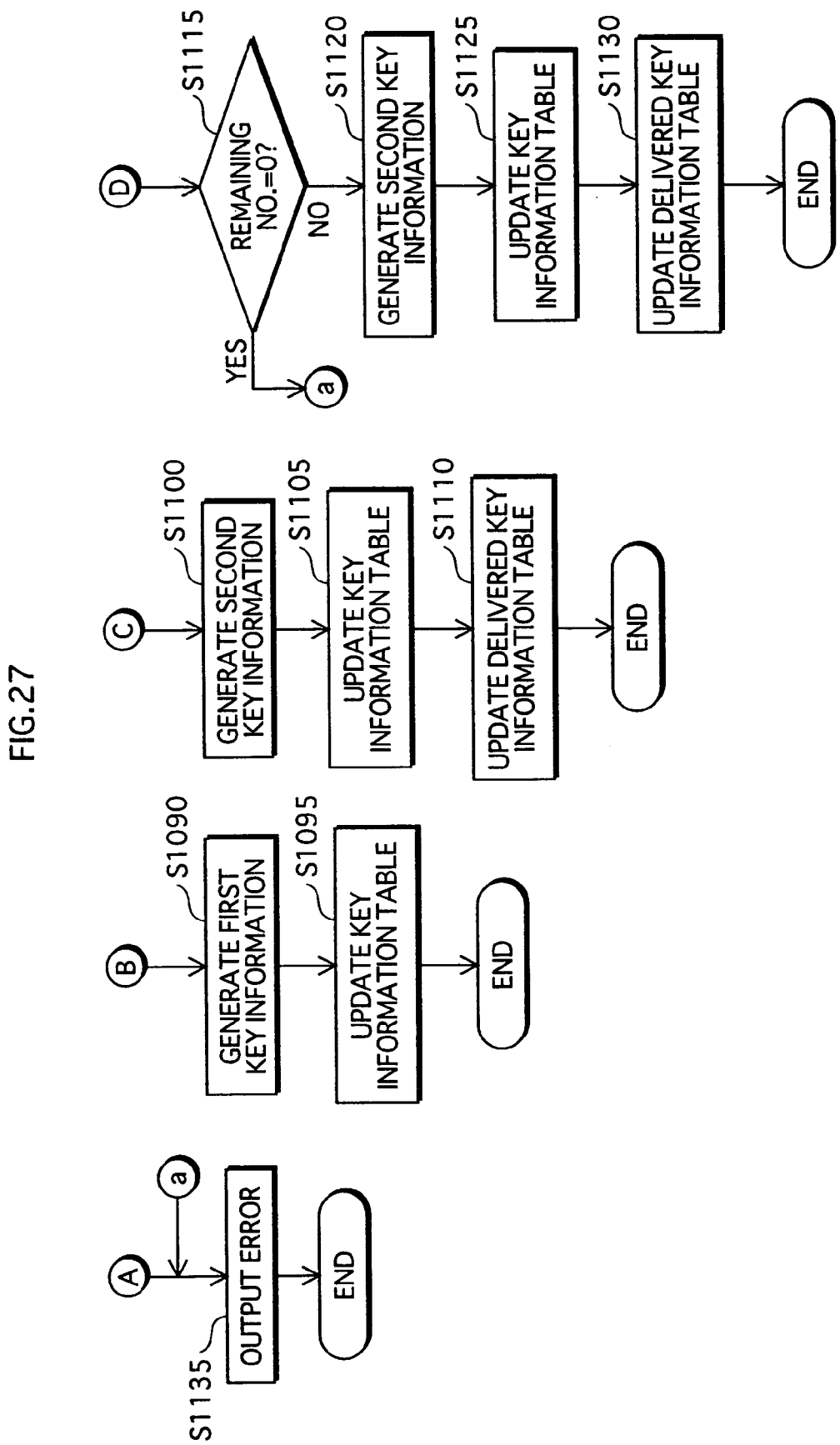
in FIG. 27)

The content key management processing conducted in content server 1001 by content-key control unit 1021 and authentication unit 1022 will now be described using the flowcharts of FIGS. 26 and 27.

Content-key control unit 1021 receives information (step S1000), and judges whether the received information is key-usage ended information (step S1005).

If judged at step S1005 to be key-usage ended information, content-key control unit 1021, using the information ID included in the received key-usage ended information, adds "1" to the remaining number in content key information corresponding to the information ID, to update key information table T1001 (step S1010).

If judged at step S1005 to not be key-usage ended information, content-key control unit 1021 judges whether the received information is first request information (step S1015).

If judged at step S1015 to be first request information, content-key control unit 1021 acquires content key information corresponding to the information ID included in the first request information, and judges whether the remaining number in the acquired content key information is "0" (step S1020).

If judged at step S1020 to be "0", content-key control unit 1021 generates first key information from the acquired content key information, and outputs the generated first key information to usage-key monitoring unit 1018 (step 1025). Furthermore, unit 1021 subtracts "1" from the remaining number in the acquired content key information to update key information table T1001 (step S1030).

If judged at step S1020 that the remaining number is "0", content-key control unit 1021 notifies none-remaining information to the user (step S1135).

If judged at step S1015 to not be first request information, content-key control unit 1021 outputs authentication identifying information to authentication unit 1022 and authentication processing is conducted in authentication unit 1022 with the source of the content key delivery request (step S1035). Authentication unit 1022 judges whether the authentication processing at step S1035 was successful (step S1040). If judged at step S1040 that authentication was not successful, unit 1021 notifies authentication-failed information to the user (step S1045).

If judged at step S1040 that authentication was successful, content-key control unit 1021 judges whether the received information is second request information (step S1050).

If judged at step S1050 to be second request information, content-key control unit 1021 acquires content key information corresponding to the information ID included in the second request information, and judges whether the remaining number in the acquired content key information is "0" (step S1055).

If judged at step S1055 that the remaining number is not "0", content-key control unit 1021 generates second key information from the acquired content key information, encrypts the generated second key information, and outputs the encrypted second key information to usage-key confirmation unit 1019 (step S1060). Furthermore, unit 1021 subtracts "1" from the remaining number in the acquired content key information to update key information table T1001 (step S1065). Also, unit 1021 generates content key management information, and writes the generated content key management information into delivered key information table T1002 (step S1070).

If judged at step S1055 that the remaining number is "0", content-key control unit 1021 notifies none-remaining information to the user (step S1135).

If judged at step S1050 to not be second request information, content-key control unit 1021 judges whether the received information is third request information (step S1075).

If judged at step S1075 to be third request information, content-key control unit 1021 acquires content key information corresponding to the information ID included in the third request information, and judges whether the remaining number in the acquired content key information is "0" (step S1080).

If judged at step S1080 that the remaining number is not "0", content-key control unit 1021 judges whether the usage classification included in the received third request information is information showing "playback apparatus" (step S1085).

If judged at step S1085 to be information showing "playback apparatus", content-key control unit 1021 generates first key information from the acquired content key information, encrypts the generated first key information, and transmits the encrypted first key information to playback apparatus 1004 (step S1090). Furthermore, unit 1021 subtracts "1" from the remaining number in the acquired content key information to update key information table T1001 (step S1065).

If judged at step S1085 to not be information showing "playback apparatus", content-key control unit 1021 generates second key information from the acquired content key information, encrypts the generated second key information, and transmits the encrypted second key information to recording medium 1002 (step S1100). Furthermore, unit 1021 subtracts "1" from the remaining number in the acquired content key information to update key information table T1001 (step S1105). Also, unit 1021 generates content key management information, and writes the generated content key management information into delivered key information table T1002 (step S1110).

If judged at step S1080 that the remaining number is "0", content-key control unit 1021 notifies none-remaining information to the user (step S1135).

If judged at step S1075 to not be third request information (i.e., when judged that the received information is advance request information), content-key control unit 1021 acquires content key information corresponding to the information ID included in the received advance request information, and judges whether the remaining number in the acquired content key information is "0" (step S1115).

If judged at step S1115 that the remaining number is not "0", content-key control unit 1021 generates second key information from the acquired content key information, encrypts the generated second key information, and outputs the encrypted second key information to usage-key advance delivery unit 1020 (step 1120). Furthermore, unit 1021 subtracts "1" from the remaining number in the acquired content key information to update key information table T1001 (step 1125). Also, unit 1021 generates content key management information, and writes the generated content key management information into delivered key information table T1002 (step S1130).

If judged at step S1115 that the remaining number is "0", content-key control unit 1021 notifies none-remaining information to the user (step S1135).

(2) Authentication Processing Operations

Figure 28:
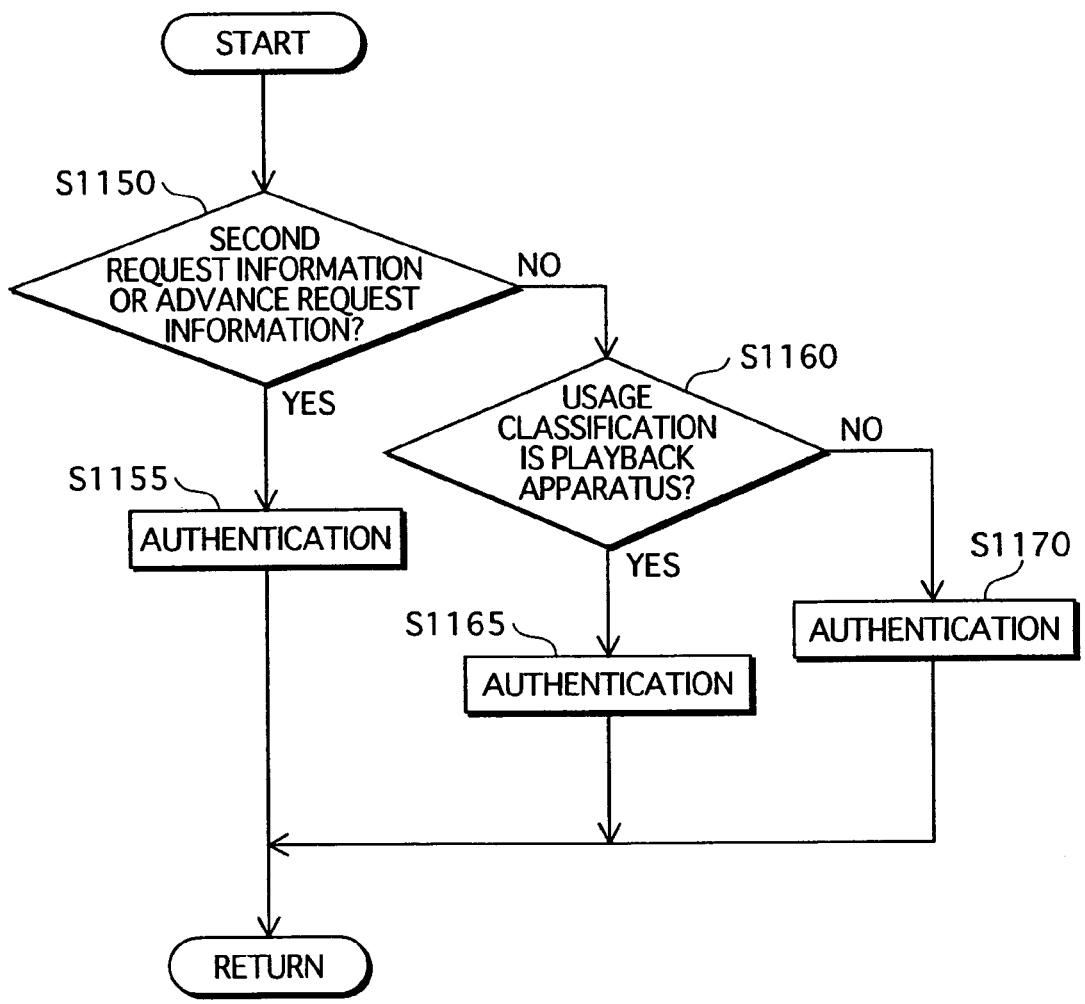
FIG. 28 is a flowchart showing authentication processing.

Authentication processing, which is conducted as part of the content key management processing, will now be described using the FIG. 28 flowchart.

Authentication unit 1022, on receipt of authentication identifying information from content-key control unit 1021, judges whether the received authentication identifying information shows second request information or advance request information (step S1150).

If judged to show second request information or advance request information, authentication unit 1022 conducts mutual authentication with recording medium 1002 mounted in content server 1001 (step S1155).

If the received authentication identifying information is judged at step S1150 to not be information showing second request information or advance request information, authentication unit 1022 judges whether it is third request information whose usage classification is "playback apparatus" (step S1160).

If judged to show third request information whose usage classification is "playback apparatus", authentication unit 1022 conducts authentication mutually with playback apparatus 1004 (step S1165), and if judged to not be third request information whose usage classification is "playback apparatus" (i.e. judged to be third request information whose "usage classification is "recording medium"), authentication unit 1022 conducts authentication mutually with recording medium 1002 mounted in playback apparatus 1003 (step S1170).

(3) Time Management Processing Operations

Figure 29:
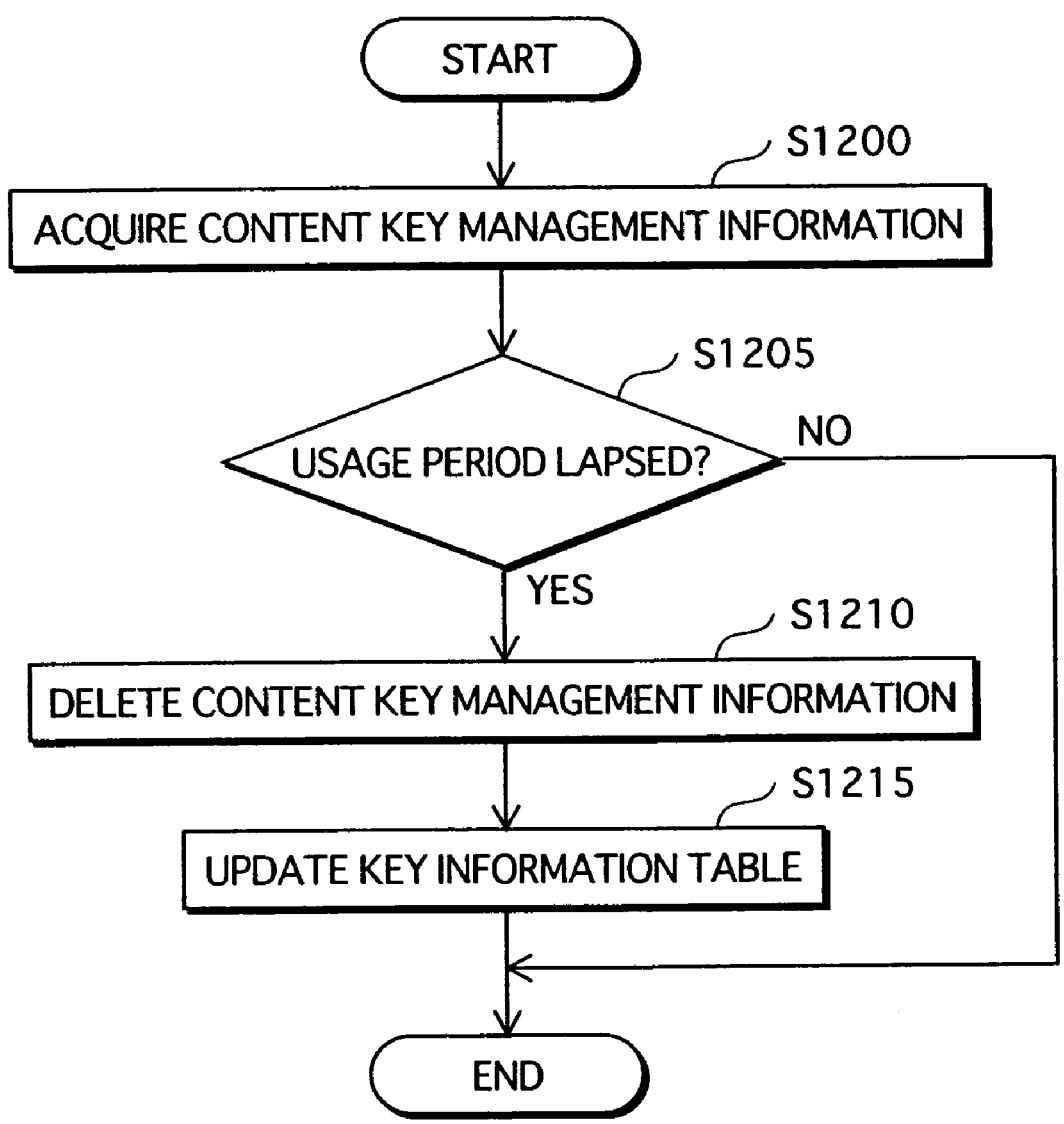
FIG. 29 is a flowchart showing time management processing.

Time management processing conducted in time management unit 1023 of content server 1001 will now be described using the FIG. 29 flowchart.

Time management unit 1023 acquires content key management information from delivered key information table T1002 and the present date-time from clocking unit 1026 (step S1200), and judges whether the usage period in the content key management information has lapsed (step S1205).

If judged in step S1205 that the usage period has lapsed, time management unit 1023 deletes the acquired content key management information from delivered key information table T1002 (step S1210), adds "1" to the remaining number in content key information corresponding to the delivered content key ID in the acquired content key management information to update key information table T1001 (step 1215).

Moreover, time management unit 1023 repeats this processing for each piece of content key management information stored in delivery key management information table T1002.

(4) Operations at Playback Time in Playback Apparatus 1004

Operations when encrypted contents stored in playback apparatus 1004 are used will now be described using the FIG. 30 flowchart.

Playback apparatus 1004, on receipt of playback information (step S1250), generates third request information that includes a usage classification showing "playback apparatus", and transmits the generated third request information to content server 1001 (step 1255).

Content server 1001, on receipt of the third request information (step 1260), conducts mutual authentication with playback apparatus 1004 (steps S1265, S1270).

Content server 1001 judges whether authentication with playback apparatus 1004 was successful (step S1275).

Content server 1001, if judged at step S1275 that authentication was successful, judges whether the remaining number in content key information corresponding to the information ID included in the third request information is "0" (step S1285). If judged at step S1275 that authentication was not successful, content server 1001 notifies authentication-failed information to the user (step S1340).

Content server 1001, if judged at step S1285 that the remaining number is not "0", generates first key information, encrypts the generated first key information, and transmits the encrypted first key information to playback apparatus 1004 (step S1290). If judged at step S1285 that the remaining information is "0", content server 1001 notifies none-remaining information to the user (step S1345).

Content server 1001 subtracts "1" from the remaining number in the content key information corresponding to the information ID included in the third request information to update key information table T1001 (step S1295).

Playback apparatus 1004 judges whether authentication was successful (step S1280).

Playback apparatus 1004, if judged at step S1280 that authentication was not successful, notifies authentication-failed information to the user (step S1335). If judged that authentication was successful, playback apparatus 1004 receives encrypted first key information from content server 1001, and decrypts the encrypted first key information to generate first key information (step S1300).

Playback apparatus 1004 stores the generated first key information in usage-key storage unit 1302 (step S1305), and plays a content using the stored first key information and an encrypted content stored in content storage unit 1301 (step S1310). Also, on detecting the end of content usage (step S1315), playback apparatus 1004 deletes the first key information stored in usage-key storage unit 1302 (step S1320), generates key-usage ended information, and transmits the generated key-usage ended information to content server 1001 (step S1325).

On receipt of the key-usage ended information from playback apparatus 1004, content server 1001, using the information ID included in the received key-usage ended information, adds "1" to the remaining number in content key information corresponding to the information ID, to update key information table T1001 (step S1330).

(5) Operations at Playback Time in Playback Apparatus 1003

Figure 31:
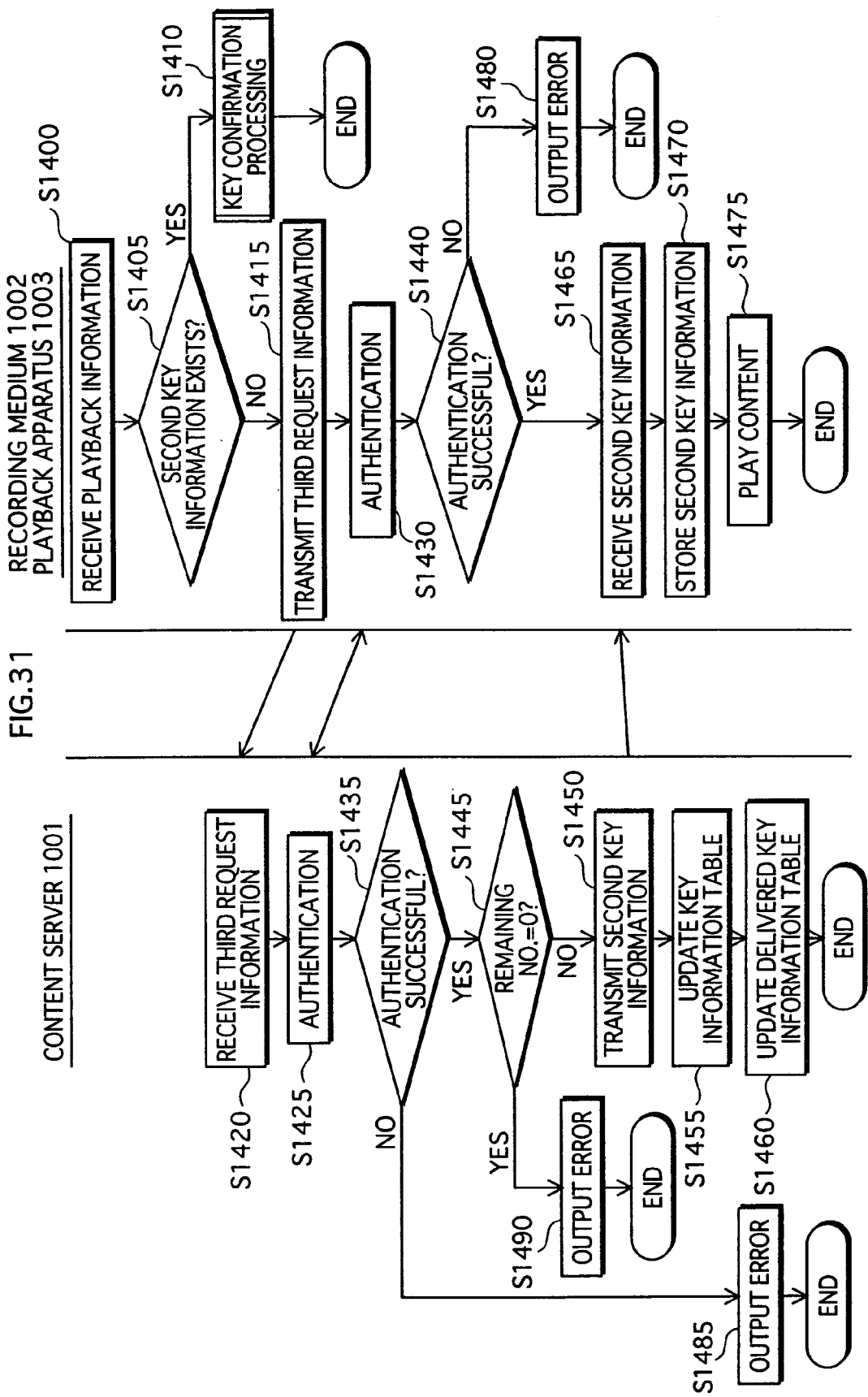
FIG. 31 is a flowchart showing operations at a playback time in playback apparatus 1003.

Operations when encrypted contents stored in recording medium 1002 are used in playback apparatus 1003 will now be described using the FIG. 31 flowchart.

Playback apparatus 1003, on receipt of playback information (step S1400), judges whether second key information corresponding to the information ID included in the received playback information exists on recording medium 1002 (step S1405).

If the playback apparatus 1003 judges at step S1405 that corresponding second key information does exist, playback apparatus 1003 conducts key confirmation processing (step S1410).

If the playback apparatus 1003 judges at step S1405 that corresponding second key information does not exist, playback apparatus 1003 generates third request information that includes a usage classification showing "recording medium", and transmits the generated third request information to content server 1001 (step S1415).

Content server 1001, on receipt of the third request information (step S1420), conducts mutual authentication with recording medium 1002 (steps S1425, S1430).

Content server 1001 judges whether authentication with recording medium 1002 was successful (step S1435).

Content server 1001, if judged at step S1435 that authentication was successful, judges whether the remaining number in content key information corresponding to the information ID included in the third request information is "0" (step S1445). If judged at step S1435 that authentication was not successful, content server 1001 notifies authentication-failed information to the user (step S1485).

Content server 1001, if judged at step S1445 that the remaining number is not "0", generates second key information, encrypts the generated second key information, and transmits the encrypted second key information to playback apparatus 1003 (step S1450). If judged at step S1445 that the remaining information is "0", content server 1001 notifies none-remaining information to the user (step S1490).

Content server 1001 subtracts "1" from the remaining number in the content key information corresponding to the information ID included in the third request information to update key information table T1001 (step S1455). Also, content server 1001 generates content key management information, and writes the generated content key management information into delivered key information table T1002 (step S1460).

Recording medium 1002 judges whether authentication was successful (step S1440).

Recording medium 1002, if judged at step S1440 that authentication was not successful, notifies authentication-failed information to the user (step S1480). If judged that authentication was successful, recording medium 1002 outputs authentication-succeeded information to playback apparatus 1003, and playback apparatus 1003 receives encrypted second key information from content server 1001, and outputs the encrypted second key information to recording medium 1002 (step S1465).

Recording medium 1002 receives the encrypted second key information from playback apparatus 1003, decrypts the encrypted second key information to generate second key information, and stores the generated second key information in usage-key storage unit 1102 (step S1470).

Playback apparatus 1003 plays a content using an encrypted content and the second key information stored on recording medium 1002 (step S1475).

(6) Operations at Time of Recording Medium 1002 Usage in Content Server 1001

The operations in the case of encrypted content stored on recording medium 1002 being used in content server 1001 will now be described using the FIG. 32 flowchart.

Content server 1001, on receipt of playback information whose storage target information is "0" (step S1500), judges whether second key information corresponding to the information ID included in the received playback information exists on recording medium 1002 (step S1505).

If content server 1001 judges at step S1505 that corresponding second key information does exist, content server 1001 conducts key confirmation processing (step S1510).

If content server 1001 judges at step S1505 that corresponding second key information does not exist, content server 1001 conducts mutual authentication with recording medium 1002 (steps S1515, S1520).

Content server 1001 judges whether authentication with recording medium 1002 was successful (step S1525).

Content server 1001, if judged at step S1525 that authentication was successful, judges whether the remaining number in content key information corresponding to the information ID included in the second request information is "0" (step S1535). If judged at step S1525 that authentication was not successful, content server 1001 notifies authentication-failed information to the user (step S1565).

Content server 1001, if judged at step S1535 that the remaining number is not "0", generates second key information, encrypts the generated second key information, and outputs the encrypted second key information to recording medium 1002 (step S1540). If judged at step S1535 that the remaining information is "0", content server 1001 notifies none-remaining information to the user (step S1570).

Content server 1001 subtracts "1" from the remaining number in the content key information corresponding to the information ID included in the second request information to update key information table T1001 (step S1545). Also, content server 1001 generates content key management information, and writes the generated content key management information into delivered key information table T1002 (step S1550). Furthermore, content server 1001 reads, from recording medium 1002, the second key information outputted to recording medium 1002 and an encrypted content, and plays a content (step S1555).

Recording medium 1002 judges whether authentication was successful (step S1520).

Recording medium 1002, if judged at step S1520 that authentication was not successful, notifies authentication-failed information to the user (step S1575). If judged that authentication was successful, recording medium 1002 receives encrypted second key information from content server 1001, decrypts the encrypted second key information to generate second key information, and stores the generated second key information in usage-key storage unit 1102 (step S1560).

(7) Playback Operations of Content Server 1001

Figure 33:
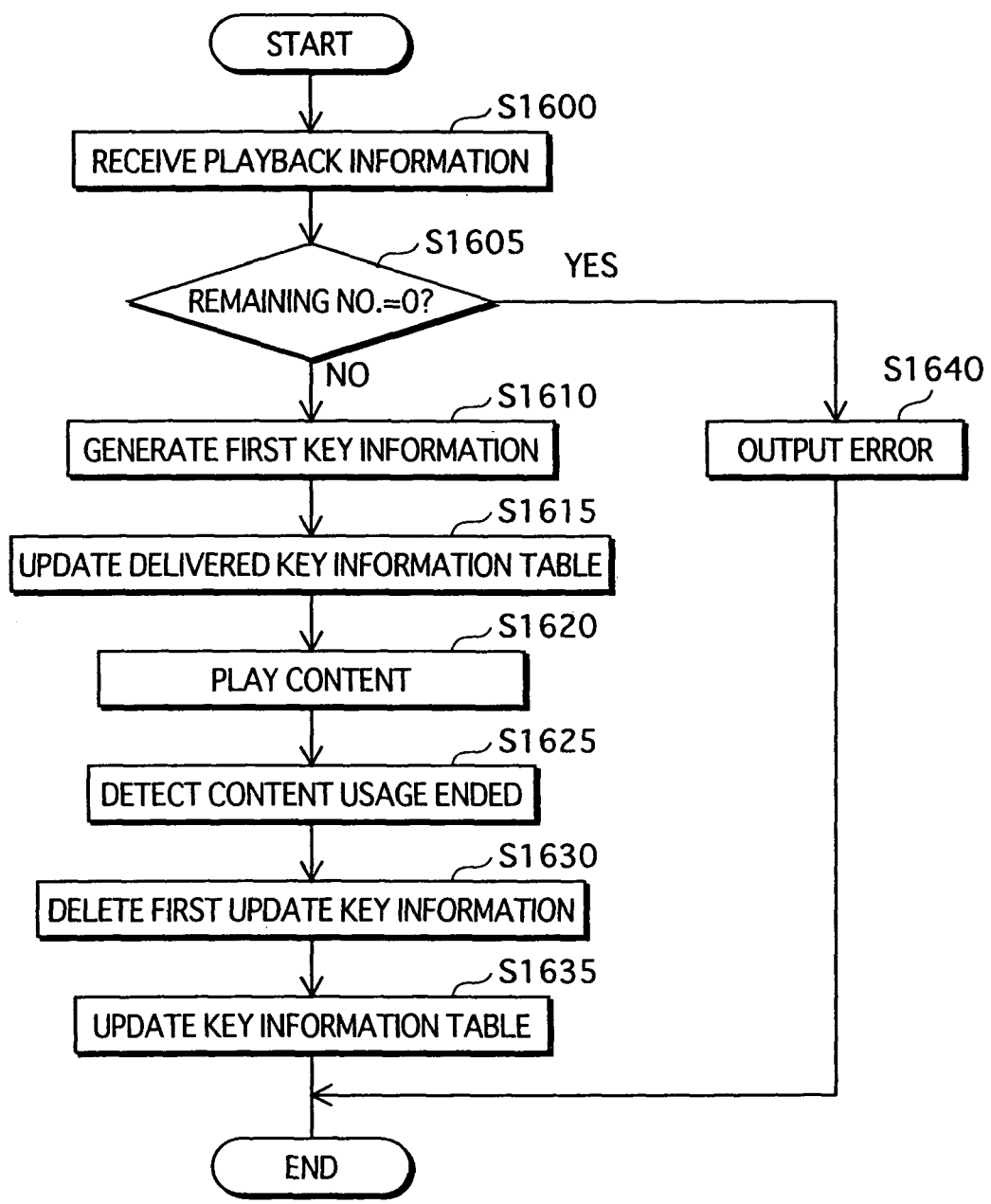
FIG. 33 is a flowchart showing operations at a playback time in content server 1001.

Operation when encrypted contents stored in content server 1001 are played will now be described using the FIG. 33 flowchart.

Content server 1001, on receipt of playback information whose storage target information is "1" (step S1600), judges whether the remaining number in content key information corresponding to the information ID included in first request information generated using the received playback information is "0" (step S1605).

Content server 1001, if judged at step S1605 that the remaining number if not "0", generates first key information, and stores the generated first key information in usage-key storage unit 1013 (step S1610). Content server 1001, if judged that the remaining number is "0", notifies none-remaining information to the user (step S1640).

Content server 1001 subtracts "1" from the remaining number in the content key information corresponding to the information ID included in the first request information to update key information table 1001 (step 1615). Furthermore, content server 1001 uses a content, using the first key information and an encrypted content (step S1620). Also, on detecting the end of content usage (step S1625), content server 1001 deletes the first key information stored in usage-key storage unit 1013 (step S1630), and adds "1" to the remaining number in the content key information corresponding to the information ID of the encrypted content that was used, to update key information table 1001 (step 1635).

(8) Key Confirmation Processing Operations

Figure 34:
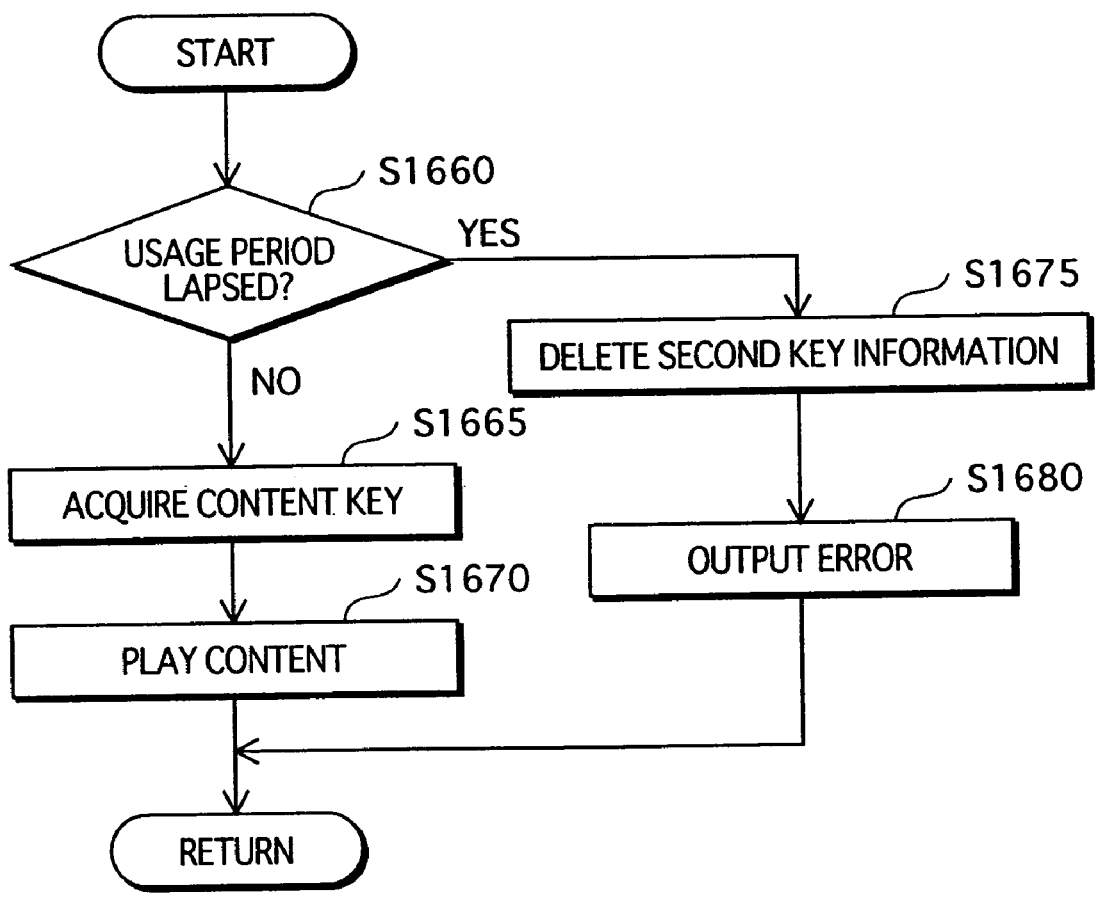
FIG. 34 is a flowchart showing key confirmation processing.

The key confirmation processing operation shown in FIG. 31 will now be described in detail using the FIG. 34 flowchart. Key confirmation processing is processing conducted in playback unit 1202 and usage-key confirmation unit 1203 of playback apparatus 1003.

Usage-key confirmation unit 1203 judges whether the usage period of the content key included in existing second key information has lapsed (step S1660). If judged to be within the usage period, playback unit 1202 acquires the content key, decrypts an encrypted content using the acquired content key to generate a content, and plays the generated content (step S1670).

If judged to be outside the usage period, usage-key confirmation unit 1203 deletes the second key information that includes the content key (step S1675), and notifies usage-failure information to the user (step S1680).

Figure 32:
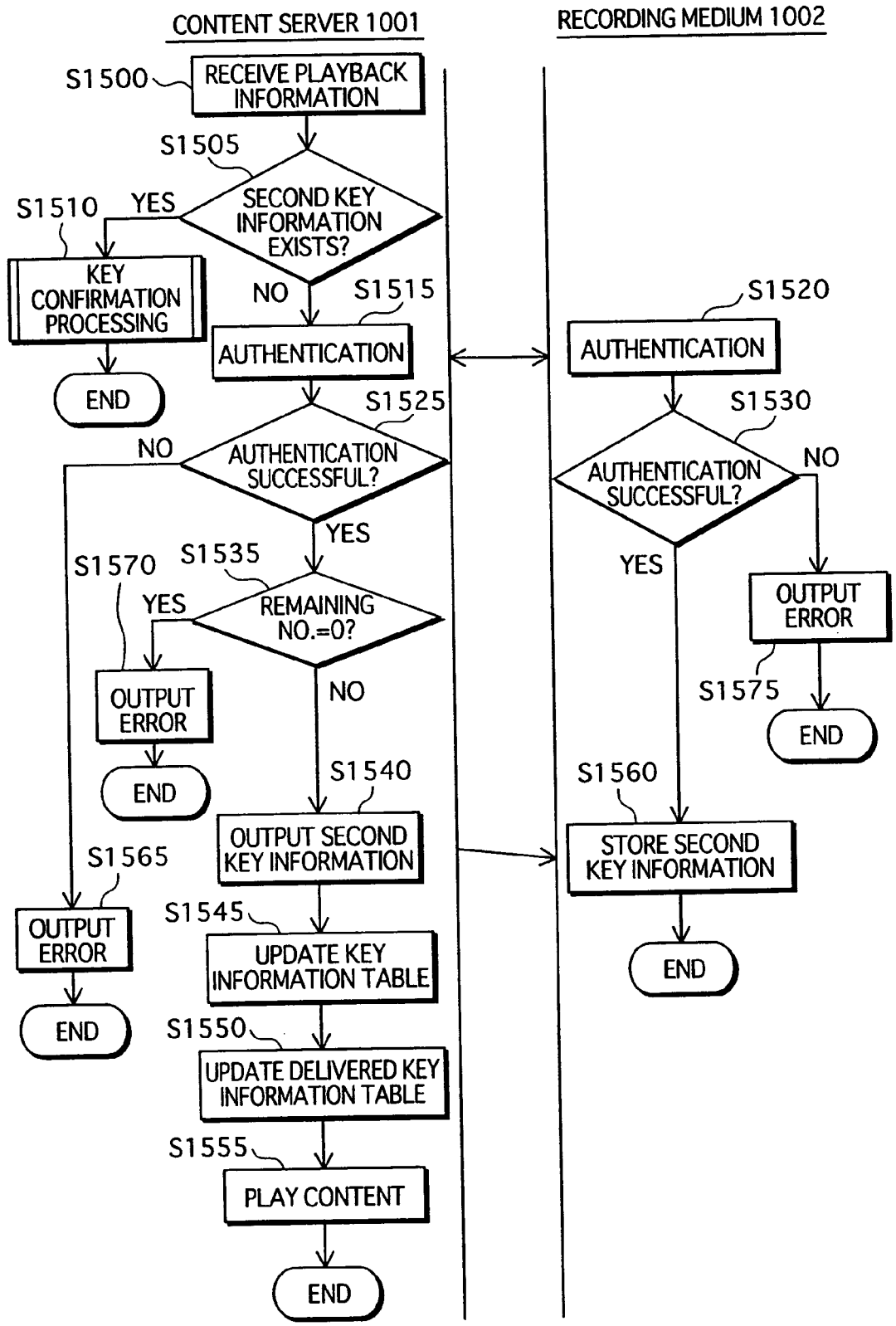
FIG. 32 is a flowchart showing operations at a usage time of recording medium 1002 in content server 1001.

Moreover, since the key delivery processing operation shown in FIG. 32 is the same, a description is omitted here. The key delivery processing is conducted in playback unit 1017 and usage-key confirmation unit 1019 of content server 1001.

(9) Operations at Time of Advance Delivery of Content Keys

Figure 35:
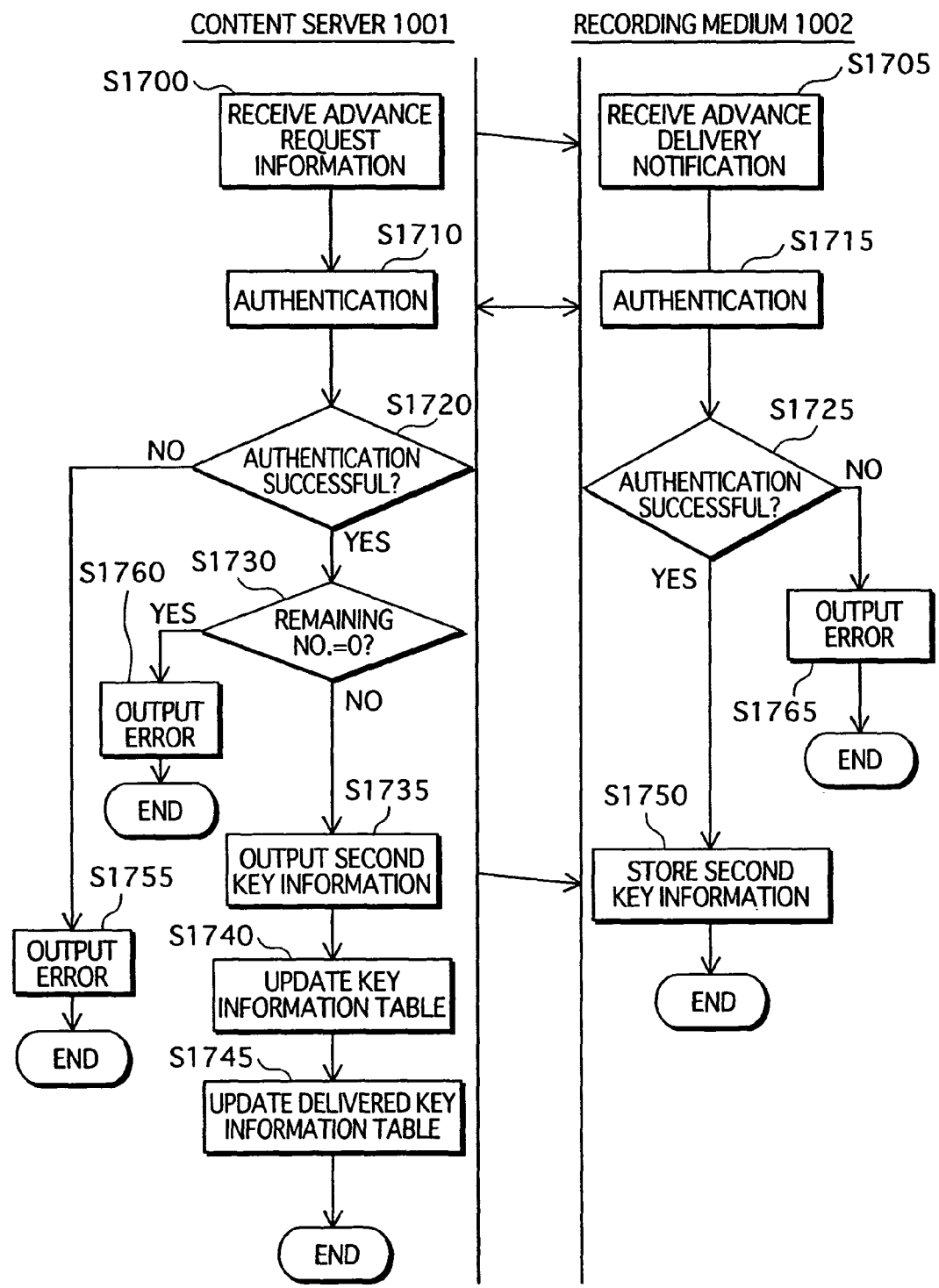
FIG. 35 is a flowchart showing operations at a time of advance delivery of a content key.

Operations in the case of delivery content keys in advance to recording medium 1002 will now be described using the FIG. 35 flowchart.

Content server 1001, on receipt of advance request information, outputs information to recording medium 1002 indicating that advance request information has been received (step S1700).

Recording medium 1002 receives the information indicating that advance request information has been received (step S1705), and conducts mutual authentication with content server 1001 (steps S1710, S1715).

Content server 1001 judges whether authentication with recording medium 1002 was successful (step S1720).

Content server 1001, if judged at step S1720 that authentication was successful, judges whether the remaining number in content key information corresponding to the information ID included in the advance request information is "0" (step S1730). If judged at step S1720 that authentication was not successful, content server 1001 notifies authentication-failed information to the user (step S1755).

Content server 1001, if judged at step S1535 that the remaining number is not "0", generates second key information, encrypts the generated second key information, and outputs the encrypted second key information to recording medium 1002 (step S1735). If judged at step S1730 that the remaining information is "0", content server 1001 notifies none-remaining information to the user (step S1760).

Content server 1001 subtracts "1" from the remaining number in the content key information corresponding to the information ID included in the advance request information to update key information table T1001 (step S1740). Also, content server 1001 generates content key management information, and writes the generated content key management information into delivered key information table T1002 (step S1745).

Recording medium 1002 judges whether authentication was successful (step S1725).

Recording medium 1002, if judged at step S1725 that authentication was not successful, notifies authentication-failed information to the user (step S1765). If judged that authentication was successful, recording medium 1002 receives encrypted second key information from content server 1001, decrypts the encrypted second key information to generate second key information, and stores the generated second key information in usage-key storage unit 1102 (step S1750).

3.7 Summary of Key Delivery Method Variation

As described above, content server 1001 in key delivery system 1000, when the legitimacy of key delivery is confirmed by authentication and the remaining number of a content key whose delivery has been request is not "0", delivers the content key. Also, in the delivery of content keys to recording medium 1002, content server 1001 restricts the use of content keys delivered to recording medium 1002, by appending a usage period for which the content key can be used. In this way, it is always possible to restrict content usage with respect to recording medium 1002, which is not network-connected.

3.8 Further Variations

The key delivery method variation described above is one exemplary implementation of the present invention, and the present is not limited to this embodiment, it being possible to implement various structures within a range that does not diverge from the object of this embodiment. Variations such as the following are also included in the present invention.

(1) Although the above is described in terms of all of the content information being encrypted when contents are encrypted in content server 1001, the present invention is not limited to this, and only part of a content need be encrypted.

(2) Only playback apparatus 1004, recording medium 1002 and content server 1001 structuring delivery system may be allowed to duplicate encrypted contents.

In this case, the duplication source and duplication target may conduct authentication at the time of duplication, and duplication only conducted if authentication is successful.

(3) Also, with respect to a playback apparatus or a recording medium that fails the authentication (i.e., does not have common secret information), an allowable number of duplications may be set, and duplication permitted only by a content server. In this case, the allowable number of duplications is reduced by "1" every time duplication is conducted.

(4) The recording medium may be a portable recording medium that has an internal IC, an authentication function, and is used by being mounted in a playback apparatus, an example of which is an SD card.

Also, in the case of a portable recording medium that does not have an internal IC, authentication need only be conducted by content server 1001, instead of conducting mutual authentication.

In this case, common secret information is recorded in the portable recording medium that does not have an internal IC, and content server 1001 conducts authentication by judging whether the common secret information exists.

The portable recording medium not having an internal IC is, for example, a BD (blu-ray disc) or a DVD.

Also, the recording medium is not limited to being a portable recording medium, and may be a portable terminal apparatus. In this case, the portable terminal apparatus, when connected to GW 1007, transmits third request information whose usage classification is "recording medium" to content server 1001, and if authentication is successful and there is a remaining deliverable number of a content key, portable terminal apparatus is able to receive encrypted second key information from content server 1001. The portable terminal apparatus is, for example, a PDA (personal digital assistant) or a notebook personal computer.

(5) Although usage-key confirmation unit 1203 was described above as being provided in playback apparatus 1003, the present invention is not limited to this. Usage-key confirmation unit 1203 may be included in recording medium 1002 and its functions realized using clocking unit 1206 and communication unit 1205 of playback apparatus 1003.

Also, usage-key confirmation unit 1019 provided in content server 1001 may be included in recording medium 1002.

Also, usage-key advance delivery unit 1020 may be included in recording medium 1002.

(6) Although the total number of a content key distributed by content server 1001 is described above as being the same for each content key, the present invention is not limited to this. The total number may be different for every content key. In this case, the total number is received by input unit 1016, content key information is generated in content acquisition unit 1015 using the received total number, and the generated content key information is stored in key-information storage unit 1031.

Also, the time period restriction may be different for every content key, the same as with the time period restriction in content key information. In this case, the time period restriction is received by input unit 1016, content key information is generated in content acquisition unit 1015 using the received time period restriction, and the generated content key information is stored in key-information storage unit 1031.

(7) The total number of a content key distributed by content server 1001 may be divided for managing between the number delivered to playback apparatuses and the number delivered to recording media.

(8) Playback apparatuses 1003 and 1004 may be the same playback apparatus.

(9) Although the above was described in terms of advance key delivery being possible when recording medium 1002 is mounted in content server 1001, the present invention may be structured so that advance delivery of keys from content server 1001 is conductible when recording medium 1002 is mounted in playback apparatus 1003.

(10) Although the above was described in terms of key information table T1001 and delivered key information table T1002 being separate, they may be the same information table.

In this case, the information table includes an area for storing one or more groupings that are each formed from a content key ID, a content key, a corresponding information ID, a total number, a remaining number, a time period restriction, and period information. The period information is structured from usage period 1, usage period 2, ..., usage period n. Here, "n" is a number greater than or equal to the number recorded in the total number. Usage period 1 is the same information as the usage period shown in the above key delivery method variation. Also, since usage period 2, ..., usage period n are the same as usage period 1, a description is omitted here.

(11) A usage-key monitoring unit may be included in playback apparatus 1003, the same as playback apparatus 1004.

In this case, the usage-key monitoring unit in playback apparatus 1003, when detecting the end of usage of encrypted content stored on recording medium 1002, deletes the second key information using in the encrypted content usage, and transmits, to content server 1001, information formed from key-usage ended information, the used content key ID, and the usage period corresponding to the content ID.

Content server 1001, on receipt of the above information from playback apparatus 1003, adds "1" to the remaining number in content key information corresponding to the information ID included in the key-usage ended information to update key information table T1001. Also, content server 1001 deletes the grouping of the used content key ID and the usage period that corresponds to the content ID from delivered key information table T1002.

(12) Although the above was described in terms of managing the usage period of content keys included in delivered second key information in content server 1001 in the case of second key information being delivered to recording medium 1002, the usage period of content keys delivered to playback apparatus 1004 may also be managed.

In this case, content server 1001 transmits second key information to playback apparatus 1004, and stores, in delivered key information table T1002, a grouping formed from the content key ID and the usage period delivered to playback apparatus 1004. Management of the usage period after transmission of the second key information is conducted in time management unit 1023.

Playback apparatus 1004, the same as when encrypted contents stored on recording medium 1002 are used, judges after receiving playback information whether there exists a content key corresponding to the information ID included in the received playback information, and if judged that a corresponding content key does exist, playback apparatus 1004 judges whether the usage period has lapsed. If judged that the usage period has lapsed, playback apparatus 1004 deletes content key management information that includes the content key, and notifies usage-failure information to the user. If judged to be within the usage period, playback apparatus 1004 generates a content using the content key, and plays the generated content.

If judged that a corresponding content key does not exist, playback apparatus 1004 generates third request information that includes a usage classification showing "playback apparatus" and the information ID included in the received playback information, and transmits the generated third request information to content server 1001. Since the subsequent operations are the same as the above key delivery method variation, a description is omitted here.

Also, even when playback apparatus 1004 outputs a content key to usage-key storage unit 1013 of content server 1001, it is possible to manage the usage period of the outputted content key by the same method as above.

Moreover, second key information for delivery is encrypted the same as in the above key delivery method variation.

(13) Also, playback apparatus 1004 may manage delivered second key information by the same method as content server 1001.

In this case, clocking unit 1310 and a time management unit 1311 are provided in playback apparatus 1004. Clocking unit 1310 clocks date-time. Time management unit 1311 judges whether the usage period of second key information stored in usage key storage unit 1302 has lapsed, using the date-time clocked in clocking unit 1310. If judged that the usage period has lapsed, playback apparatus 1004 deletes the second key information, and transmits key-usage ended information to content server 1001.

Also, the same management as above is also possible in content server 1001 using clocking unit 1026, time management unit 1023, and usage-key information unit 1013.

Also, time management unit 1110 may be provided in recording medium 1002 to conduct the same management as above. In this case, the operations shown above are only conducted while power is supplied to recording medium 1002 mounted in playback apparatus 1003.

(14) Also, a distinction may be made between a playback apparatus that conducts time management, and a playback apparatus that does not conduct time management. Moreover, a recording medium may also be included in the playback apparatus that conducts time management.

In this case, a playback apparatus that conducts time management, transmits to content server 1001 third request information that has appended information showing that the playback apparatus conducts time management, instead of a usage classification, and a playback apparatus that does not conduct time management, transmits to content server 1001 third request information that has appended information showing that the playback apparatus does not conduct time management, instead of a usage classification. Content server 1001 judges whether the delivery target apparatus is a playback apparatus that conducts time management, and if judged to be a playback apparatus that conducts time management, content server 1001 transmits encrypted second key information, and if judged to be a playback apparatus that does not conduct time management, content server 1001 transmits encrypted first key information.

(15) Also, second key information delivered to playback apparatus 1004 need only be managed by content server 1001. Moreover, the second key information is encrypted before being delivered.

In this case, playback apparatus 1004 has an apparatus ID. Here, an apparatus ID is an identifier that identifies a playback apparatus. A different apparatus ID is allotted to each playback apparatus.

Content server 1001 stores a delivered content key, a usage period, and the apparatus ID of playback apparatus 1004 to which the content key was delivered.

Content server 1001, after transmitting second key information to playback apparatus 1004, judges in time management unit 1023 whether the usage period of the content key delivered to playback apparatus 1004 has lapsed, and if judged to have lapsed, key deletion information that includes the content key ID whose usage period has lapsed is transmitted from content server 1001 to playback apparatus 1004, and "1" is added to the remaining number included in corresponding content key information in the key information table. At this time, playback apparatus 1004, having received the key deletion information, deletes second key information corresponding to the content key ID included in the received information.

Also, even when content server 1001 outputs content keys to usage-key storage unit 1013 in content server 1001, it is possible to conduct management by the same method as above.

Also, when there is a plurality of playback apparatuses having the same structure as playback apparatus 1004, key deletion information may be transmitted collectively to one or more of the playback apparatuses. In this case, the number added to the remaining number included in corresponding content key information within key information table T1001 is same as the number of playback apparatuses to which the key deletion information is transmitted.

(16) The function of delivering first key information to playback apparatus 1004 at a specified time may be included in content server 1001. Moreover, the delivered first key information is encrypted the same as in the above key delivery method variation.

In this case, content server 1001 further includes an automatic delivery information storage unit 1041 that stores automatic delivery information formed from a delivery date-time showing a date-time for delivering a content key, first key information for delivery, and an apparatus ID of the playback apparatus that will conduct the delivery, an automatic delivery management unit 1042 that manages whether the date-time to deliver the first key information has been reached, and a specified time delivery unit 1043 that delivers the first key information when the delivery date-time is reached.

Content server 1001, on receipt of date-time information for conducting automatic delivery and automatic request information that includes an apparatus ID, conducts authentication. Content server 1001, if authentication is successful, generates automatic delivery information, stores the generated automatic delivery information in automatic delivery information storage unit 1041, and subtracts "1" from the remaining number included in corresponding content key information within key information table T1001. Automatic delivery management unit 1042 judges whether the present date-time has reached the delivery date-time included in the automatic delivery information stored in automatic delivery information storage unit 1041, and if judged to have reached the delivery date-time, specified time delivery unit 1043 delivers first key information to playback apparatus 1004, which corresponds to the apparatus ID included in the automatic delivery information, and deletes the automatic delivery information stored in automatic delivery information storage unit 1041.

Moreover, in the case of there being a plurality of playback apparatuses having the same structure as playback apparatus 1004, content keys may be delivered collectively to each playback apparatus specifying the same date-time, in the case of the same date-time information being received from one or more of the playback apparatuses.

Also, information stored in automatic delivery information storage unit 1041 may be set as a delivery date-time, an apparatus ID, and second key information, and the second key information may be delivered to playback apparatus 1004 instead of the above-mentioned first key information.

Also, second key information may also be delivered at a specified time with respect to recording medium 1002. In this case, the apparatus ID stored in automatic delivery information storage unit 1041 is the apparatus ID of playback apparatus 1003 in which recording medium 1002 is mounted.

Also, by input unit 1016, in content server 1001, receiving automatic request information, automatic delivery to usage-key storage unit 1013 in content server 1001 is also possible, in the same manner, as the above operations. Authentication, however, is not conducted.

Also, by input unit 1016 in content server 1001 receiving automatic request information to which is appended information showing the delivery target of a content key to be recording medium 1002 or usage-key storage unit 1013 in content server 1001, it is possible to switch between automatic delivery to recording medium 1002 and automatic delivery to usage-key storage unit 1013 in content server 1001. In this case, the information to be delivered is second key information.

Also, information stored in automatic delivery information storage unit 1041 may be set as a delivery date-time and an apparatus ID, and first or second key information may be generated at an automatic delivery time.

Also, first key information for automatic delivery may be encrypted by common key encryption and transmitted.

Also, authentication may be conducted again at an automatic delivery time. First or second key information to be delivered may be encrypted using the encryption key generated at a time of this authentication.

(17) The function of detecting the delivery target of delivered content keys may be added in key delivery system 1000.

In this case, playback apparatus 1004 includes a key detection unit 1320 for detecting the existence of content keys specified by content server 1001, and recording medium 1002 also includes a key detecting unit 1120 the same as playback apparatus 1004.

Content server 1001 transmits, to playback apparatus 1003 and playback apparatus 1004, key detection request information that includes a content key ID corresponding to a content key to be detected.

Playback apparatus 1004, on receipt of key detection request information from content server 1001, judges in key detection unit 1320 whether the content key ID included in the received key detection request information exists in usage-key storage unit 1302, and if judged to exist, transmits information to content server 1001 indicating that the content key to which the detection request relates is being held.

Playback apparatus 1003, on receipt of key detection request information from content server 1001, outputs the received key detection request information to recording medium 1002. Recording medium 1002, on receipt of the key detection request information, judges in key detection unit 1120 whether the content key ID included in the received key detection request information exists in usage-key storage unit 1102, and if judged to exist, transmits information to content server 1001 indicating that the content key to which the detection request relates is being held.

Also, although the above was described in terms of detection being conducted using a content key ID, a corresponding-information ID may be used instead of a content key ID. In this case also, detection by the same method as above is possible.

Also, a key detection unit may be included in playback apparatus 1003, instead of including key detection unit 1120 in recording medium 1002.

In this way, it is possible to manage playback apparatuses and recording media holding content keys to be detected, without needing to use a database or the like to manage playback apparatuses and recording media to which content keys have been delivered.

(18) Although the above was described in terms of contents being information delivered from a broadcast station, the present invention is not limited to this.

For example, contents may be information obtained by digitalizing music information, video, computer programs, and the like.

(19) In the above key delivery method variation, an encrypted content corresponding to first key information may be transmitted at a time of transmitting first key information from content server 1001 to playback apparatus 1004. Also, in the same way, an encrypted content corresponding to second key information may be transmitted at a time of transmitting second key information from content server 1001 to recording medium 1002.

(20) Second key information stored in recording medium 1002 may be encrypted second key information.

For example, after generating second key information in content server 1001, the second key information is encrypted using common secret information as an encryption key, and the encrypted second key information delivered to recording medium 1002. Recording medium 1002 stores the encrypted second key information, decrypts the encrypted second key information at a usage time using the common secret information, to generate second key information, and uses the generated second key information.

Moreover, at a time of delivering encrypted second key information, the encrypted second key information may be further encrypted using the shared secret key used at the time of authentication, and delivered.

(21) Although the above was described in terms of content server 1001, when a content key is to be outputted to recording medium 1002 mounted in content server 1001, encrypting and outputting the second key information, the second key information may be outputted without being encrypted.

Also, when first key information is delivered to playback apparatus 1004 via a network, the first key information may be outputted without being encrypted, the same as when second key information is delivered to recording medium 1002.

(22) The usage frequency of delivered content keys may be managed.

In this case, information showing content key usage is transmitted to a content server every time a content key is used. The content server, on receipt of the information showing content key usage, judges whether the usage frequency of the content key distributed to a recording medium has reached a predetermined frequency, and if judged to have reached to predetermined frequency, the content server adds "1" to the remaining number corresponding to the content key, and notifies information to the recording medium indicating that the usage frequency has reached the predetermined frequency. The recording medium, on receipt of this information, deletes the content key after use.

(23) Also, a content server may manage history information showing a usage condition of a content key delivered to a recording medium, and if usage of the content key is less than a certain predetermined time period, the content server may add "1" to the remaining number corresponding to the content key, and append usage-failure information to the history information of the content key.

In this case, the recording medium transmits information to the content server showing content key usage, every time a delivered content key is used. The content server, on receipt of the information showing content key usage, judges whether usage of the content key by the recording medium is possible, and if usage is possible, the content server stores the information. If usage is not possible, the content server notifies information to the recording medium showing that usage is not possible. The recording medium, having received the notification, deletes the content key.

Also, the content server judges whether a predetermined time period has lapsed since the last usage of the content key, using the stored information, and if judged to have lapsed, the content server adds "1" to the remaining number corresponding to the content key.

(24) It is not absolutely necessary for usage-key storage unit 1013, usage-key monitoring unit 1018, usage-key confirmation unit 1019, usage-key advance delivery unit 1020, content-key control unit 1021, authentication unit 1022, and time management unit 1023 shown in the above key delivery method variation to be included in content server 1001. For example, a key management server, being a different network terminal to content server 1001 may be added to the structure of the key delivery system, and usage-key storage unit 1013, usage-key monitoring unit 1018, usage-key confirmation unit 1019, usage-key advance delivery unit 1020, content-key control unit 1021, authentication unit 1022, and time management unit 1023 provided in the key management server.

(25) Although content acquisition unit 1015 shown in the above key delivery method variation prestores a decryption key for decrypting an encrypted content acquired from broadcast station 1006, the present invention is not limited to this. The decryption key may be delivered from broadcast station 1006 together with the encrypted content.

In this case, content acquisition unit 1015 receives the encrypted content and the decryption key from broadcast station 1006 via reception unit 1014.

(26) Although content acquisition unit 1015 shown in the above key delivery method variation decrypts an encrypted content acquired from broadcast station 1006, and encrypts the content again using a content key, the present invention is not limited to this. The encrypted content and the decryption key may be encrypted using the content key to generate encrypted content information, and the encrypted content information stored.

In the case of a content being duplicated to playback apparatus 1004 or recording medium 1002, an information ID and the encrypted content information are duplicated. When the content is used in playback apparatus 1004, the content key is received from content server 1001, the encrypted content information is decrypted using the received content key to generate the encrypted content and the decryption key, and the encrypted content is then decrypted using the decrypted key. Also, when the content recorded on recording medium 1002 is used in playback apparatus 1003, decryption of the encrypted content is conducted by the same operations.

(27) The present invention may be any combination of the key delivery method variation and the further variations.

4. AD Server Variation

In relation to content duplication, AD server 100 may manage management information for permitting duplication with respect to in-group apparatuses and management information for permitting duplication with respect to out-group apparatuses.

The following description relates to AD server 100 holding management information with respect to both in-group and out-group apparatuses.

Since group registration and withdrawal procedures between a playback apparatus and a home server are conducted by the procedures described above, a description is omitted here.

Below, the group formation/management system and the AD server are referred to respectively as a content-duplication management system and a home server.

4.1 Overview

Figure 36:
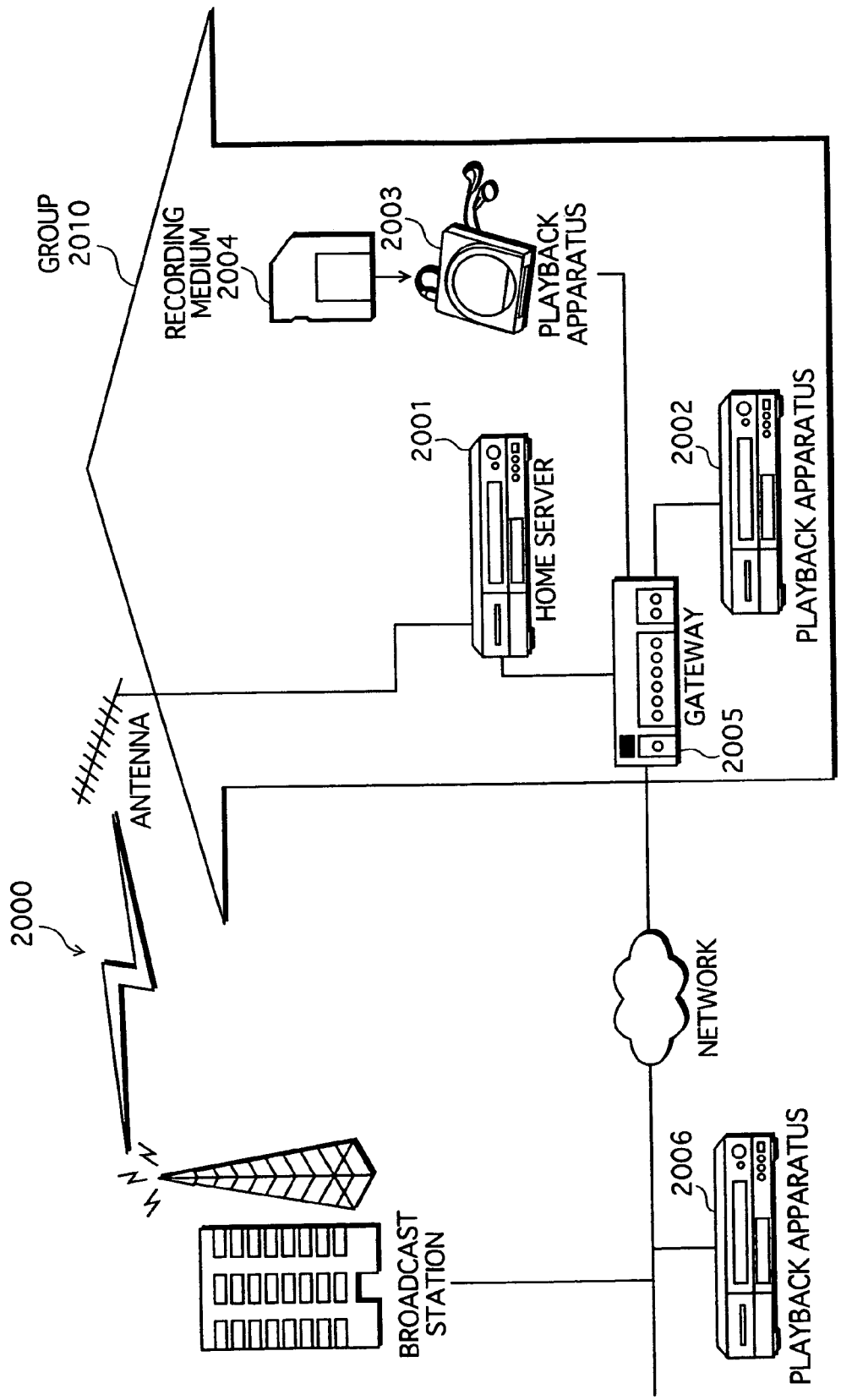
FIG. 36 is a block diagram showing a structure of a content-duplication management system 2000.

FIG. 36 is a block diagram showing a structure of a content-duplication management system 2000.

A home server 2001, a playback apparatus 2002, and a playback apparatus 2003 are connected via a gateway (GW) 2005 and form a home network.

A recording medium 2004 is connected to playback apparatus 2003 by being inserted into an insertion opening in playback apparatus 2003.

Home server 2001, playback apparatus 2002, and playback apparatus 2003 communicate in the home network using their respective TCP/IP.

GW 2005 conducts routing processing between the home network and an external network.

A playback apparatus 2006 and a broadcast station 2007 are connected to the external network.

Broadcast station 2007 conducts ground-wave digital broadcasting, and broadcasts programs to households using UHF waves.

Home server 2001 has a ground-wave digital broadcast reception function, and receives the broadcast content of broadcast station 2007, performs operations to change the broadcast content to a predetermined digital data format, and stores the digital data on a mass-storage hard disk as contents.

Home server 2001 manages content duplication with respect to playback apparatus 2002, playback apparatus 2003, and playback apparatus 2006.

Playback apparatus 2002, playback apparatus 2003 and playback apparatus 2006 acquire contents from home server 2001 when duplication permission relating to the contents is received from home server 2001, and store and play the acquired contents.

In the present variation, the range of the home network is designated as group 2010.

Restrictions applying to content duplication are relaxed in-group (i.e., within group 2010).

Home server 2001, playback apparatus 2002, playback apparatus 2003, GW 2005 and recording medium 2004 belong to group 2010.

Apparatuses belonging to the external network cannot be managed by a home network manager or a group 2010 manager.

When contents are to be duplicated to apparatuses belonging to the external network, home server 2001 needs to apply stiffer restrictions than for duplication to apparatuses within group 2010.

Home server 2001 implements restrictions by the number of duplications permitted of a content.

Home server 2001 distinguishes between in-group and out-group (i.e., outside the range of the home network) in setting and managing the maximum number of permitted duplications.

Apparatuses and recording media belonging to group 2010 each hold group affiliation information, which is common information showing that the respective apparatus/medium belongs to group 2010.

Group affiliation information is formed from common secret information distributed to each apparatus/medium secretly, and a device list of devices structuring the group, the device list being issued by a third party known as a certification authority (CA).

4.2 Structure 4.2.1 Home Server 2001

Home server 2001 is specifically a DVD player or the like that has a network communication function and a hard disk having a mass-storage storage area.

Figure 37:
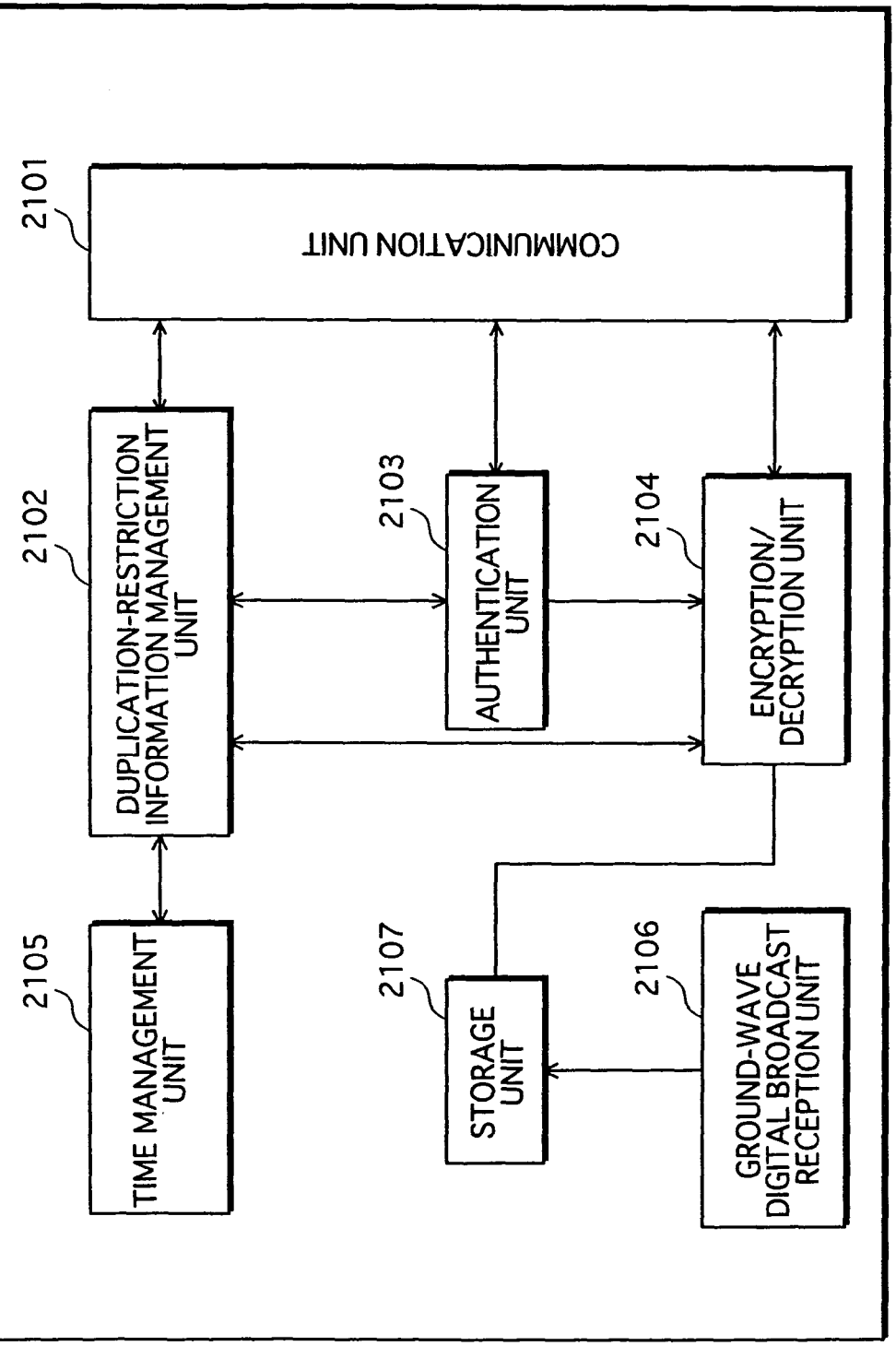
FIG. 37 is a block diagram showing a structure of a content server 2001.

FIG. 37 is a block diagram showing a structure of home server 2001.

A communication unit 2101 conducts TCP/IP communication with other apparatuses via a network.

A duplication-restriction information (DRI) management unit 2102 conducts controls pertaining to content duplication.

Figures 38A, 38B:
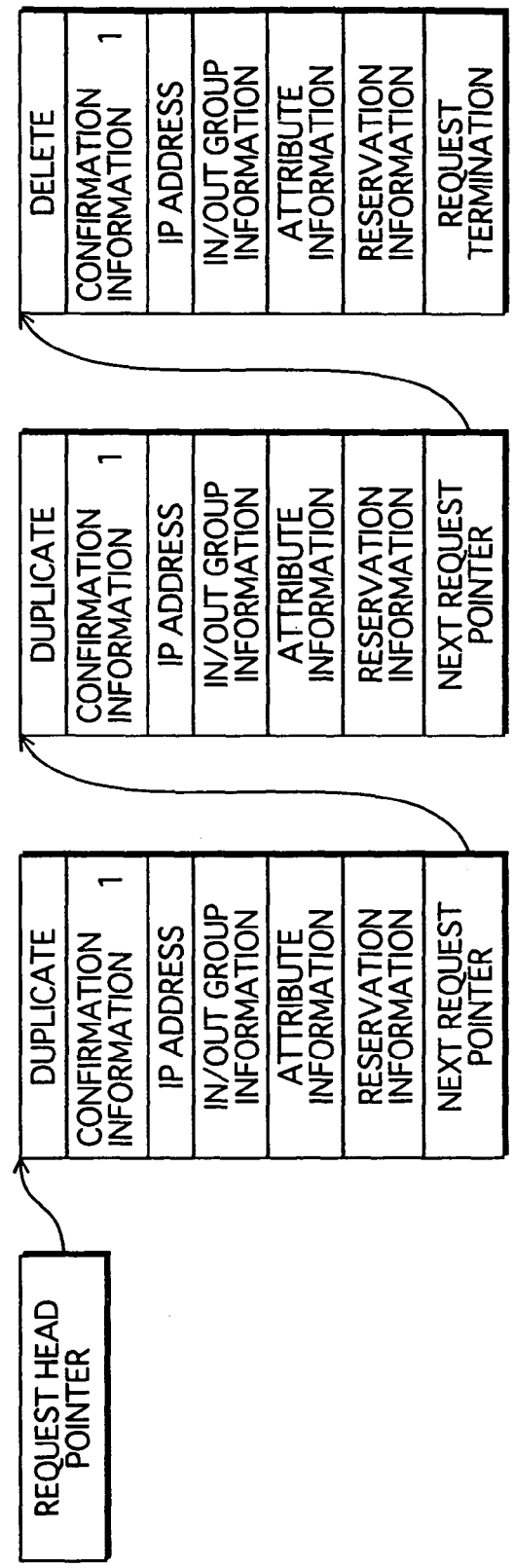
FIGS. 38A/38B show information held by a duplication-restriction information management unit 2102.

FIGS. 38A and 38B shows information held by DRI management unit 2102.

FIG. 38A shows duplication-restriction information held by DRI management unit 2102. Duplication-restriction information is information corresponded with contents, and is formed from a content identifier (ID), an in-group apparatus remaining number, an in-group medium remaining number, out-group apparatus remaining number, out-group medium remaining number, and usage period information.

Duplication-restriction information is information relating to contents acquired as a result of broadcasts from broadcast station 2007, and is acquired from broadcast station 2007 via a network, as compared with broadcasts transmitted from broadcast station 2007.

A content ID is allotted to each content, and uniquely identifies the respective content.

The in-group apparatus remaining number shows the remaining number of duplications of a content identified by a content ID that can be made to an in-group apparatus.

When a content is duplicated to an in-group apparatus, DRI management unit 2102 subtracts "1" from the in-group apparatus remaining number.

When an in-group apparatus deletes a duplicated content, DRI management unit 2102 adds "1" to the in-group apparatus remaining number.

The out-group apparatus remaining number shows the remaining number of duplications of a content identified by a content ID that can be made to an out-group apparatus.

When a content is duplicated to an out-group apparatus, DRI management unit 2102 subtracts "1" from the in-group apparatus remaining number.

When an out-group apparatus deletes a duplicated content, DRI management unit 2102 adds "1" to the out-group apparatus remaining number.

The in-group medium remaining number shows the remaining number of duplications of a content identified by a content ID that can be made to an in-group recording medium.

The out-group medium remaining number shows the remaining number of duplications of a content identified by a content ID that can be made to an out-group recording medium.

For example, in the case of playback apparatus 2002 in group 2010 requesting server 2001 for content duplication, DRI management unit 2102 gives permission with respect to the request when the in-group apparatus remaining number is "1" or greater, and notifies a rejection with respect to the request when the in-group apparatus remaining number is "0".

When a content is duplicated from home server 2001 to playback apparatus 2002, DRI management unit 2102 subtracts "1" from the in-group apparatus remaining number.

Also, when playback apparatus 2002 notifies server 2001 of the deletion of a duplicated content, DRI management unit 2102 adds "1" to the in-group apparatus remaining number.

Usage period information is information showing a period during which usage of a content is possible.

Usage period information shows, for example, a specific date-time such as 30 Jun. 2005.

When usage period information has been determined and a content duplicated, DRI management unit 2102 notifies the usage period information to a timer included in a time management unit 2105, and instructs time management unit 2105 to output an expiry date-time reached notification at the time shown in the usage period information.

When an expiry date-time reached notification is acquired from time management unit 2105, DRI management unit 2102 judges usage of the duplicated content to have ended, and adds "1" to the in-group apparatus remaining number.

Usage period management processing is described in a later section.

DRI management unit 2102 receives, by broadcast from an apparatus requesting content duplication (hereinafter "request apparatus"), a confirmation request that includes confirmation information identifying a content that the request apparatus has targeted for duplication.

When this broadcast is received, DRI management unit 2102 confirms, via communication unit 2101, whether duplication-restriction information that includes a content ID matching the confirmation information is being managed therein, and if judged in the affirmative, DRI management unit 2102 transmits a duplication permission notification showing "duplication permitted" to the transmission source of the broadcast (i.e., the request apparatus).

Also, when an ICMP (Internet Control Message Protocol) echo request message is received, DRI management unit 2102 transmits an ICMP echo reply message to the request apparatus.

DRI management unit 2102 receives a duplication request from the request apparatus that includes the confirmation information and attribute information showing "medium" or "apparatus", and transmits an authentication start instruction to an authentication unit 2103.

DRI management unit 2102 generates request management information based on the duplication request.

Request management information is formed from a processing classification showing "duplicate" or "delete", confirmation information identifying a content, the IP address of a request apparatus, in/out group information showing whether a request apparatus is in-group or out-group, attribute information showing whether a request apparatus is an apparatus or a recording medium, reservation information, and a next request pointer showing the location in which the next piece of request management information is held.

Reservation information shows a time at which to start duplication or deletion of a content.

Reservation information shows, for example, a specific date-time such as 30 Jun. 2005.

DRI management unit 2102 acquires reservation information from the request apparatus together with a duplication reservation request.

FIG. 38B shows a request management queue for managing request management information.

In FIG. 38B is shown an example in which three pieces of request management information are joined together in the request management queue.

When a duplication request is received, DRI management unit 2102 writes the IP address of the request apparatus and the confirmation and attribute information included in the duplication request into a generated piece of request management information.

DRI management unit 2102 acquires in/out group information from authentication unit 2103, and writes the acquired in/out group information into the request management information.

Home server 2001 conducts corresponding processing in order, starting with a request shown by the request management information indicated by a request head pointer.

Once the corresponding processing has ended, DRI management unit 2102 rewrites the request head pointer to indicate the request management information shown by the next request pointer in the request management information currently processed.

Also, when a new request is acquired from another apparatus, DRI management unit 2102 newly creates request management information responding to the acquired request, and joins the newly created request management information to the end of the queue.

When the processing classification in the request management information shows "duplicate", DRI management unit 2102 selects a target remaining number for processing from the in-group and out-group apparatus/medium remaining numbers, based on a combination of the in/out group information and the attribute information included in the request management information.

For example, when the in/out group information shows "in-group" and the attribute information shows "apparatus", the target remaining number will be the in-group apparatus remaining number, and when the in/out group information shows "in-group" and the attribute information shows "medium", the target remaining number will be the in-group medium remaining number.

Next, DRI management unit 2102 investigates whether the target remaining number included in duplication-restriction information whose content ID matches the confirmation information in the request management information is "0".

If not "0", DRI management unit 2102 judges the content identified by the content ID to be duplicable, and if "0", DRI management unit 2102 judges the content to be unduplicable.

If judged to be duplicable, DRI management unit 2102 instructs an encryption/decryption unit 2104 to encrypt the content and transmit the encrypted content to the request apparatus.

Encryption/decryption unit 2104 encrypts the content and transmits the encrypted content to the request apparatus.

When the processing classification in the request management information shows "delete", DRI management unit 2102 selects a target remaining number for processing from the in-group and out-group apparatus/medium remaining numbers, based on a combination of the in/out group information and attribute information included in the request management information.

DRI management unit 2102 transmits a return processing start notification to the request apparatus.

Also, when a deletion-completed notification is received from the request apparatus, DRI management unit 2102 adds "1" to the target remaining number included in duplicate-restriction information whose content ID matches the confirmation information in the request management information.

DRI management unit 2102 deletes the request management information from the queue head to update the request management queue.

Also, DRI management unit 2102 receives a transfer request for duplication-restriction information from a request apparatus.

DRI management unit 2102 conducts processing to transfer at least part of the managed duplication-restriction information to another apparatus.

Duplication-restriction information (DRI) transfer processing is described in a later section.

DRI management unit 2102 receives a duplication reservation request from a request apparatus via communication unit 2101.

A duplication reservation request includes specification information showing a content relating to the duplication reservation request, and reservation information showing a start time of content duplication.

When the duplication reservation request is received, DRI management unit 2102 judges whether a content ID matching the specification information included in the duplication reservation request is being held, and if judged to be held, unit 2102 holds the reservation information in correspondence with the content ID.

Also, DRI management unit 2102 notifies the reservation information to the timer included in time management unit 2105 and instructs time management unit 2105 to output a reservation-time reached notification at the time shown in the reservation information.

Reservation management processing is described in a later section.

Authentication unit 2103 receives an authentication start instruction from DRI management unit 2102, and executes mutual authentication and key sharing with the request apparatus.

Also, authentication unit 2103 holds group affiliation information showing that home server 2001 belongs to group 2010.

Group affiliation information is, the same as above, formed from common secret information distributed to each apparatus/recording medium secretly, and a device list of devices structuring the group, the device list being issued by a third party known as a CA.

Mutual authentication and key sharing are described in a later section.

When the mutual authentication and key sharing are successful, authentication unit 2103 and the request apparatus share session keys, which are the same key.

Authentication unit 2103 holds the session key, and also notifies the session key to encryption/decryption unit 2104.

Authentication unit 2103 receives group affiliation information from the request apparatus.

Authentication unit 2103 judges whether the received group affiliation information matches the held group affiliation information, and notifies in/out group information to DRI management unit 2102 showing "in-group" if judged to match and "out-group" if judged to not match.

Encryption/decryption unit 2104 acquires the session key from authentication unit 2103, in the case of the mutual authentication and the key sharing conducted by authentication unit 2103 being successful.

Encryption/decryption unit 2104 conducts encryption of data to be transmitted to the request apparatus, and decryption of data received from the request apparatus, using the session key, in the case of the mutual authentication and the key sharing being successful.

Time management unit 2105 includes a clock and a timer.

The clock, for example, counts up in 1-second increments, and is constituted by a counter that shows the seconds counted from 00:00:00, 1 Jan. 1970.

A timer notification request time is set in the timer by a notification request source.

The timer sends a notification to the notification request source showing that the set time has been reached, when the clock indicates the time shown by the timer notification request time.

A ground-wave digital broadcast (GDB) reception unit 2106 receives programs from broadcast station 2007.

GDB reception unit 2106 acquires video information, audio information, data broadcast information, control information, required in content playback, that includes a content ID, and other information, by conducting demodulation, demultiplexing, decryption and the like using a specified method, with respect to received broadcast signals.

GDB reception unit 2106 converts the video information, audio information, and data broadcast information to a predetermined digital data format (e.g., TS packets), and outputs the digital data to a storage unit 2107 as contents.

Storage unit 2107 stores contents received from GDB reception unit 2106 in correspondence with content IDs.

Storage unit 2107 is tamper-resistant, and information held therein cannot be accessed from sources external to home server 2101.

4.2.2 Playback Apparatus 2002

Playback apparatus 2002 is specifically a DVD player or the like that has a network communication function and a hard disk having a mass-storage storage area.

Figure 39:
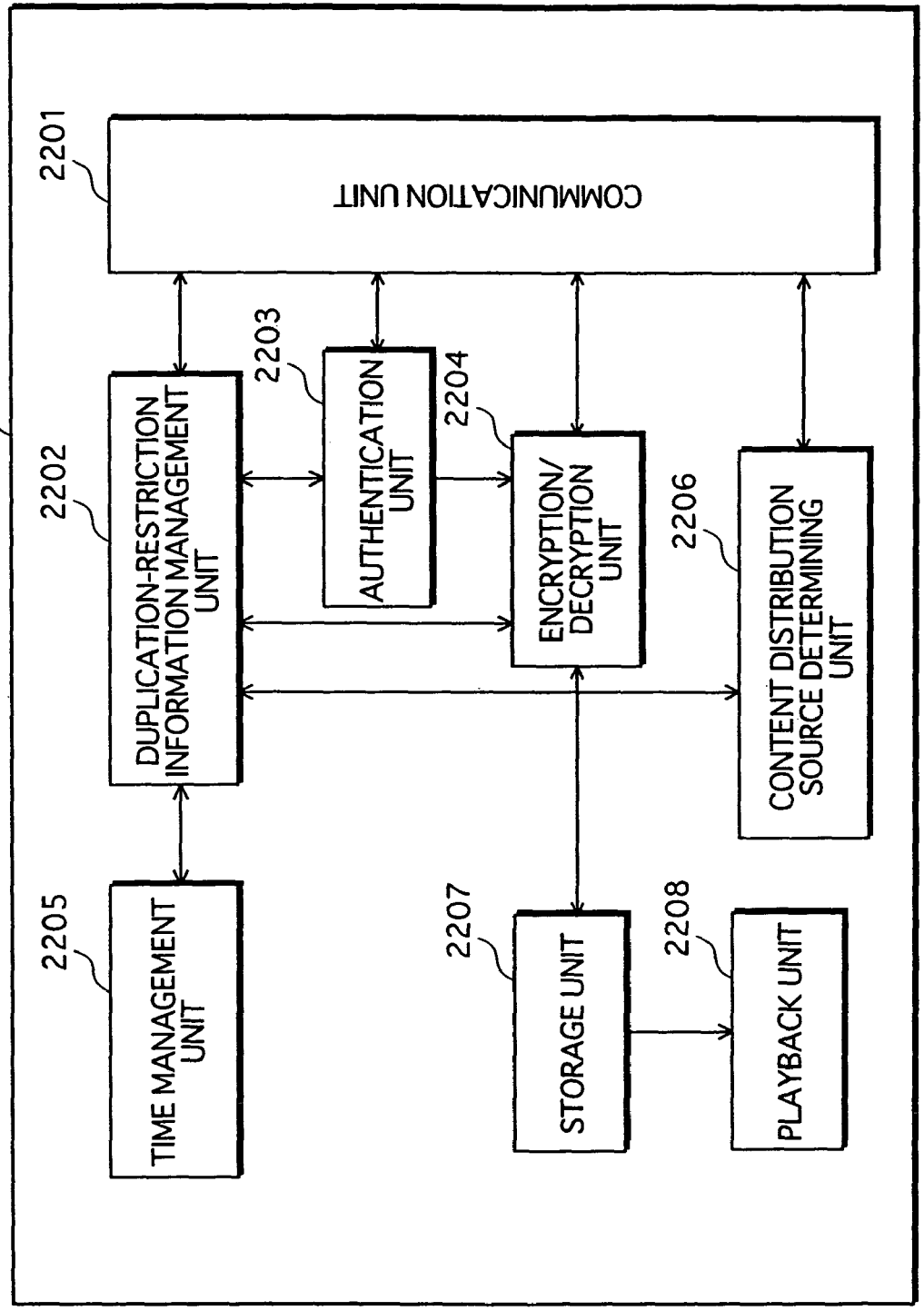
FIG. 39 is a block diagram showing a structure of a playback apparatus 2002.

FIG. 39 is a block diagram showing a structure of playback apparatus 2002.

A communication unit 2201 conducts TCP/IP communication with other apparatuses via a network.

A duplication restriction information (DRI) management unit 2202 manages content duplication.

Since the operations of DRI management unit 2202 are substantially the same as DRI management unit 2102, the following description relates to the differences.

DRI management unit 2202 transmits, to a content duplication source, a duplication request that includes confirmation information identifying a content targeted for duplication and attribute information showing "medium" or "apparatus".

The attribute information is information showing "apparatus" when the transmission source is an apparatus such as playback apparatus 2002, and "medium" when the transmission source is a recording medium such as recording medium 2004.

As such, attribute information transmitted by playback apparatus 2002 shows "apparatus".

Duplication restriction information is managed by a server that conducts content distribution.

Playback apparatus 2002 possesses rights to distribute contents, as a result of receiving transfer of rights permitting duplication from home server 2001, which possesses rights permitting content duplication.

DRI management unit 2202 acquires, from home server 2001, a content ID, the in-group remaining apparatus number, the out-group apparatus remaining number, the in-group medium remaining number, the out-group medium remaining number, and usage period information, and holds the received information as duplication-restriction information.

DRI management unit 2202 is structured the same as DRI management unit 2102.

Here, playback apparatus 2002 is not required to hold a content corresponding to the acquired content ID, and another apparatus may hold the content corresponding to the content ID.

In this case, DRI management unit 2202, when a duplication request for the content is received from another apparatus and duplication of the content is permitted, instructs an apparatus holding the content to transmit the content to the apparatus that made the duplication request.

Also, in-group and out-group apparatus/medium remaining numbers acquired from home server 2001 may be only part, rather than all, of the corresponding remaining numbers held by home server 2001.

For example, home server 2001 may, when holding a value of "10" as the in-group apparatus remaining number, only transfer a value of "5" as the in-group apparatus remaining number.

In this case, playback apparatus 2002 possesses rights that permit up to five duplications of the content, with respect to in-group apparatuses.

Also, playback apparatus 2002 may return all or part of the duplication-restriction information acquired from home server 2001.

For example, playback apparatus 2002 may only return a value of "2" to home server 2001 as the in-group apparatus remaining number.

The transfer and return of duplication-restriction information are described in a later section.

An authentication unit 2203 executes mutual authentication and key sharing with an apparatus for authenticating (hereinafter "authentication apparatus").

Authentication unit 2203 holds group affiliation information showing that playback apparatus 2002 belongs to group 2010.

Mutual authentication and key sharing are described in a later section.

When the mutual authentication and the key sharing are successful, authentication unit 2203 and the authentication apparatus share session keys, which are the same key.

Authentication unit 2203 holds the session key, and also notifies the session key to an encryption/decryption unit 2204.

Encryption/decryption unit 2204 acquires the session key from authentication unit 2203, in the case of the mutual authentication and the key sharing conducted by authentication unit 2203 being successful.

Encryption/decryption unit 2204 conducts encryption of data to be transmitted to the authentication apparatus, and decryption of data received from the authentication apparatus, using the session key, in the case of the mutual authentication and the key sharing being successful.

A time management unit 2205 includes a clock and a timer.

The clock, for example, counts up in 1-second increments, and is constituted by a counter that shows the seconds counted from 00:00:00, 1 Jan. 1970.

A timer notification request time is set in the timer by a notification request source.

The timer sends a notification to the notification request source showing that the set time has been reached, when the clock indicates the time shown by the timer notification request time.

A content distribution source (CDS) determining unit 2206 determines, from servers and/or apparatuses that have received transfer of content duplication rights, a distribution-source apparatus from which to receive content duplication permission.

CDS determining unit 2206 broadcasts, over a network, a confirmation request that includes confirmation information showing a content targeted for duplication.

CDS determining unit 2206 transmits an ICMP echo request message to apparatuses that respond to the confirmation request in the order in which the replies are received, and measures the round-trip time, which is the time period from transmission of the ICMP echo request message until reception of an ICMP echo reply message.

CDS determining unit 2206 determines the apparatus with the shortest round-trip time as the distribution source apparatus, and notifies the determined distribution source apparatus to DRI management unit 2202.

A storage unit 2207 holds contents.

A playback unit 2208 plays contents held by storage unit 2207 or contents received by communication unit 2201.

4.2.3 Playback Apparatus 2003

Playback apparatus 2003 is specifically an SD player that has a network communication function.

Figure 40:
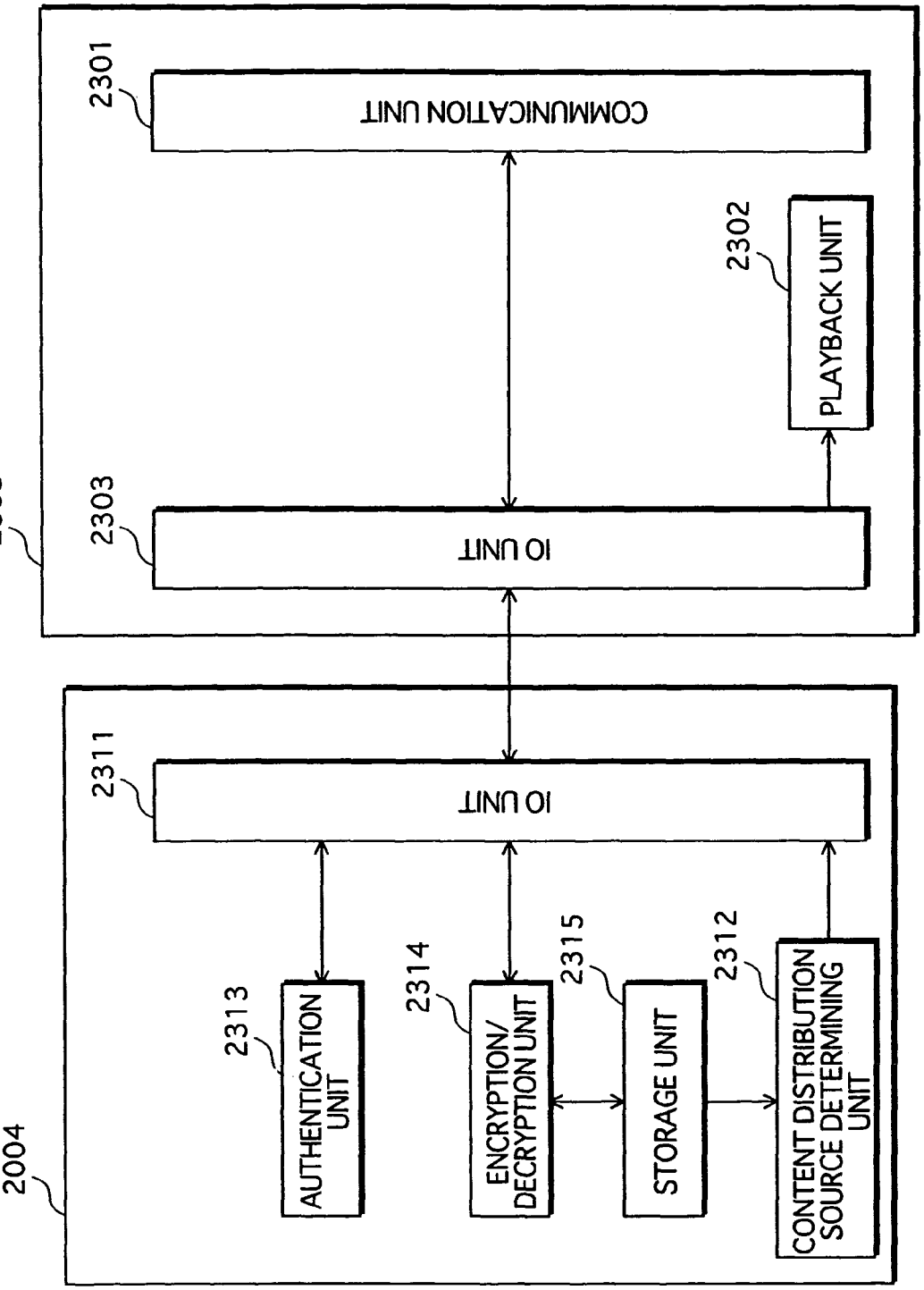
FIG. 40 is a block diagram showing a structure of a playback apparatus 2003 and an internal IC portable recording medium 2004.

FIG. 40 is a block diagram showing a structure of playback apparatus 2003 and internal IC portable recording medium 2004.

A communication unit 2301 conducts TCP/IP communication with other apparatuses via a network.

An input/output (IO) unit 2303 is connected to and communicates with recording medium 2004.

A playback unit 2302 plays contents read from recording medium 2004.

4.2.4 Recording Medium 2004

Recording medium 2004 is specifically an SD card that is tamper-resistant and has an internal IC.

An input/output (IO) unit 2311 communicates with playback apparatus 2003.

Recording medium 2004 communicates with other apparatuses via playback apparatus 2003.

The description of a content distribution source (CDS) determining unit 2312 is the same as the description of CDS determining unit 2206.

CDS determining unit 2312 transmits a duplication request that includes confirmation information and attribute information to the apparatus determined as the distribution source apparatus.

An authentication unit 2313 communicates with an apparatus for authenticating (hereinafter "authentication apparatus") via playback apparatus 2003 and a network, and executes mutual authentication and key sharing with the authentication apparatus.

Authentication unit 2313 holds group affiliation information showing that recording medium 2004 belongs to group 2010.

Mutual authentication and key sharing are described in a later section.

When the mutual authentication and key sharing are successful, authentication unit 2313 and the authentication apparatus share session keys, which are the same key.

Authentication unit 2313 holds the session key, and also notifies the session key to an encryption/decryption unit 2314.

Encryption/decryption unit 2314 acquires the session key from authentication unit 2313, in the case of the mutual authentication and the key sharing conducted by authentication unit 2313 being successful.

Encryption/decryption unit 2314 conducts encryption of data to be transmitted to the authentication apparatus, and decryption of data received from the authentication apparatus, using the session key, in the case of the mutual authentication and the key sharing being successful.

A storage unit 2315 holds contents.

4.2.5 Playback Apparatus 2006

Playback apparatus 2006 is specifically a DVD player or the like that has a network communication function and a hard disk having a mass-storage storage area.

Figure 41:
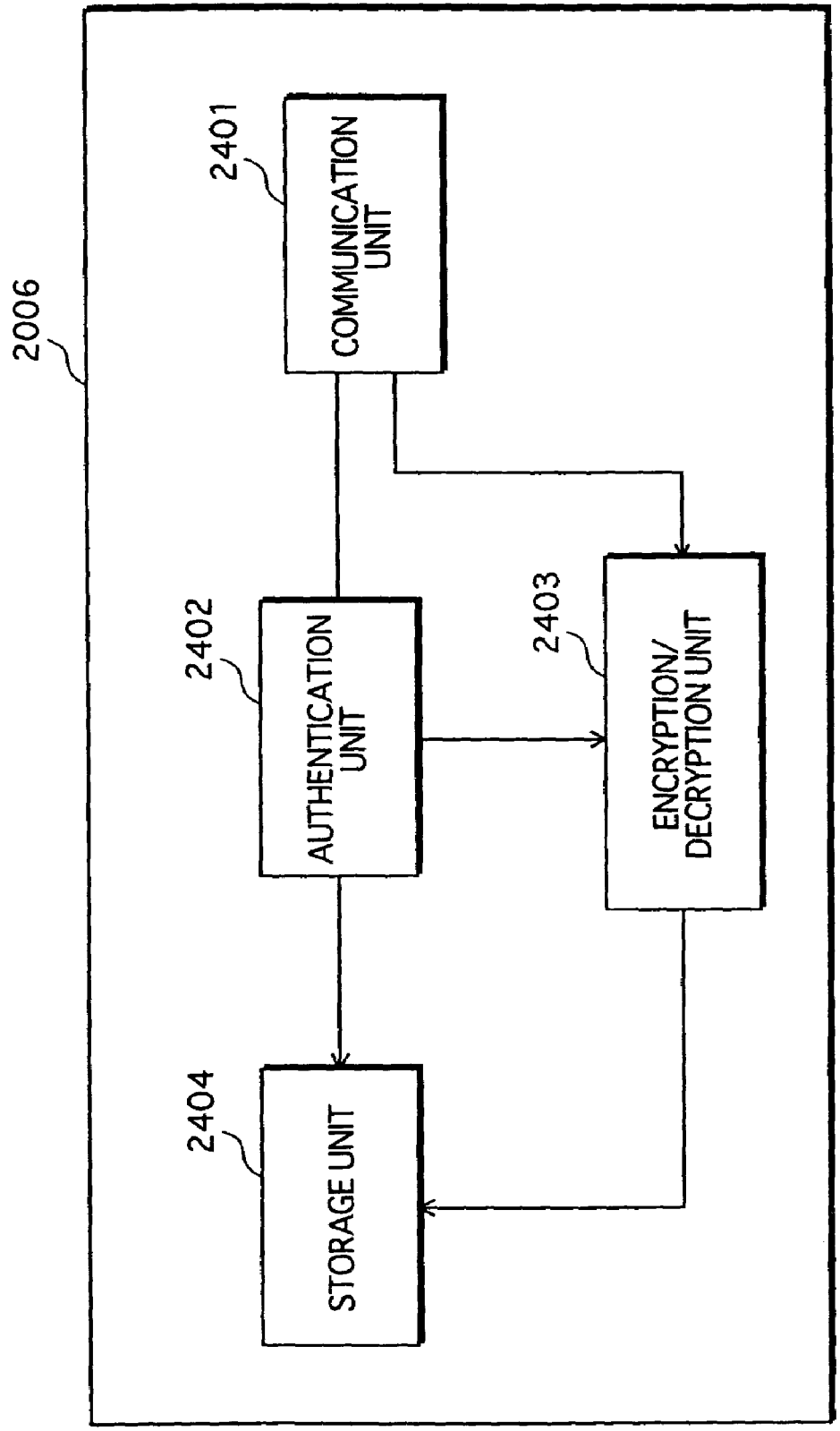
FIG. 41 is a block diagram showing a structure of a playback apparatus 2006.

FIG. 41 is a block diagram showing a structure of playback apparatus 2006.

A communication unit 2401 conducts TCP/IP communication with other apparatuses via a network.

An authentication unit 2402 executes mutual authentication and key sharing with a server holding contents.

Authentication unit 2402, however, does not hold group affiliation information, and so playback apparatus 2006 is judged in home server 2001 to be an out-group apparatus.

Mutual authentication and key sharing are described in a later section.

When the mutual authentication and the key sharing are successful, authentication unit 2402 and the server share session keys, which are the same key.

Authentication unit 2402 holds the session key and also notifies the session key to an encryption/decryption unit 2403.

Encryption/decryption unit 2403 acquires the session key from authentication unit 2402, in the case of the mutual authentication and the key sharing conducted by authentication unit 2402 being successful.

Encryption/decryption unit 2403 conducts encryption of data to be transmitted to the server, and decryption of data received from the server, using the session key, in the case of the mutual authentication and the key sharing being successful.

A storage unit 2404 holds contents.

4.3 Operations

4.3.1 Duplication-Source Determination Processing

A request apparatus determines, from apparatuses connected to a network, a delivery apparatus as the content duplication source.

Figure 42:
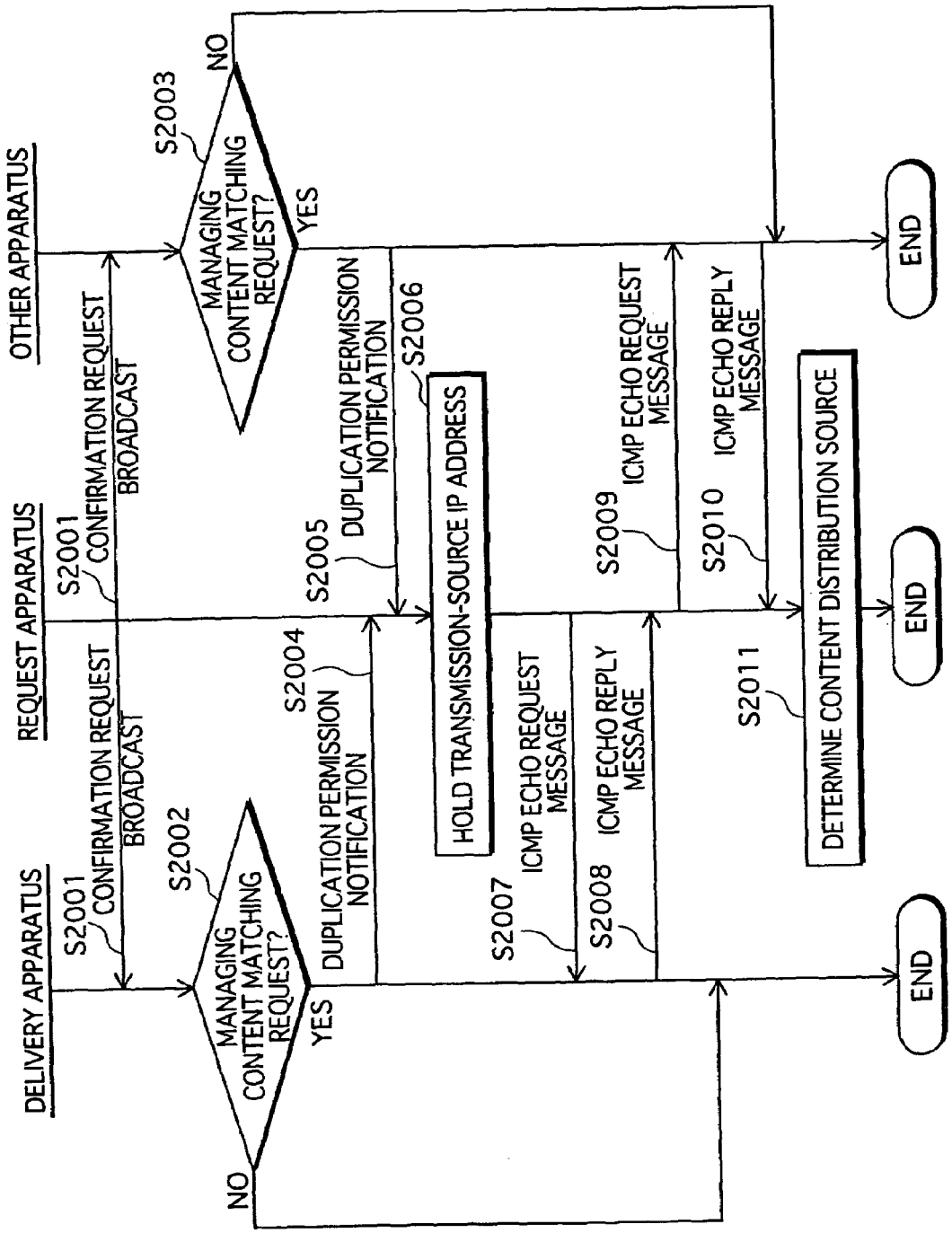
FIG. 42 is a flowchart showing duplication-source determination processing.

FIG. 42 is a flowchart showing duplication-source determination processing.

In the given example, the request apparatus, the delivery apparatus, and the other device are playback apparatus 2002, home server 2001, and playback apparatus 2003, respectively.

The "delivery apparatus" is the apparatus selected from among possible delivery apparatuses as the duplication source, as a result of duplication-source determination processing.

The "other apparatus" is the apparatus not selected from among possible delivery apparatuses as the duplication source, as a result of the duplication-source determination processing.

The "request apparatus" is the apparatus that requests content duplication, and thus if the playback apparatus 2003 makes a content duplication request, playback apparatus 2003 is the request apparatus.

The request apparatus determines which apparatus to request for duplication of a content targeted for duplication (i.e., shown by the confirmation information).

Specifically, the request apparatus broadcast transmits a confirmation request over a network, with the aim of acquiring a response from apparatuses holding the targeted content (S2001).

The confirmation request includes confirmation information identifying the content targeted by the request apparatus for duplication.

The delivery apparatus and the other apparatus receive the confirmation request.

The delivery apparatus confirms whether a content ID matching the confirmation information in the confirmation request is being managed therein (S2002).

The other apparatus confirms whether a content ID matching the confirmation information in the confirmation request is being managed therein (S2003).

The delivery apparatus, when managing a matching content ID (S2002=YES), transmits a duplication permission notification to the request apparatus showing "duplication permitted" (S2004).

The delivery apparatus, when not managing a matching content ID (S2002=NO), ends the processing.

The other apparatus, when managing a matching content ID (S2003=YES), transmits a duplication permission notification to the request apparatus showing "duplication permitted" (S2005).

The other apparatus, when not managing a matching content ID (S2003=NO), ends the processing.

The request apparatus confirms the content of received duplication permission notifications, and holds a transmission source IP address of apparatuses that transmitted a duplication permission notification showing "duplication permitted" (S2006).

The request apparatus transmits an ICMP echo request message to apparatuses having the held IP addresses, and measures the round-trip time from the transmission time until receipt of an ICMP echo reply message.

The request apparatus transmits an ICMP echo request message to the delivery apparatus (S2007).

The delivery apparatus receives the ICMP echo request message and in response transmits an ICMP echo reply message to the request apparatus (S2008).

The request apparatus receives the ICMP echo reply message from the delivery apparatus and holds the measured round-trip time.

The request apparatus transmits an ICMP echo request message to the other apparatus (S2009).

The other apparatus receives the ICMP echo request message and in response transmits an ICMP echo reply message to the request apparatus (S2010).

The request apparatus receives the ICMP echo reply message from the other apparatus, and holds the measured round-trip time.

The request apparatus selects the apparatus having the shortest round-trip time as the duplication-source apparatus, and holds the IP address of the selected apparatus (S2011).

4.3.2 Mutual Authentication and Key Sharing

Figure 43:
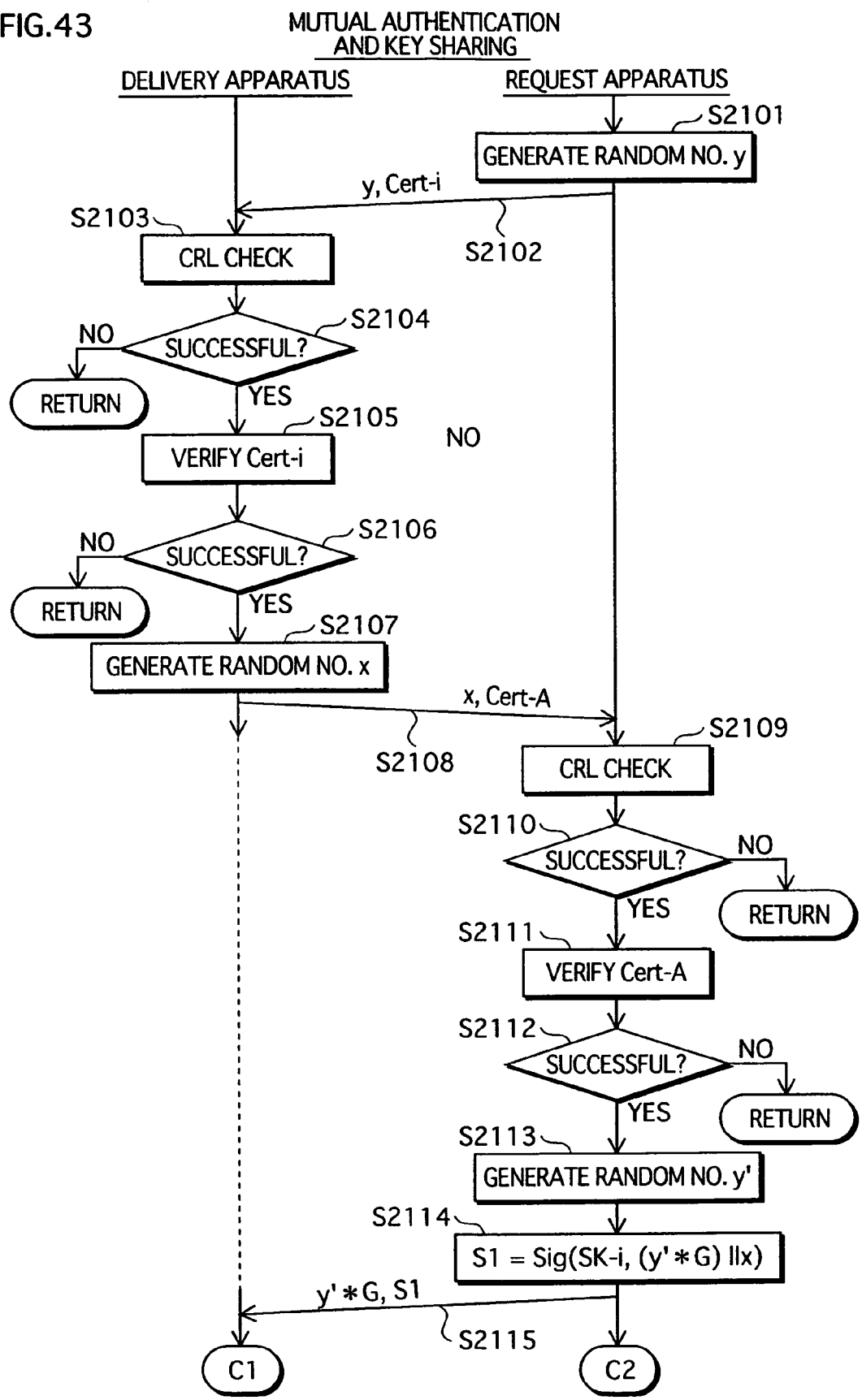
FIG. 43 is a flowchart showing mutual device authentication and key sharing operations conducted between a delivery apparatus and a request apparatus (cont.
Figure 44:
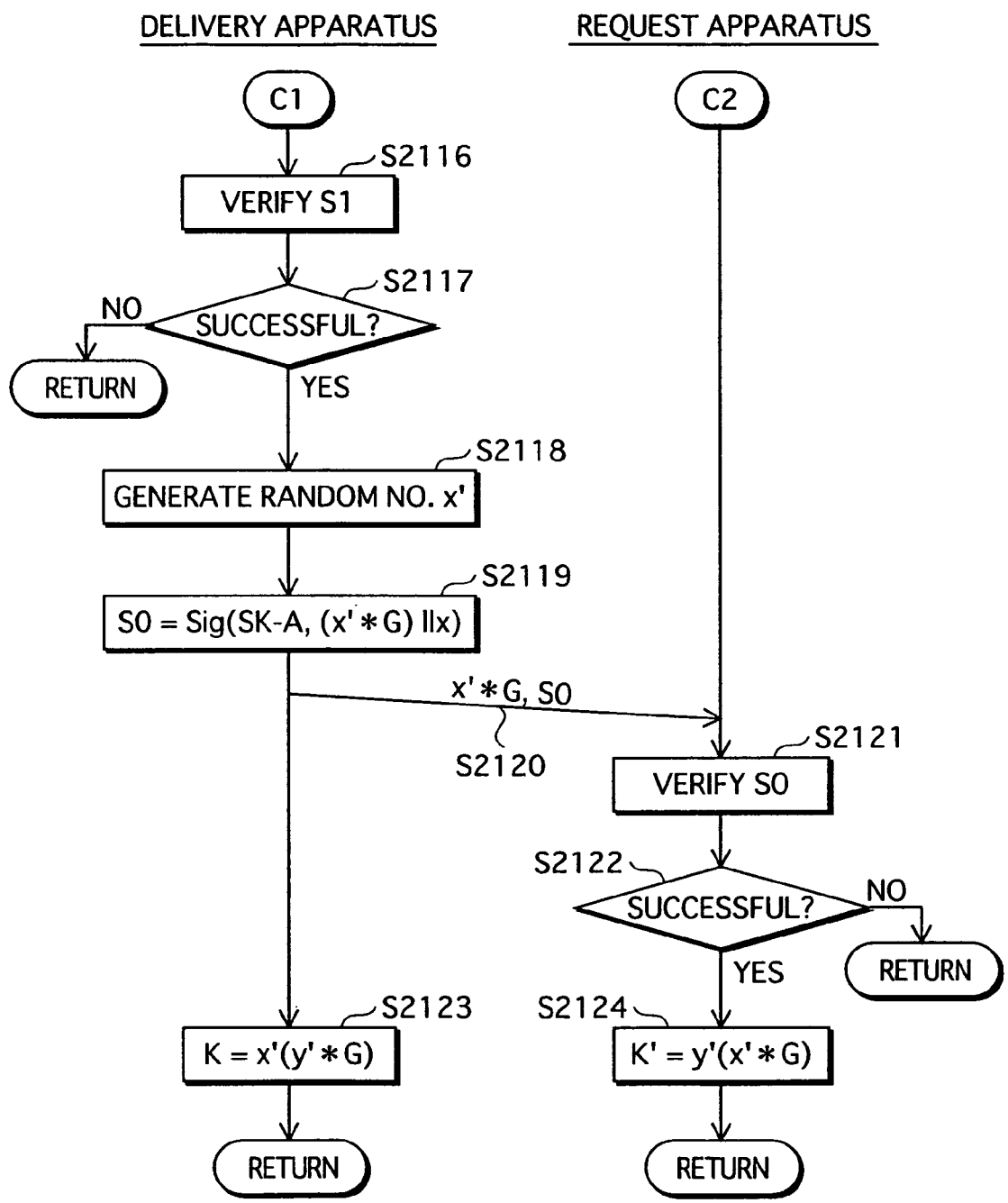
in FIG. 44)

FIGS. 43 and 44 are flowcharts showing mutual device authentication and key sharing operations conducted between a delivery apparatus and a request apparatus.

In the given example, playback apparatus 2002 selects home server 2001 as the duplication source, as a result of the duplication-source determination processing shown in FIG. 42.

As such, the following description relates to an example in which the delivery apparatus is home server 2001 and the request apparatus is playback apparatus 2002.

Authentication unit 2103 in host server 2001 prestores a public key PK-CA of a certification authority (CA), a secret key SK-A and a public key certificate Cert-A, and has an encryption unit as a result of an elliptic curve E.

Also, authentication unit 2203 in playback apparatus 2002 prestores a public key PK-CA of the CA, a secret key SK-i and a public key certificate Cert-i, and has an encryption unit as a result of elliptic curve E.

Also, Sig (SK,D) is an operation in which a digital signature is performed on data D using a secret key SK.

Also, "G" is a base point on elliptic curve E, and is a value unique to the present authentication system.

Also, "*" is an operand showing multiplication over elliptic curve E.

For example, "x*G" is an operation in which point G on elliptic curve E is added together x times.

"||" is an operand showing a concatenation operation, and "A||B" for example results from "A" and "B" being concatenated.

Below, "authentication unit 2103 outputs information to authentication unit 2203", "authentication unit 2203 outputs information to authentication unit 2103" and so forth are abbreviated sentences whose expanded meanings are respectively, "authentication unit 2103 outputs information to authentication unit 2203 via communication unit 2101 and communication unit 2201", "authentication unit 2203 outputs information to authentication unit 2103 via communication unit 2201 and communication unit 2101".

Authentication unit 2203 generates a random number y (S2101), and outputs the generated random number y and public key certificate Cert-i to authentication unit 2103 (S2102).

Authentication unit 2103 receives random number y and public key certificate Cert-i (S2102), and confirms that public key certificate Cert-i of playback apparatus 2002 is not revoked, using a CRL (S2103).

If revoked (S2104=NO), authentication unit 2103 ends the processing.

If not revoked (S2104=YES), authentication unit 2103 verifies public key certificate Cert-i using public key PK-CA (S2105).

If verification fails (S2106=NO), authentication unit 2103 ends the processing.

If verification succeeds (S2106=YES), authentication unit 2103 generates a random number x (S2107), and outputs the generated random number x and public key certificate Cert-A to authentication unit 2203 (S2108).

Authentication unit 2203 receives random number x and public key certificate Cert-A from authentication unit 2103 (S2108).

Next, authentication unit 2203 confirms that public key certificate Cert-A of home server 2001 is not revoked, using the CRL (S2109).

If revoked (S2110=NO), authentication unit 2203 ends the processing.

If not revoked (S2110=YES), authentication unit 2203 verifies public key certificate Cert-A using public key PK-CA (S2111).

If verification fails (S2112=NO), authentication unit 2203 ends the processing.

If verification succeeds (S2112=YES), authentication unit 2203 generates a random number y' (S2113), and signature data S1=Sig (SK-i, (Y'*G)||x) (S2114) and outputs y'*G and S1 to authentication unit 2103 (S2115).

Authentication unit 2103 receives y'*G and S1 from authentication unit 2103 (S2115).

Authentication unit 2103 verifies S1 (S2116).

If verification fails (S2117=NO), authentication unit 2103 ends the processing.

If verification succeeds (S2117=YES), authentication unit 2103 generates a random number x' (S2118) and signature data S0=Sig (SK-i, (x'*G)||x) (S2119), and outputs x'*G and S0 to authentication unit 2203 (S2120).

Authentication unit 2203 receives x'*G and S0 from authentication unit 2103 (S2120), and verifies S0 (S2121).

If verification fails (S2122=NO), authentication unit 2203 ends the processing.

If verification succeeds (S2122=YES), authentication unit 2203 calculates a session key K'=y' (x'*G) (S2124).

On the other hand, authentication unit 2103 calculates a session key K=x' (y'*G) (S2123).

In this way, mutual device authentication and key sharing are conducted between home server 2001 and playback apparatus 2002.

Session keys K and K' are keys having the same value shared in home server 2001 and playback apparatus 2002.

4.3.3 Duplication Processing

FIG. 42 is a flowchart showing duplication processing

The following description relates to an example in which the request apparatus, the delivery apparatus and the other apparatus in FIG. 42 are playback apparatus 2002, home server 2001, and playback apparatus 2003, respectively.

The delivery apparatus, the request apparatus, and the other apparatus conduct the duplication-source determination processing shown in FIG. 42 (S2201).

In the given example, the request apparatus selects home server 2001 as the delivery apparatus (i.e., duplication source), as a result of the duplication-source determination processing.

The request apparatus transmits a duplication request that includes confirmation information identifying a content targeted for duplication and attribute information showing "apparatus" or "medium" to the delivery apparatus (S2202).

The delivery apparatus receives the duplication request, and holds the received duplication request together with the IP address of the request apparatus.

The delivery apparatus and the request apparatus conducted the mutual authentication and key sharing shown in FIGS. 43 and 44 (S2203).

The delivery apparatus and request apparatus share session keys as a result of the step S2203 processing.

After completion of the session key sharing, communication between the delivery apparatus and the request apparatus is encrypted/decrypted using the session keys.

The request apparatus transmits group affiliation information to the delivery apparatus (S2204).

The request apparatus judges whether the received group affiliation information matches group affiliation information held by authentication unit 2103 (S2205).

When the mutual authentication and key sharing at step S2203 are successful, the delivery apparatus generates request management information based on the held duplication request and IP address, and the step 2205 judgment result, and adds the generated request management information to the management request queue (S2206).

The delivery apparatus waits for the request management information added at step S2206 to be at the head of the queue (S2207).

When the request management information is at the head of the queue, the delivery apparatus restarts the duplication processing based on the request management information.

The delivery apparatus selects a target remaining number based on the attribute information and in/out group information included in the request management information, and judges whether the target remaining number is "0" (S2208).

The target remaining number is one selected from the in-group and out-group apparatus/medium remaining numbers.

When the in/out group information shows "in-group" and the attribute information shows "apparatus", the target remaining number will be the in-group apparatus remaining number.

Likewise, when the in/out group information shows "out-group" and the attribute information shows "apparatus", the target remaining number will be the out-group apparatus remaining number.

When the in/out group information shows "in-group" and the attribute information shows "medium", the target remaining number will be the in-group medium remaining number.

When the in/out group information shows "out-group" and the attribute information shows "medium", the target remaining number will be the out-group medium remaining number.

When the target remaining number is "0" (S2208=YES), the delivery apparatus transmits a duplication permission notification to the request apparatus showing "duplication not permitted" (S2209).

The request apparatus judges whether a duplication permission notification showing "duplication not permitted" has been received from the delivery apparatus (S2210).

When judged that such a duplication permission notification has been received (S2210=YES), the request apparatus ends the processing.

When the target remaining number is not "0" (S2208=NO), the delivery apparatus encrypts the content using the session key (S2211), and transmits the encrypted content to the request apparatus (S2212).

The request apparatus decrypts the encrypted content received from the delivery apparatus using the session key, and hold the decrypted content in storage unit 2207 (S2213).

The request apparatus transmits a duplication-completed notification to the delivery apparatus (S2214).

The delivery apparatus receives the duplication-completed notification from the request apparatus and subtracts "1" from the target remaining number (S2215).

The delivery apparatus deletes the request management information at the head of the request management queue to update the request management queue (S2216).

4.3.4 Duplication-Restriction Information (DRI) Transfer Processing

Another apparatus is able to possess rights permitting the duplication of the content as a result of the delivery apparatus transferring DRI information managed therein.

Figure 46:
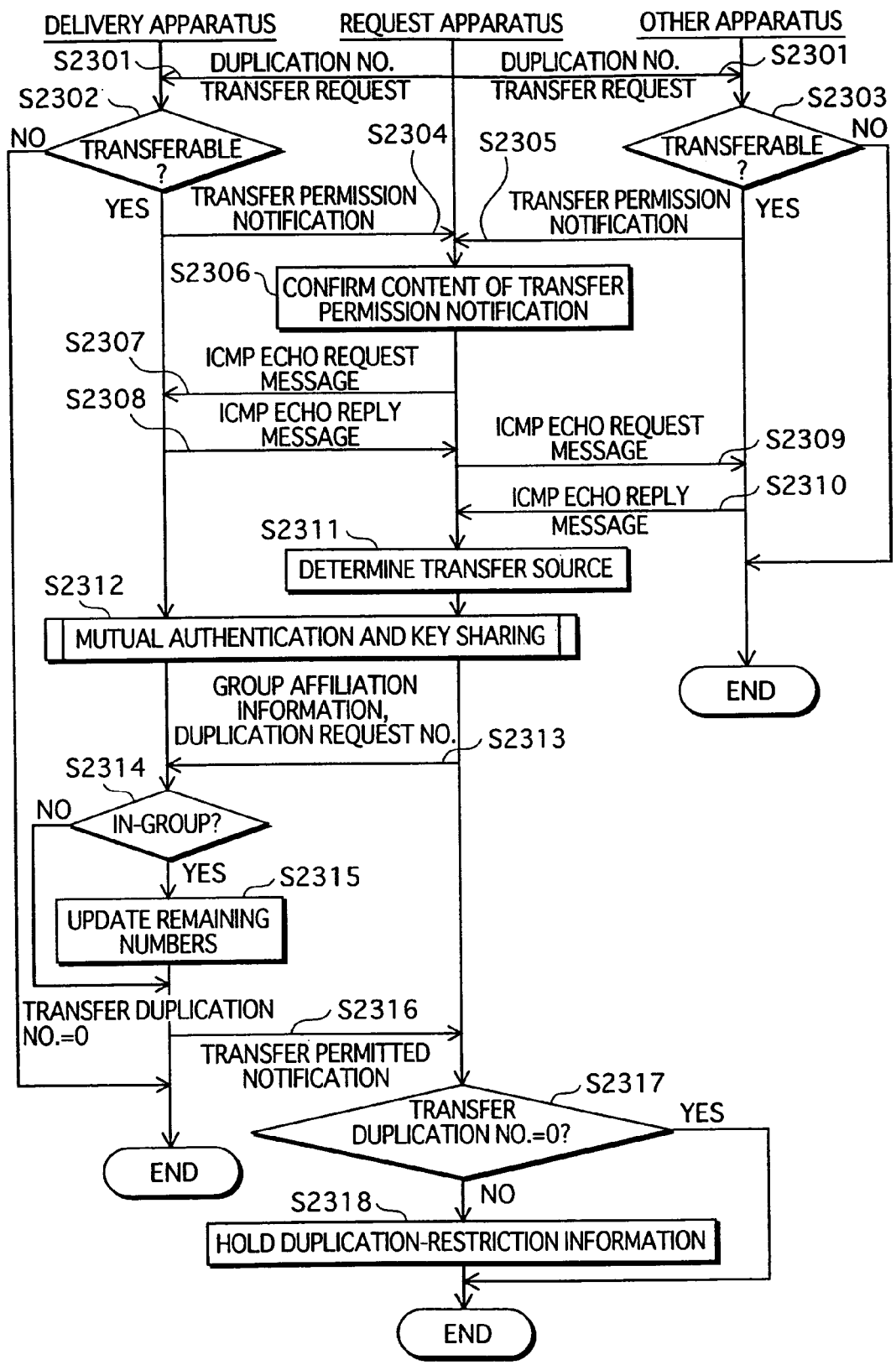
FIG. 46 is a flowchart showing duplication-restriction information transfer processing.

FIG. 46 is a flowchart showing DRI transfer processing.

In the given example, the request apparatus, the delivery apparatus, and the other apparatus are playback apparatus 2002, home server 2001, and playback apparatus 2003, respectively.

When a plurality of possible transfer-source apparatuses is operational over a network, the request apparatus firstly determines which one of these apparatuses to request for transfer.

The request apparatus broadcast transmits, over the network, a duplication number transfer request that includes confirmation information identifying a targeted content and duplication request number relating to transfer (S2301).

The duplication request number is an 8-digit number, and in the given example, from a head, the first 2 digits are the in-group apparatus remaining number, digits 3 and 4 are the out-group apparatus remaining number, digits 5 and 6 are the in-group medium remaining number, and digits 7 and 8 are the out-group medium remaining number.

For example, if the in-group apparatus remaining number is "80", the out-group apparatus remaining number is "2", the in-group medium remaining number is "50", and the out-group medium remaining number is "3", the duplication request number will be "80025003".

When the delivery apparatus manages the content identified by the broadcasted confirmation information, and also holds the in-group and out-group apparatus/medium remaining numbers included in the duplication request number, the delivery apparatus judges the content to be transferable, and judges the content to be untransferable in any other case (S2302).

When judged to be untransferable (S2302=NO), the delivery apparatus ends the processing.

Likewise, when the other apparatus manages the content identified by the broadcasted confirmation information, and also holds the in-group and out-group apparatus/medium remaining numbers included in the duplication request number, the other apparatus judges the content to be transferable, and judges the content to be untransferable in any other case (S2303).

When judged to be untransferable (S2303=NO), the other apparatus ends the processing.

The delivery apparatus, when judged to be transferable (S2302=YES), transmits a transfer permission notification to the request apparatus showing "transfer permitted" (S2304).

The other apparatus, when judged to be transferable (S2303=YES), transmits a transfer permission notification to the request apparatus showing "transfer permitted" (S2305).

The request apparatus confirms the content of received transfer permission notifications, and hold the transmission-source IP address of apparatuses that transmitted transfer permission notification showing "transfer permitted" (S2306).

The request apparatus transmits an ICMP echo request message to the apparatuses whose IP address is being held, and measures the round-trip response times from the transmission time until receipt of the ICMP echo reply messages.

The request apparatus transmits an ICMP echo request message to the delivery apparatus (S2307).

The delivery apparatus receives the ICMP echo request message, and transmits an ICMP echo reply message to the request apparatus as a response (S2308).

The request apparatus receives the ICMP echo reply message, and calculates the round-trip time.

The request apparatus transmits an ICMP echo request message to the other apparatus (S2309).

The other apparatus receives the ICMP echo request message, and transmits an ICMP echo reply message to the request apparatus as a response (S2310).

The request apparatus receives the ICMP echo reply message, and calculates the round-trip time.

The request apparatus selects the apparatus having the shortest round-trip time as the transfer-source apparatus (S2311).

The request apparatus holds the IP address of the transfer-source apparatus.

In the given example, the request apparatus selects the delivery apparatus as the transfer-source apparatus.

The request apparatus and the delivery apparatus conduct the mutual authentication and key sharing shown in FIGS. 43 and 44 (S2312).

The delivery apparatus and the delivery apparatus share session keys as a result of the S2312 processing.

After completion of the session key sharing, communication between the delivery apparatus and the request apparatus is encrypted/decrypted using the session keys.

The request apparatus transmits group affiliation information and the duplication request number to the delivery apparatus (S2313).

The delivery apparatus confirms whether the received group affiliation information matches group affiliation information held by authentication unit 2103, and judges the delivery apparatus to be in-group if matched and out-group if not matched (S2314).

When judged to be in-group (S2314=YES), the delivery apparatus subtracts the remaining numbers shown by the duplication request number from the in-group and out-group apparatus/medium remaining numbers, respectively (S2315).

For example, if the in-group apparatus remaining number held by the delivery apparatus is "99", the out-group apparatus remaining number is "10", the in-group medium remaining number is "99", and the out-group medium remaining number is "10", and the duplication request number is "30051001", the delivery apparatus will hold, after the execution of step S2315, "69" as the in-group apparatus remaining number, "5" as the out-group apparatus remaining number, "89" as the in-group medium remaining number, and "9" as the out-group medium remaining number.

The delivery apparatus sets a transfer duplication number to "30051001".

When the request apparatus is judged to be out-group (S2314=NO), the delivery apparatus sets the transfer duplication number to "0".

The delivery apparatus transmits a transfer permitted notification that includes the transfer duplication number and usage period information held by the delivery apparatus (S2316).

The request apparatus judges whether the received transfer duplication number is "0" (S2317).

When judged to be "0" (S2317=YES), the request apparatus ends the processing.

When judged to not be "0" (S2317=NO), DRI management unit 2202 in the request apparatus sets the confirmation information as a content ID, and holds, as duplication-restriction information, the content ID, the transfer duplication number and the usage period information in correspondence with each other (S2318).

4.3.5 Usage Period Management Processing

The following description relates to processing when a delivery apparatus duplicates a content having a predetermined usage expiry date-time to a request apparatus.

When the clocks included in the delivery apparatus and the request apparatus reach the time shown by the usage expiry date-time, the request apparatus deletes the content, and the delivery apparatus conducts processing to increase the remaining number of permitted duplications corresponding to the deleted content.

Figure 47:
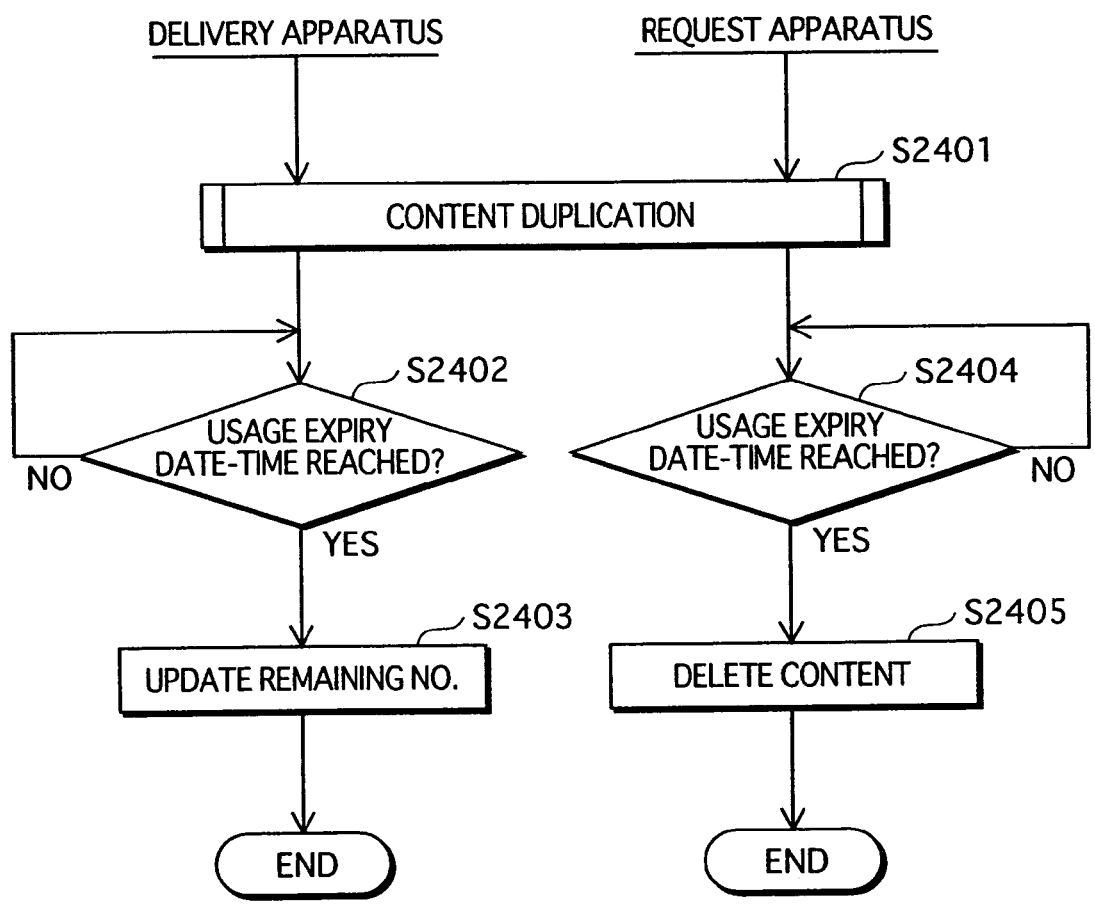
FIG. 47 is a flowchart showing usage period management processing for managing content having a determined usage expiry date-time.

FIG. 47 is a flowchart showing usage period management processing to manage contents whose usage expiry date-time has been determined.

In the given example, the delivery apparatus and request apparatus in FIG. 47 are home server 2001 and playback apparatus 2002, respectively.

Figure 45:
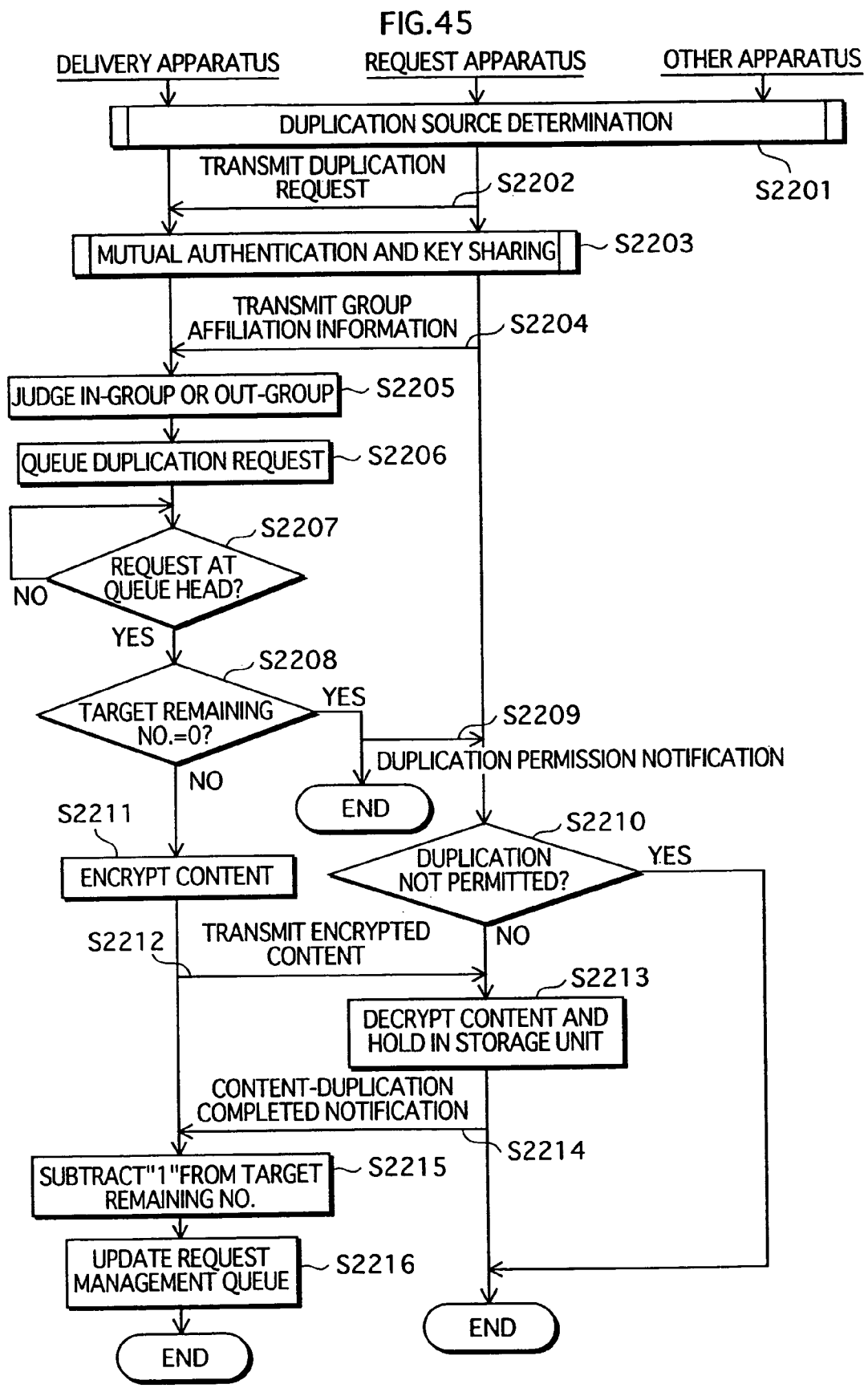
FIG. 45 is a flowchart showing duplication processing.

Content duplication as shown in FIG. 45 is conducted between the delivery apparatus and the request apparatus (S2401).

In the given example, the delivery apparatus transmits usage period information to the request apparatus at a time of transmitting the content to the request apparatus at step 2212.

The request apparatus holds the received usage period information.

The delivery apparatus instructs time management unit 2105 to output a notification when the clock in time management unit 2105 shows the usage expiry date-time in the usage period information (S2402).

When there is a notification from time management unit 2105 (S2402=YES), the request apparatus adds "1" to the remaining number corresponding to the request apparatus (S2403).

For example, when the request apparatus is an in-group apparatus, the delivery apparatus adds "1" to the in-group apparatus remaining number in the duplication-restriction information, and when the request apparatus is an out-group apparatus, the delivery apparatus adds "1" to the out-group apparatus remaining number in the duplication-restriction information.

When there is a notification from time management unit 2205 (S2404=YES), the request apparatus deletes the content corresponding to the usage period information (S2405).

4.3.6 Duplication Reservation Processing

Figure 48:
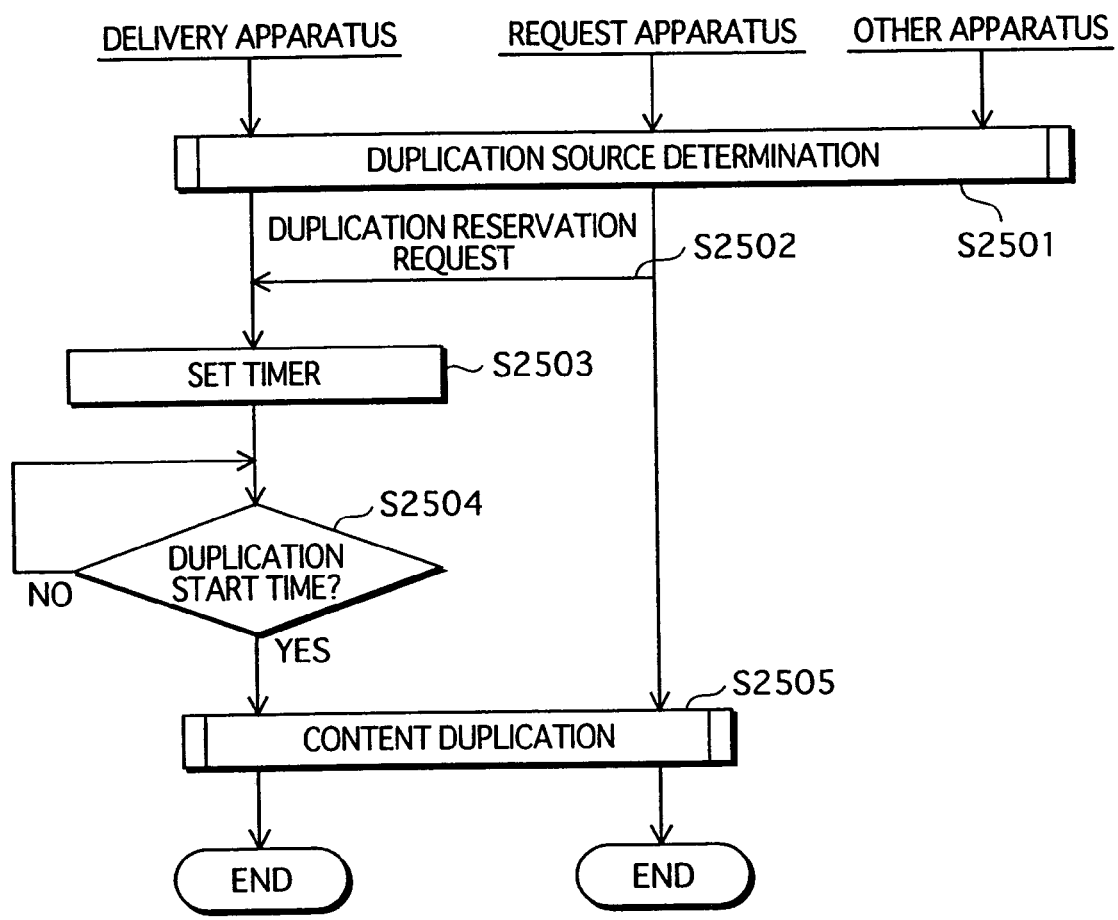
FIG. 48 is a flowchart showing duplication reservation processing.

FIG. 48 is a flowchart showing duplication reservation processing.

The delivery apparatus, the request apparatus, and the other apparatus conduct the duplication-source determination processing shown in FIG. 42 (S2501).

In the given example, the delivery apparatus, the request apparatus, and the other apparatus are home server 2001, playback apparatus 2002, and playback apparatus 2003, respectively.

Also, the request apparatus selects the delivery apparatus as the duplication source, as a result of the S2501 processing.

The delivery apparatus holds the confirmation information identifying the content targeted for duplication, acquired at step S2501.

The request apparatus transmits a duplication reservation request to the delivery apparatus that includes a duplication start time at which to actually start the duplication (S2502).

The delivery apparatus receives the duplication reservation request, and timer-sets time management unit 2105 to detect when the duplication start time is reached (S2503).

The delivery apparatus detects, in time management unit 2105, the duplication start time being reached (S2504).

The request apparatus and the delivery apparatus execute the processing from step S2203 in FIG. 45 (S2505).

4.3.7 Return Processing

After conducting content duplication from the delivery apparatus to the request apparatus, deletion of the content in the request apparatus and adding "1" to both the remaining number corresponding to the deleted content and the duplicable number of the content in the delivery apparatus is referred to as "return processing".

Figure 49:
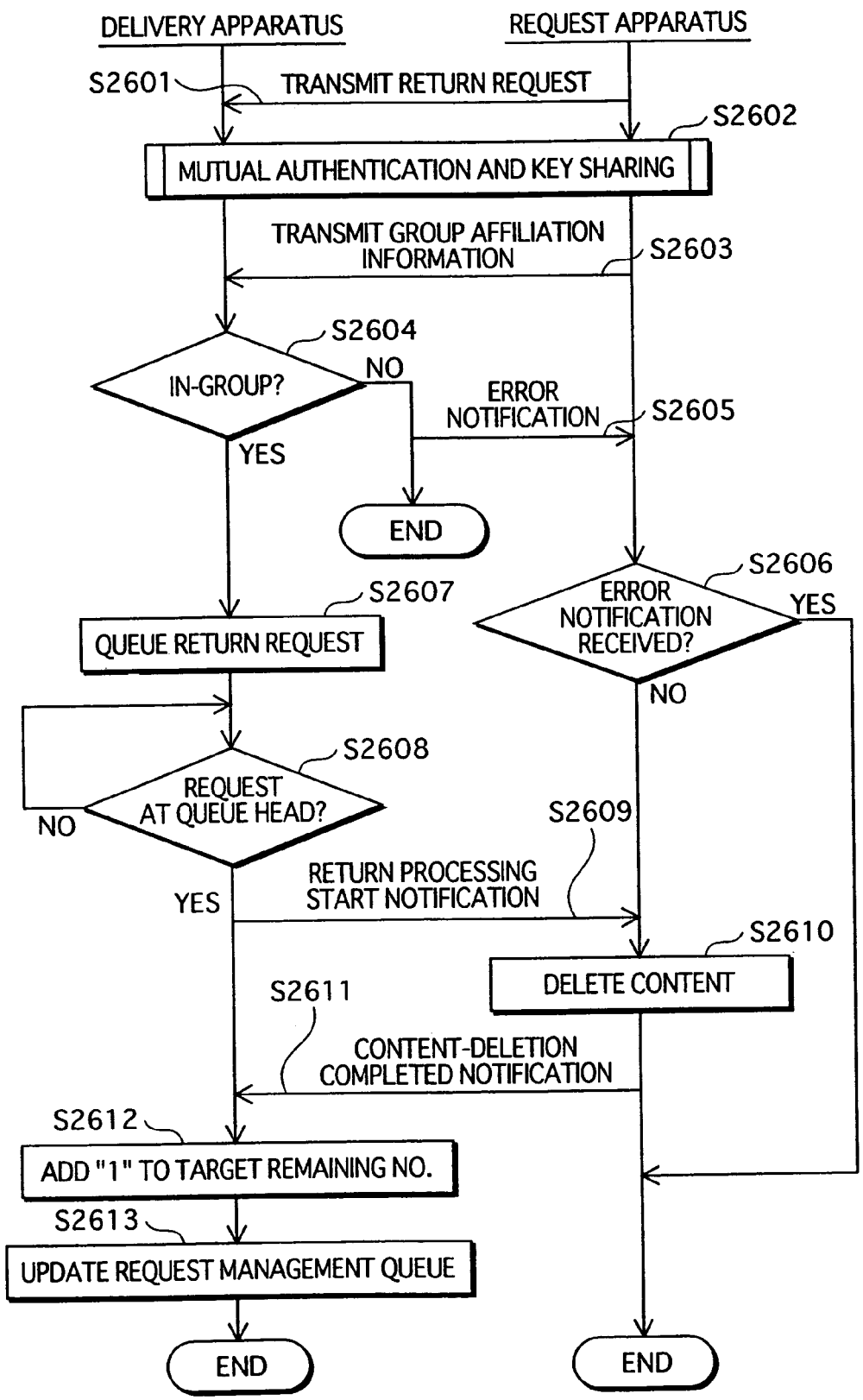
FIG. 49 is a flowchart showing return processing.

FIG. 49 is a flowchart showing return processing.

In the given example, the request apparatus and the delivery apparatus are playback apparatus 2002 and home server 2001, respectively.

Also, the delivery apparatus duplicates a content to the request apparatus.

The request apparatus transmits a return request to the delivery apparatus that includes confirmation information identifying the content for return (S2601).

The delivery apparatus holds the received return request.

The request apparatus and the delivery apparatus execute the mutual authentication and key sharing shown in FIGS. 43 and 44 (S2602).

The request apparatus shares session keys with the delivery apparatus as a result of the S2602 processing.

The request apparatus transmits group affiliation information to the delivery apparatus (S2603).

The delivery apparatus investigates whether the received group affiliation information matches group affiliation information held by the delivery apparatus, and judges the request apparatus to be in-group when matched and to be out-group when not matched (S2604).

When judged that the request apparatus is out-group (S2604=NO), the delivery apparatus transmits an error notification to the request apparatus (S2605), and ends the processing.

When an error notification is received (S2606=YES), the request apparatus ends the processing.

When judged that the request apparatus is in-group (S2604=YES), the delivery apparatus converts a format of the return request, and queues the converted return request in the request management queue as request management information (S2607).

The delivery apparatus detects when the request management information relating to the return request is at the head of the request management queue (S2608).

When detected that the return request is at the head of the request management queue (S2608=YES), the delivery apparatus transmits a return processing start notification to the request apparatus that includes the confirmation information (S2609).

Having received the return processing start notification, the request apparatus deletes the content identified by the confirmation information included in the received notification (S2610).

The request apparatus transmits a deletion-completed notification to the delivery apparatus that includes the confirmation information (S2611).

The delivery apparatus adds "1" to the target remaining number corresponding to the deleted content (S2612).

The delivery apparatus deletes the return request from the head of the request management queue to updates the request management queue (S2613).

4.4 Variations (1) Although the above AD server-related variation was described in terms of a recording medium being connected to a home server via an apparatus, a medium insertion opening may be provided in the home server, and mutual authentication, content duplication and the like conducted when the home server is connected to the recording medium inserted in the insertion opening.

While direct connection between the recording medium and the home server is different to connection via a playback apparatus and a network, differences do not arise in the methods of mutual authentication, content duplication and the like.

(2) In order to determine a content distribution source, CDS determining unit 2206 need not use ICMP echo response and rely messages.

CDS determining unit 2206 may prestore an information processing capability of each apparatus, and determine the apparatus having the highest information processing capability from among those apparatuses responding to a broadcast to be the distribution source.

Also, CDS determining unit 2206 may preset a priority level for each apparatus, and select the apparatus having the highest priority level from among those apparatuses responding to a broadcast to be the distribution source.

(3) Although the above was described in terms of the duplication-restriction information including usage period information, content duplication restrictions may be added using other information.

For example, a duplication-restriction information (DRI) management unit may hold area restriction information.

Area restriction information is information showing an area in which it is permissible to duplicate a content.

Here, the area restriction information can take, for example, a value of "1" showing Japan, a value of "2" showing the United States, and a value of "3" showing Germany.

When a value of the area restriction information is "1", content duplication is restricted to only apparatus within Japan.

Also, a DRI management unit may hold a revocation list.

The revocation list is a list apparatuses to which content duplication permission is not given.

DRI management unit 2102 does not give permission for content duplication to apparatuses shown in the revocation list.

Also, a DRI management unit may hold duplication generation information.

Duplication generation information shows how many times a content can be duplicated.

For example, with a content having duplication generation information that shows "2", duplication is permitted up to a second-generation copy.

(4) The content duplication management system may collaborate with an accounting system.

In this case, the present system transmits an accounting request to the accounting system when judged to give content duplication permission to an out-group apparatus.

A user of the content and an accounting amount are included in the accounting request.

The accounting system enters into a contract with the content user in advance, when accounting arises, the accounting system enters into a contract for reimbursement or the like using a credit card, for example.

When reimbursement processing is performed smoothly, the accounting system notifies a server of completion of the reimbursement processing.

On receiving the reimbursement-processing completed notification, the server conducts content duplication after giving content duplication permission to the request apparatus.

Also, accounting may also be conducted every time content duplication is conducted, even within a homework network.

(5) Although the above was described in terms of playback apparatus 2002 receiving transfer of rights permitting content duplication from home server 2001, playback apparatus 2002 may operate as a backup device when home server 2001 is unable to operate.

(6) The above was described in terms of in-group and out-group apparatus/medium remaining numbers being managed as duplication-restriction information. However, for management purposes, a total of the in-group apparatus remaining number and the in-group medium remaining number may be managed as an "in-group remaining number", and a total of the out-group apparatus remaining number and the out-group medium remaining number may be managed as an "out-group remaining number", without distinguishing between apparatuses and recording mediums.

(7) Although the above was described in terms of a home server acquiring duplication-restriction information via a network as compared with a broadcast, the acquisition route is not limited to a network.

A broadcast station may transmit duplication-restriction information by a broadcast, and a home server may acquire the duplication-restriction information by receiving the broadcast.

(8) Although the above was described in terms of a request apparatus broadcast transmitting a confirmation request over a network as part of the duplication-source determination processing, other means apart from a broadcast may be used.

For example, when candidates for being the distribution-source apparatus are predetermined, the request apparatus may multicast transmits the confirmation request.

(9) The above was described in terms of a DRI management unit conducting processing on request management information at the head of the request management queue. However, when the remaining number (i.e., one of the in-group and out-group apparatus/medium remaining numbers) relating to request management information included at the head of the queue is "0" and processing shown by the processing classification cannot be executed, the request management information that is included in a position other than the head of the queue, and whose processing classification shows "delete" may be processed first.

Since "1" is added to the remaining number as a result of processing being conducted that prioritizes the request management information whose processing classification shows "delete", a DRI management unit is able to conduct processing related to request management information included at the head of the queue.

5. Further Variations

While the present invention has been described above based on the above embodiment, the present invention is of course not limited to this embodiment. Variations such as those described below are also included in the present invention.

(1) Although in the above embodiment, CSI is copied using IC card 400 at a time of registering a device not connected to AD server 100, CSI may be transferred from client device to client device directly without using IC card 400.

The transfer of CSI from playback apparatus 200 to a playback apparatus 200n, and the registration of playback apparatus 200n as a device within the authorized domain managed by AD server 100 will now be described as an example.

Playback apparatus 200 and playback apparatus 200n are connected, and playback apparatus 200n is operated to transmit a transfer request to playback apparatus 200. Playback apparatus 200 and playback apparatus 200n establish a SAC and generate session key SK. Playback apparatus 200 encrypts CSI with the session key SK and transmits the encrypted CSI to playback apparatus 200n. Playback apparatus 200n decrypts the encrypted CSI using the session key, stores the CSI, and stores the ID of playback apparatus 200, which is the transfer source, received at a time of establishing the SAC. Also, playback apparatus 200n transmits a receipt notification to playback apparatus 200. Playback apparatus 200, on receipt of the receipt notification, deletes the CSI in CSI storage unit 208 and stores "0" in CSI storage unit 208.

Playback apparatus 200n when connected to AD server 100 and when a SAC is established, notifies AD server 100 of the CSI transfer, transmits the ID of the transfer source key and the ID of playback apparatus 200n to AD server 100, and AD server 100 rewrites DEVICE ID in the registration information.

(2) Although in the above embodiment, IC card 400 is affiliated with AD server 100, IC card 400 need not be affiliated.

In this case, as with other client devices, IC card 400 establishes a SAC when connected to AD server 100, registers ID_4 as a device ID, and acquires CSI.

AD server 100, at a time of recording a content key onto DVD 500, encrypts the content key using an encryption key generated by concatenating ID_4 of IC card 400 and CSI.

On-vehicle device 300, when DVD 500 is mounted therein and when IC card 400 is connected, establishes a SAC with IC card 400 and shares session key SK.

IC card 400 concatenates ID_4 and CSI stored in IC card 400 to generate a decryption key, encrypts the decryption key using session key SK to generate an encrypted decryption key, and transmits the encrypted decryption key to on-vehicle device 300.

On-vehicle device 300 decrypts the encrypted decryption key using session key SK to obtain a decryption key, decrypts the encrypted content key read from DVD 500 using the decryption key to obtain a content key, decrypts an encrypted content using the content key to obtain a content, and plays the content.

Also, the same processing as in (1) above to transfer CSI between client devices may be conducted to transfer CSI from an IC card to on-vehicle device 300. In this case, an IC card not affiliated with AD server 100 may, as with IC card 400 in embodiment 1, be provided with the function of notifying AD server 100 of a transfer. In this case, an IC card that transfers CSI to on-vehicle device 300 prohibits the transfer of CSI without immediately deleting the CSI, and deletes the CSI after notifying AD server 100 of the transfer.

(3) When registering a device not connected to AD server 100 using IC card 400, a permission right or CSI may be transmitted from AD server 100 to IC card 400 via a network.

As one example, when IC card 400 is connected to a client device such as a PC or the like that is connected to a network and has a communication function, IC card 400 conducts SAC establishment processing and receives a permission right or CSI using the communication function of the PC.

The client device having the communication function is not limited to being a PC, and may be a personal digital assistant (PDA), a mobile telephone or the like.

(4) In the above embodiment, contents are either delivered from AD server 100 to a client device or recorded onto a DVD and distributed from AD server 100 to a client device. However, a SAC may be established between client devices and session key SK generated, and contents delivered from one client device to another client device.

(5) In the above embodiment, on-vehicle device 300 is registered using IC card 400. However, withdrawal processing may be conducted in the same way using IC card 400.

In this case, on-vehicle device 300, which has IC card 400 connected thereto, is operated to transmit a withdrawal request to IC card 400, and IC card 400 establishes a SAC to confirm that on-vehicle device 300 is registered, and transmits a deletion notification to on-vehicle device 300. On-vehicle device 300 deletes the CSI, and transmits a deletion-completed notification to IC card 400. IC card 400, on receipt of the deletion-completed notification, stores the ID of the withdrawn on-vehicle device 300. IC card 400, when connected to AD server 100, notifies AD server 100 that on-vehicle device 300 has withdrawn and of the ID of on-vehicle device 300. AD server 100 deletes the ID of on-vehicle device 300 from DEVICE ID in the registration information, subtracts "1" from the registered number, and adds "1" to the remaining number.

(6) In the above embodiment, AD server 100 confirms whether a target device is registered or unregistered by a value of CSI stored by the target device, using signature verification at a time of establishing a SAC. However, AD server 100 may confirm that a target device is registered or unregistered by receiving an ID from the device to be authenticated, and judging whether the received ID is stored in DEVICE ID in the registration information. Also, all of the client devices registered as devices within the authorized domain of AD server 100 may store the registered IDs, and confirm whether other client devices are registered or unregistered by using the IDs in the same way as described above.

(7) In the above embodiment, IC card 400 is used at a time of registering a device that is not connected to AD server 100. However, AD server 100 may display CSI on display unit 114, and a user may manually input the CSI into a client device. In this case, a code to be inputted may be a value obtained by encrypting CSI, depending on the device, the session, and so forth.

(8) In the above embodiment, at a time of establishing a SAC and encrypting and transmitting CSI, signature data of the device transmitting the encrypted CSI may be appended to the ciphertext.

(9) In the above embodiment, registration information and CSI is stored internally in respective devices. However, registration information and CSI may be stored in a removable memory area that cannot be read, written or copied without permission.

(10) In the above embodiment, the ID of a device and CSI or a random number and CSI are concatenated for use as an encryption key at a time of encrypting a content, and as a decryption key at a time of decrypting the encrypted content key. However, the present invention is not limited to this, and an operation may be conducted using the ID of a device and CSI or a random number and CSI, and the resulting value used.

(11) Although in the above embodiment, a maximum number, a registered number and a remaining number are managed as registration information, the present invention is not limited to this.

The maximum number may be set as the initial value of the remaining number and "1" subtracted from the remaining number every time a device is registered, and a client device may be registered if the remaining number is not "0". Also, the maximum number and the registered number may be managed, and a client device registered if the registered number is less than the maximum number.

(12) The maximum number, the registered number, and the like may be managed after dividing the number of devices in the registration information into devices connected online to AD server 100 and devices registered using IC card 400.

(13) Although in the above embodiment, AD server 100 conducts management based on stored registration information, a separate management authority may be provided and structured as in (a) to (c) below.

(a) The management authority sets the maximum number of registerable devices, appends signature data of the management authority to the maximum number, and either records the maximum number onto a portable recording medium such as a DVD for distribution or distributes the maximum number via a communication channel. AD server 100 verifies the signature data, and if verification is successful, stores the maximum number as MAXIMUM in the registration information.

(b) AD server 100 requests the management authority for the number of devices that AD server 100 seeks to register. The management authority conducts accounting in response to the number of devices, and if the accounting is successful, transmits information to AD server 100 permitting registration of the requested number of devices, and AD server 100, on receipt of the information, accepts the registration of client devices within the permitted number.

(c) AD server 100 sends out a request to the management authority every time a registration is received from a client device, and the management authority conducts accounting in response to the request, and permits the registration if the accounting is successful. AD server 100, when registration is permitted, registers the client device and transmits CSI to the client device.

(14) In the above embodiment, playback apparatus 200 plays contents delivered from AD server 100. However, playback apparatus 200 may have a DVD playback function, and play contents recorded onto DVD 500 by AD server 100.

Also, in the above embodiment, AD server 100 joins each of the device IDs stored in the registration information with CSI and uses the result in the encryption of content keys. However, AD server 100 may prestore the ID of devices having a DVD playback function, extract the ID of the devices capable of playing DVD, and concatenate each of these IDs with CSI for use in the encryption of content keys.

(15) Although in the above embodiment, AD server 100 records contents onto a DVD, contents may be recorded onto a memory card, an MD, an MO, a CD, a BD (blu-ray disk) or the like, or onto an IC card.

Also, apart from a playback apparatus, a client device may be a recording device or a combination of a playback apparatus and a recording device. Also, a client device may, apart from being installed in a user's home or mounted in a vehicle, be a portable device capable of being carried by a user.

(16) IC card 400, because of being connected directly to AD server 100 or on-vehicle device 300, need not conduct SAC establishment processing.

(17) In the above embodiment, signature data, at a time of establishing a SAC, is generated with respect to data in which CSI is concatenated to random numbers Cha_B or Cha_A. However, a hash value of data that is to be a signature target may be calculated, and signature data may be generated with respect to this hash value.

(18) In the above embodiment, at a time of establishing a SAC, CSI is used when judging whether a device targeted for authentication is registered or unregistered and when sharing keys. However, CSI need only be used in one of these cases.

Also, although in the above embodiment, authentication is conducted in both directions (i.e., mutually), authentication may be only unidirectional.

(19) Registration of client devices may be restricted by time.

In this case, the time between AD server 100 and a client device is synchronized. AD server 100 sets a time period within which use of CSI is permitted as valid period information, transmits the valid period information and CSI to the client device, and add "1" to the registered number.

The client device receives and stores the valid period information and the CSI. When the period shown by the valid period information ends, the client device deletes the CSI.

AD server 100, once the period shown by the valid period information has ended, subtracts "1" from the registered number. If storing the device ID, AD server 100 deletes the ID of the device whose valid period has expired.

Moreover, the usage period information may show a date-time of the start/end of a usage period, or only the end date-time. Also, the usage period information may be information that sets restrictions on a period from the start of CSI usage, or may set restrictions on a period of operations by a client device using the CSI.

(20) Although there is a single AD server per authorized domain in the above embodiment, there may be a plurality of AD servers in a single authorized domain.

In this case, a client device is able to select which of the AD servers to communicate with. As a selection method, a user may make a setting, or a client device may select the AD server closest in the authorized domain to the client device in terms of distance. Also, a client device may select the AD server having the highest processing capacity or a low number of other tasks.

Also, as described below, an AD server requested for registration by a client device may, when unable to register the client device and the like, search for another AD server that is able to register the client device.

Specifically, the client device transmits a registration request to an AD server. When the registered number in the requested AD server matches the maximum number, the requested AD server makes inquires with another AD server as to whether the other AD server can register the client device. The other AD server, when able to register the client device, registers the client device that requested registration and notifies the requested AD server that registration is possible, and the requested AD server, on receipt of the notification, transmits CSI to the client device.

Also, if the other AD server replies that registration of the client device is not possible, the AD server makes inquiries with yet another AD server.

Also, one AD server may be selected to represent a plurality of AD servers, and the representative server may manage all of the in-group devices. In this case, when an AD server other than the representative server receives a registration request from a client device, the AD server inquires as to whether the client device is registerable in the representative server, and if registerable, the client device is registered in the representative server, and receives CSI from the representative server via the AD server that received the request.

Moreover, if the representative server is currently conducting other operations, or the like, the AD server may inquire with the other AD servers as to whether any of these other AD servers are able to register the client device.

Also, as shown in (a) and (b) below, since a registered number of devices are managed among a plurality of AD servers, the AD servers may share a list relating to registered devices.

(a) When AD servers R and S within the same authorized domain each register client devices, the ID of registered devices are stored as a device list. Also, whenever a list is updated by writing in IDs, the IDs are stored in the device list in correspondence with a version number.

AD servers R and S exchanges device lists regularly or irregularly. AD server R compares the version number of the device list stored therein with the version number of the device list stored by AD server S, and stores the device list having the latest version number. AD server S conducts the same processing. In this way, it is possible for AD servers to always share the latest device list.

Moreover, device lists may be exchanged every time the device list of one of the AD servers is updated. Also, registration information such as registered numbers and maximum numbers may be shared in the same way as above.

(b) AD servers T and U within the same authorized domain hold device lists T and U, respectively, and at a time of registering a client device, store the device IDs of the client devices in correspondence with a registration time. AD servers T and U exchange device lists regularly or irregularly.

AD server T, if the registered number stored therein as registration information is less than the maximum number, writes client devices newly registered in device list U received from AD server U into device list T stored therein, in the order of registration. Also, AD server U, in the same way, receives device list T, and updates device list U in the order in which new client devices were registered.

Moreover, client devices may be provided in advance with a priority level, and priority can be given to the registration of devices having a high priority level. Also, when the combined number of client devices newly registered in AD servers T and U exceeds the maximum number, priority may be given to the registration of devices having a high priority level, or a user may selected devices to be registered.

According to this method, even if the requested AD server is in a power-OFF state, a client device can be registered in another AD server, and consistency maintained by exchanging device lists when the other server is updated, thus making it possible for AD servers to share the same device list.

(21) In order to avoid duplication of CSI among different authorized domains, information exchange may be conducted between AD servers managing the different authorized domains, and confirmation made as to whether or not there is duplication.

Also, in order to improve safety, the AD servers may input respective CSI into a hash function to calculate a hash value, and exchange the hash values to confirm whether or not there is duplication.

Also, instead of AD servers generating CSI, a management authority may be provided, and the management authority may generate the CSI of all of the authorized domains so as to avoid duplication, and send respective CSI to the AD servers in a safe manner.

(22) Client devices may belong to a plurality of authorized domains.

The number of authorized domains in which a client device can register may be restricted by restricting the number of pieces of CSI that the client device is able to store. Also, the present invention may be structured such that the number of authorized domains in which a client device can register is restricted by AD servers exchanging list information that shows registered client devices. Also, exchanging list information makes it is possible to confirm the number of authorized domains to which client devices belong.

Otherwise, a management authority may be provided for managing the number of authorized domains in which a client device registers.

Also, a single AD server may manage a plurality of authorized domains. In this case, the number of pieces of different CSI that an AD server can store is restricted, and the AD server can manage authorized domains within this number. Also, the AD server may store the registerable number of client devices per piece of CSI, or may store pieces of CSI in correspondence with group IDs.

(23) Authorized domains may each be allotted an identifier, and at a time of delivering a content, the device delivering the content may embed the identifier of the authorized domain in which the device is registered in the content as an electronic watermark.

In this way, it is possible to specify which authorized domain the content issued from, in the event of a content decrypted by a client device being improperly distributed outside of the authorized domain within which it originated. Furthermore, when a server that delivered the content manages the ID of client devices registered in various authorized domains, the ID of the client device that issued the content may be included in the CRL.

(24) Although in the above embodiment, contents are delivered to a device after successfully authenticating the device, the present invention is not limited to this.

Authentication need not be conducted at a time of content delivery in the following cases.

A device on the content transmission end generates an encryption key based on CSI, encrypts a content key using the generated encryption key, and transmits the encrypted content key and an encrypted content that was encrypted using the content key.

A device on the receiving end, upon acquiring the encrypted content and encrypted content key, generates based on the CSI, a decryption key the same as the encryption key, decrypts the encrypted content key using the decryption key to obtain a content key, and decrypts the encrypted content using the content key to obtain a content.

In this way, only a device that holds the CSI can generate the decryption key and decrypt the encrypted content.

Also, when an encrypted content is delivered first without authentication being conducted, and then authentication, as in the above embodiment, is conducted later to share a session key, and authentication is successful, the content key may be encrypted using the session key and delivered.

Moreover, the delivery of an encrypted content may be conducted by communication, or by recording the encrypted content onto a portable recording medium.

Also, even when there is no content delivery request or the like from a device on the receiving end, a device on the transmitting end may judge to conduct content delivery or the like, or may conduct content delivery or the like in accordance with an input from outside.

(25) In the above embodiment, a CSI storage unit stores "0" as an initial value, and on receipt of CSI generated by AD server 100, overwrites the initial value with the acquired CSI. However, the initial value and the CSI may be stored in separate areas. Also, when the acquired CSI is stored in a separate area to the initial value, the initial value may be deactivated.

Moreover, the deactivated initial value may be reactivated at a time of deleting CSI due to a transfer, withdrawal, or the like.

Moreover, although the above was described in terms of "0" being stored as a value showing "unregistered", this value need not be "0", and may be any value that differs from the value generated as CSI.

(26) Although in the above embodiment, AD server 100 permits IC card 400 to copy CSI one time, AD server 100 may permit a plurality of copies.

Also, IC card 400 may prevent CSI from being copied to the same client device more than once by, in addition to authenticating client devices using the CSI, storing the ID of client devices to which the CSI has been copied, and confirming the ID of client devices at a time of copying.

Also, an IC card may be implemented with the function of registering client devices, and a device connected to the IC card may operate as an AD server.

Figure 50:
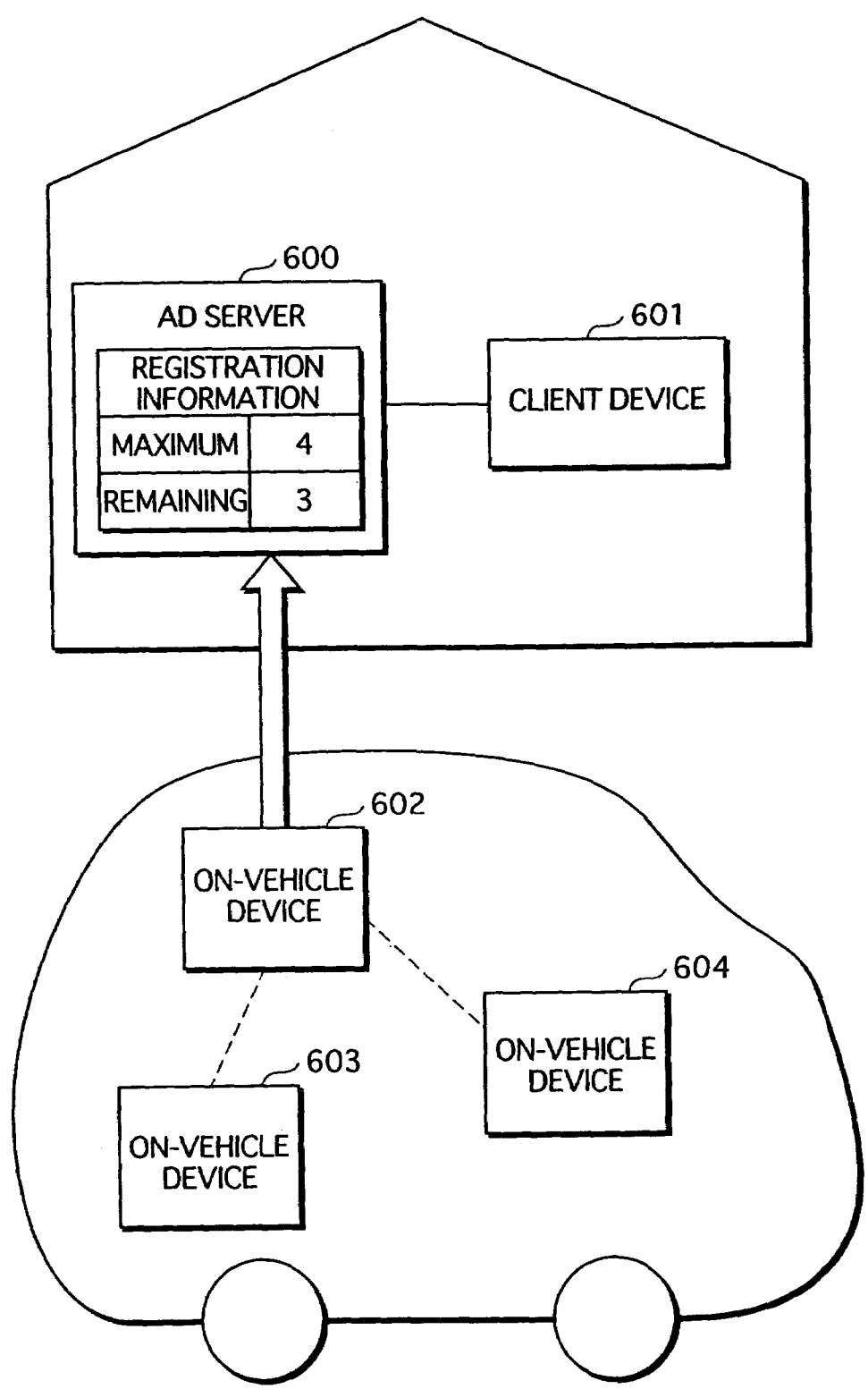
FIG. 50 is a block diagram showing a structure in which a representative device representing a plurality of client devices registers in an AD server 600.

Also, a client device may be registered in an AD server as representing a plurality of client devices, and receive the right to copy CSI to the plurality of client devices. An example of this is shown using FIG. 50.

An AD server 600 and a client device 601 are disposed in the home of a user, and client device 601 is already registered in AD server 600. AD server 600 stores a maximum number and a remaining number as registration information, the maximum number and remaining number in the given example being 4 and 3, respectively.

On-vehicle devices 602, 603 and 604, which are not registered in AD server 600, are mounted in a vehicle owned by the user. On-vehicle devices 603 and 604 do not function to communicate directly with AD server 600. On-vehicle device 602 is portable and does function to communicate directly with AD server 600. Also, on-vehicle devices 602, 603 and 604 are connected to and can communicate with each another.

On-vehicle device 602, when connected to AD server 600 as a representative on-vehicle device, transmits a registration request to AD server 600 that includes a desired number "3", which is the number of client devices on-vehicle device 602 seeks to register.

AD server 600, on receipt of the registration request, authenticates on-vehicle device 602 and shares a session key, the same as in the above embodiment. If authentication is successful, AD server 600 judges whether the desired number in the registration request is less than or equal to the remaining number stored as registration information. If judged to be less than or equal to the remaining number, AD server 600 reads the stored CSI, encrypts the read CSI and permission right permitting the registration of three devices, using the session key, and transmits the encrypted CSI and the encrypted permission right to on-vehicle device 602 as encrypted rights information.

On-vehicle device 602, on receipt of the encrypted rights information, decrypts the encrypted CSI and permission right using the session key to obtain CSI and a permission right. Also, because 1-device worth of the permission right is used in storing the obtained CSI, the permission right stored shows two devices to be registerable. Also, on-vehicle device 602 conducts authentication with on-vehicle devices 603 and 604, and if successful, transmits the CSI to on-vehicle devices 603 and 604 and reduces the number of registerable devices shown in the permission right.

In this way, on-vehicle devices 603 and 604 can be registered as client devices.

Moreover, if the remaining number is less than the desired number, AD server 600 transmits a permission right permitting the registration of devices equal to the remaining number. As an example, when a permission right permitting the registration of two devices is transmitted, on-vehicle device 602 uses the permission right for 1 device in storing the obtained CSI, and uses the remaining permission right for 1 device by transmitting the CSI to one of on-vehicle devices 603 and 604. The device to which the CSI is transmitted may be selected by the user, or each device may have a priority level, and the CSI transmitted to the device having the higher priority level.

Also, at a time of registering on-vehicle devices 602, 603 and 604 in AD server 600, the following processing is conducted when registering an ID of each on-vehicle device in AD server 600.

On-vehicle device 602, before registering, acquires the IDs of on-vehicle devices 603 and 604. On-vehicle device 602, at a time of registering, transmits the acquired IDs and the ID of on-vehicle device 602 to AD server 600. AD server 600 stores the received IDs as device IDs. Also, if the remaining number is less than the desired number, AD server 600 stores, from the received IDs, IDs for how ever many devices is shown by the remaining number. In this case, the user may select which IDs to register, or each ID may have a priority level, and IDs stored in a descending order of priority.

Also, when there is an excess of a permission right, it is possible for on-vehicle device 602 to return the excess to AD server 600.

Moreover, although on-vehicle device 602 is described above as acquiring a permission right that includes the right of on-vehicle device 602, on-vehicle device 602 may register with AD server 600 as described in the above embodiment, and then acquire the right to notify CSI to on-vehicle devices 603 and 604.

(27) A plurality of authorized domains may be combined to form a single authorized domain.

Figure 51:
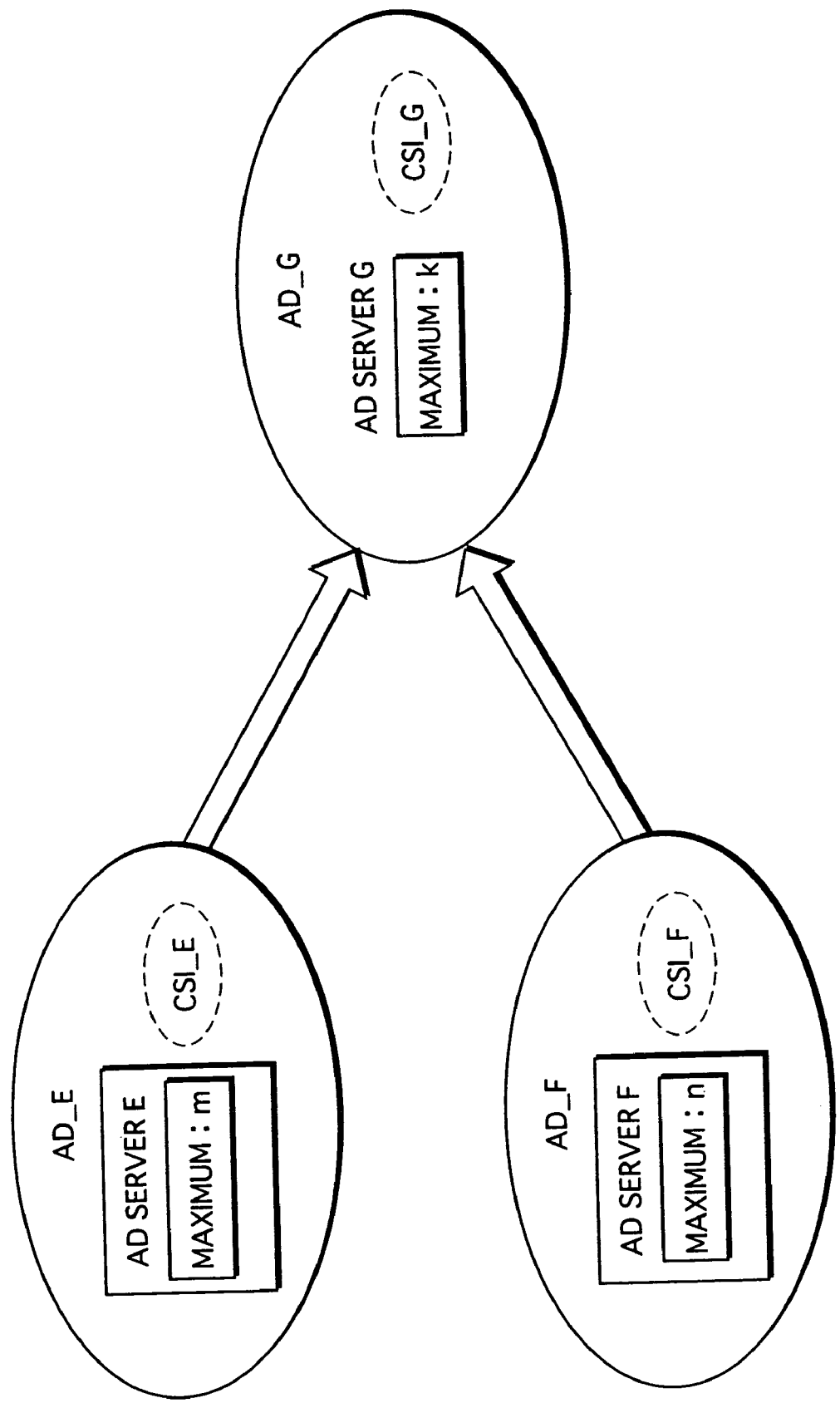
FIG. 51 shows conceptually the formation of a single group from a plurality of groups.

As an example, the combining of AD_E and AD_F to form AD_G is described below using FIG. 51.

AD_E and AD_F are each structured from a single AD server and a plurality of client devices (not depicted). A maximum of "m" number of client devices is registerable in an AD server E in AD_E, and devices registered in AD_E each hold CSI_E. Also, a maximum of "n" number of client devices is registerable in an AD server F in AD_F, and devices registered in AD_F each hold CSI_F.

AD_G is formed from these two authorized domains. First, a device to be AD server G managing AD_G is determined from out of AD servers E and F. At this time, the device to be AD server G may be determined based on processing capacity, priority levels and the like, or may be determined by a user. The AD server that is not AD server G is registered in AD_G as a client device.

A maximum of "k" number of devices registerable in AD server G is set as "m", "n" or the mean of "m" and "n". Also, AD server G newly generates CSI_G, authenticates each of the client devices, and transmits CSI_G to devices that are successfully authenticated.

If the aggregate number of devices forming AD_E and AD_F exceeds the maximum "k", devices for registration are selected. In this case, AD server G may make the selection based on predetermined priority levels, or the user may make the selection.

Moreover, apart from newly forming a single authorized domain from two existing authorized domains, one authorized domain may be added to the other authorized domain. When AD_F is added to AD_E, devices within AD_F are registered in AD server E as AD_E client devices, and hold CSI_E. In this case, if the number of client devices for registration exceeds maximum "m", devices for registration may be selected as described above.

Moreover, "m", "n" and "k" are positive integers.

(28) A single authorized domain may be divided into a plurality of authorized domains.

Figure 52:
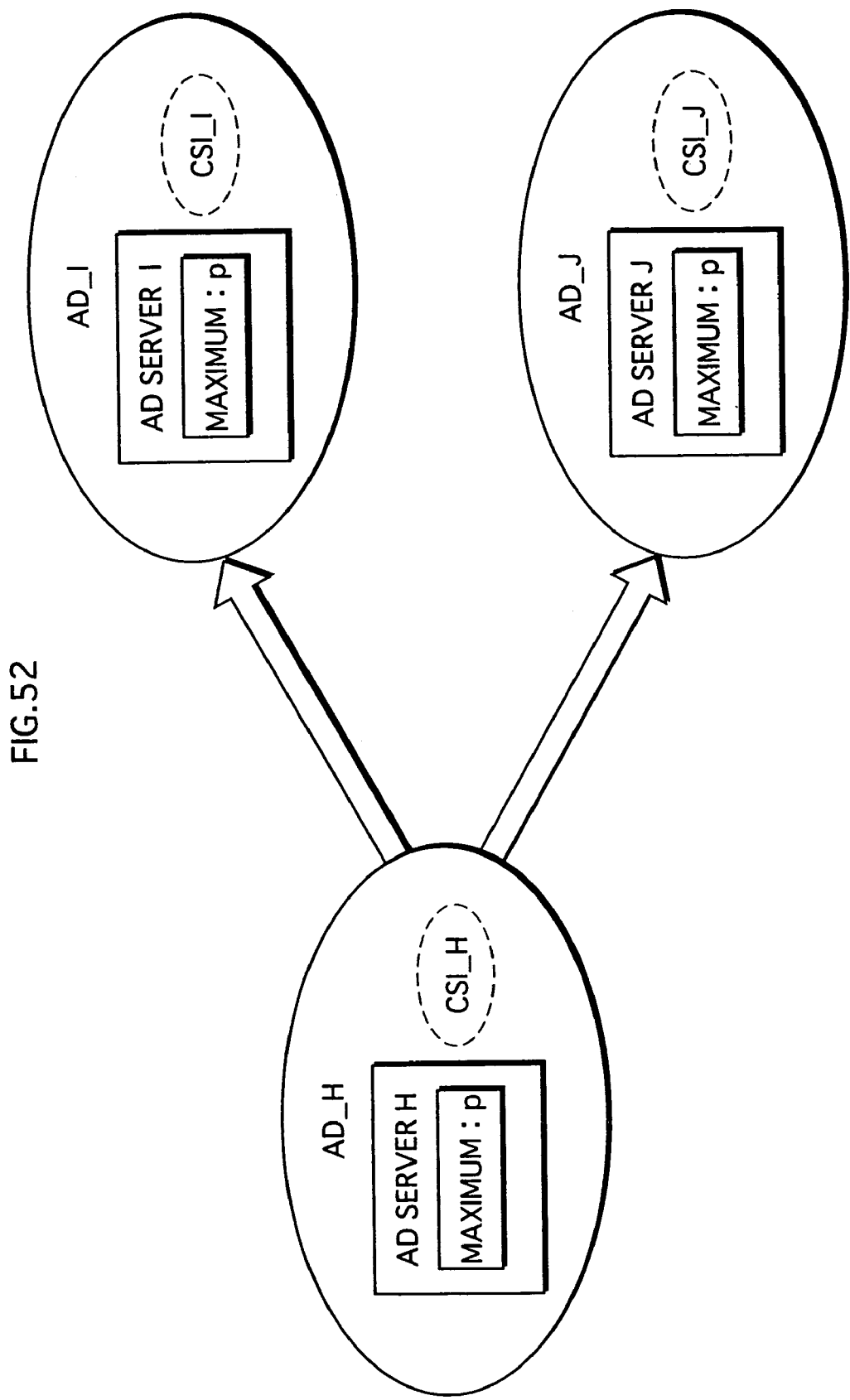
FIG. 52 shows conceptually the division of a single group to form a plurality of groups.

As an example, the forming of AD_I and AD_J from AD_H is described below using FIG. 52.

AD_H is structured from an AD server H and a plurality of client devices (not depicted).

AD server H is able to register "p" (positive integer) number of client devices, and devices registered in AD_H each store CSI_H.

AD server H, at a time of forming AD_I and AD_J, selects devices to be new AD servers I and J from client devices in AD_H. At this time, devices having a high processing capability may be selected as AD servers, or the selection may be made based on the predetermined priority levels of devices. Also, a user may make the selection, or the selection may be made among client devices based on processing capability, priority levels and the like. Moreover, AD server H may form a new authorized domain as AD server I or AD server J.

After the division, client devices to belong to each authorized domain are selected. At this time, AD servers I and J may make respective selections based on priority levels, or the user may make the selection.

AD servers I and J can each register a maximum of "p" number of client devices. Also, once the client devices of each authorized domain have been selected, AD server I generates CSI_I and transmits the generated CSI_I to selected client devices. Also, AD server J, in the same way, generates CSI_J and transmits the generated CSI_J to selected client devices.

Moreover, AD servers I and J may conduct authentication every time a client device is selected or at a time of transmitting newly generated CSI.

Also, apart from newly forming two authorized domains from a single authorized domain as described above, one new authorized domain may be formed from AD_H, and client devices divided between the original AD_H and the new authorized domain.

(29) When a client device cuts a power supply, the client device may remain registered in an AD server, and CSI temporality deleted.

In this case, once a client device is registered in an AD server, the AD server stores an ID of the client device, and transmits CSI.

The client device, having stored the received CSI, is able to use contents as a device within the authorized domain managed by the AD server. The client device, on receipt of a power-OFF instruction, deletes the CSI and sets power off. At this time, the ID of the client device stored in the AD server is not deleted.

When the power supply of the client device is again set "on", the client device transmits the ID to the AD server. The AD server judges whether an ID matching the received ID exists among IDs stored therein, and again transmits the CSI to the client device without updating the registration information if judged that a matching ID exists.

Moreover, the CSI may also be temporarily deleted in the event of cable or radio communication being interrupted, and when communication is reestablished, the ID may again be transmitted and the CSI again acquired.

(30) Although in the above embodiment, authentication is conducted using CSI, the following authentication processing (a) to (c) may be supplemented.

(a) Authenticate that a client device is connected to the same in-house LAN as an AD server, using a code uniformly provided by a system, or a MAC address, an IP address or the like. In this way, it becomes difficult to register the client device of another user/entity.

Also, when an AD server and a client device conduct radio communication, it may be authenticated that the client device is within range of the radio waves.

Also, when communication is possible between an AD server and a client device, authentication data may be transmitted from the AD server to the client device, and response data transmitted from the client device to the AD server. The AD server may clock the time period from transmission of the authentication data to reception of the response data, and if the clocked time is within a preset threshold, the client device may be authenticated as being located in-house.

Also, time-to-live (TTL) values may be set to be within the number of in-house routers, thus preventing the AD server from being able to communicate with out-house devices.

Also, it may be authenticated whether a client device is located in-house by judging whether the client device is connected to the same power source as the AD server.

(b) Preset a password in an AD server, and at a time of registering a client device, the user manually inputs a password into the client device. The client device transmits a registration request to the AD server that includes the inputted password, and the AD server judges whether the received password included in the registration request matches the preset password.

Also, a plurality of passwords may be set, an example of which is each member of a family setting their own password. Also, an ID identifying a user may be combined with a password.

(c) Instead of a password as in (b) above, biometric information such as fingerprints, the iris, and the like may be used. In this way, it becomes possible for only a preset user to register a client device.

(31) An initial value held by a client device may be applied as described in (a) to (c) below.

(a) A client device holds a single initial value showing "not registered in AD server". When the client device registers with the AD server, the initial value is deactivated.

(b) A client device holds a plurality of initial values corresponding one-to-one with a plurality of AD servers. At a time of registering with one of the AD servers, authentication is conducted using an initial value corresponding to the AD server, and if successful and the client device is registered, the corresponding initial value is deactivated. Likewise, if the client device registers in another of the AD servers, an initial value corresponding to the other AD server is deactivated.

Moreover, each initial value may be identified in correspondence with an identifier of a group.

(c) A client device holds a single initial value showing "not registered in any AD server". When the client device registers with an AD server, the initial value is deactivated.

(32) The present invention may be a method showing the above. Also, this method may be computer program realized by a computer, or a digital signal formed from the computer program.

Also, the present invention may be a flexible disk, a hard disk, a CD-ROM, an MO, a DVD, a DVD-ROM, a DVD-RAM, a BD (blu-ray disk), a semiconductor memory or similar computer-readable recording medium that stores the computer program or the digital signal. Also, the present invention may be the computer program or digital signal recorded onto such a recording medium.

Also, the present invention may be the computer program or the digital signal transmitted via a network or the like, representative examples of which include a telecommunication circuit, a radio or cable communication circuit, and the Internet.

Also, the present invention may be a computer system that includes a microprocessor and a memory, the memory storing the computer program and the microprocessor operating in accordance with the computer program.

Also, by transferring the computer program or the digital signal, either recorded on the recording medium or via a network or the like, the present invention may be implemented by another independent computer system.

(33) The present invention may be any combination of the above embodiment and variations.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A key delivery apparatus that manages a decryption key for decrypting an encrypted content and manages a suppliable number, which is a number indicating a number of times the decryption key can be supplied to a terminal apparatus connected to the key delivery apparatus via a network, the key delivery apparatus comprising:

a receiving unit configured to receive, from the terminal apparatus, a supply request, which is a request for the decryption key;

a supply determining unit configured to determine whether the terminal apparatus is a terminal apparatus of a first-type that manages a content-usage period, and whether the terminal apparatus is a terminal apparatus of a second-type that does not manage the content-usage period; and a key supply unit configured, when the suppliable number indicates that the decryption key can be supplied, to supply, to the terminal apparatus, (i) the decryption key and a key-usage period, which imposes a restriction on usage of content and is related to the decryption key, when the supply determining unit determines that the terminal apparatus is of the first-type, and (ii) the decryption key, without the key-usage period such that a restriction on usage of content is not imposed on the terminal apparatus, when the supply determining unit determines that the terminal apparatus is of the second-type, wherein the supply request includes one of first information and second information, the first information indicating that the encrypted content is stored in the terminal apparatus, and the second information indicating that the encrypted content is stored on a portable recording medium inserted into the terminal apparatus, the supply determining unit determines, based on the received supply request, whether the terminal apparatus records the encrypted content on the portable recording medium, and the supply determining unit determines that the terminal apparatus is of the first-type when the supply determining unit determines that the terminal apparatus records the encrypted content onto the portable recording medium.

2. The key delivery apparatus of claim 1, wherein:
the network is a home network connected to an external network;
content is received from outside the home network; and
the key delivery apparatus determines whether each terminal apparatus connected to the home network is a legitimate supply target.

3. The key delivery apparatus of claim 1, further comprising:
a key-information storage unit configured to store the key-usage period subsequent to the key supply unit supplying the decryption key and the key-usage period to the terminal apparatus of the first-type;
a period determining unit configured to determine whether the key-usage period has expired; and a time management unit configured to add "1" to the suppliable number when the period determining unit determines that the key-usage period has expired.

4. The key delivery apparatus of claim 3, further comprising:
a date-time storage unit configured to store at least one of a first group and a second group, the first group including (i) date-time information indicating the key-usage period and a supply date-time of the decryption key, and (ii) identification information indicating the supply target to be the terminal apparatus of the first-type, and the second group including (i) date-time information indicating the supply date-time of the decryption key, and (ii) identification information indicating the supply target to be the terminal apparatus of the second-type;
a date-time determining unit configured to determine whether a present date-time has reached the supply date-time; and
a date-time supply unit configured, when the data time determining unit determines that the present date-time has reached the supply date-time, to supply the decryption key and the key-usage period to the terminal apparatus of the first-type or supply the decryption key to the terminal apparatus of the second-type, based on the identification information.

5. The key delivery apparatus of claim 4, further comprising:
a search requesting unit configured to transmit, to the terminal apparatus of the first-type and the terminal apparatus of the second-type, search information identifying the decryption key; and
a proprietary information receiving unit configured to receive information indicating whether the decryption key is stored by the terminal apparatus of the first-type or the terminal apparatus of the second-type.

6. The key delivery apparatus of claim 5, wherein:
the key delivery apparatus stores secret information, which is information to be used as a reference when determining whether the terminal apparatus is the legitimate supply target;
the supply determining unit includes an authentication subunit configured to determine whether the terminal apparatus is storing the secret information; and
the supply determining unit determines that the terminal apparatus is the legitimate supply target when the supply determining unit determines that the terminal apparatus is storing the secret information.

7. The key delivery apparatus of claim 6, wherein:
the key supply unit includes a remaining number determining subunit configured to determine whether the suppliable number is greater than a predetermined reference number; and
the key supply unit determines that the suppliable number indicates that the decryption key can be supplied when the key supply unit determines that the suppliable number is greater than the predetermined reference number.

8. The key delivery apparatus of claim 7, wherein:
the key supply unit further includes an encryption subunit configured (i) to encrypt the decryption key and the key-usage period when the decryption key and the key-usage period are to be supplied to the terminal apparatus of the first-type, and (ii) to encrypt the decryption key when the decryption key is to be supplied to the terminal apparatus of the second-type; and
the key supply unit, when the key supply unit determines that the suppliable number indicates that the decryption key can be supplied, supplies to the terminal apparatus, (i) the encrypted decryption key and the encrypted key-usage period when it is determined that the terminal apparatus is of the first-type, and (ii) the encrypted decryption key when it is determined that the terminal apparatus is of the second-type.

9. The key delivery apparatus of claim 8, further comprising:
a historical information storage unit configured to store historical information indicating a connection date-time of the terminal apparatus of the first-type;
a connection determining unit configured to determine, using the connection date-time, whether the terminal apparatus of the first-type was connected to the network within a predetermined connection period; and
a connection management unit configured to add "1" to the suppliable number when it is determined that the terminal apparatus of the first-type was not connected to the network within the predetermined connection period.

10. The key delivery apparatus of claim 8, further comprising:
a frequency storage unit configured to store a usage frequency of the decryption key by the terminal apparatus of the first-type;
a frequency determining unit configured to determine whether the usage frequency has reached a predetermined reference frequency; and
a connection management unit configured to add "1" to the suppliable number when it is determined that the usage frequency has reached the predetermined reference frequency.

11. A portable recording medium that receives a supply of a decryption key, for decrypting an encrypted content, from a key delivery apparatus that manages the decryption key, the portable recording medium comprising:
a key reception unit configured to receive the decryption key and a key-usage period of the decryption key from the key delivery apparatus, when the key delivery apparatus determines that supplying the decryption key to the portable recording medium is possible;
a key-information storage unit configured to store the decryption key and the key-usage period;
a proprietary determining unit configured to receive, from the key delivery apparatus, search information identifying the decryption key, and configured to determine whether the decryption key is stored on the portable recording medium based on the search information; and
a proprietary notifying unit configured to transmit, to the key delivery apparatus, predetermined information indicating that the decryption key is stored on the portable recording medium, the predetermined information indicating that the decryption key is stored on the portable recording medium and being transmitted when the proprietary determining unit determines that the decryption key is stored on the portable recording medium.

12. A key delivery system comprising:
a key delivery apparatus that manages a decryption key for decrypting an encrypted content and manages a suppliable number, which is a number indicating a number of times the decryption key can be supplied to a terminal apparatus connected to the key delivery apparatus via a network;
a first-type terminal apparatus that manages a content-usage period; and
a second-type terminal apparatus that does not manage the content-usage period, wherein:
the key delivery apparatus includes:

a receiving unit configured to receive, from the terminal apparatus, a supply request, which is a request for the decryption key;

a supply determining unit configured to determine whether the terminal apparatus is a terminal apparatus of the first-type and whether the terminal apparatus is a terminal apparatus of the second-type; and a key supply unit configured, when the suppliable number indicates that the decryption key can be supplied, to supply, to the terminal apparatus, (i) the decryption key and a key-usage period which imposes a restriction on usage of content and is related to the decryption key, when the supply determining unit determines that the terminal apparatus is of the first-type, and (ii) the decryption key, without the key-usage period such that a restriction on usage of content is not imposed on the terminal apparatus, when the supply determining unit determines that the terminal apparatus is the second-type;

the supply determining unit determines that the terminal apparatus is of the first-type when the terminal apparatus records the encrypted content, the decryption key, and the key-usage period onto a portable recording medium;

the first-type terminal apparatus receives, from the key delivery apparatus, and stores the decryption key and the key-usage period; and the second-type terminal apparatus receives the decryption key from the key delivery apparatus, and uses the decryption key for content usage, wherein the supply request includes one of first information and second information, the first information indicating that the encrypted content is stored in the terminal apparatus, and the second information indicating that the encrypted content is stored on a portable recording medium inserted into the terminal apparatus, the supply determining unit determines, based on the received supply request, whether the terminal apparatus records the encrypted content on the portable recording medium, and the supply determining unit determines that the terminal apparatus is of the first-type when the supply determining unit determines that the terminal apparatus records the encrypted content on the portable recording medium.

13. A key supply method of using a key delivery apparatus that manages a decryption key for decrypting an encrypted content and manages a suppliable number, which is a number indicating a number of times the decryption key can be supplied to a terminal apparatus connected to the key delivery apparatus via a network, the key supply method comprising:

receiving, from the terminal apparatus, a supply request, which is a request for the decryption key, the supply request including one of first information and second information, the first information indicating that the encrypted content is stored in the terminal apparatus, and the second information indicating that the encrypted content is stored on a portable recording medium inserted into the terminal apparatus;

determining, based on the received supply request, whether the terminal apparatus records the encrypted content on the portable recording medium;

determining whether the terminal apparatus is a terminal apparatus of a first-type that manages a content-usage period and whether the terminal apparatus is a terminal apparatus of a second-type that does not manage the content-usage period; and supplying, to the terminal apparatus, when the suppliable number indicates that the decryption key can be supplied, (i) the decryption key and a key-usage period which imposes a restriction on usage of content and is related to the decryption key, when the determining determines that the terminal apparatus is of the first-type, and (ii) the decryption key, without the key-usage period such that a restriction on usage of content is not imposed on the terminal apparatus, when the determining determines that the terminal apparatus is of the second-type, wherein the determining of whether the terminal apparatus is a terminal apparatus of the first-type determines that the terminal apparatus is of the first-type when it is determined that the terminal apparatus records the encrypted content on the portable recording medium.

14. A computer-readable recording medium storing a key supply computer program used by a key delivery apparatus that manages a decryption key for decrypting an encrypted content and manages a suppliable number, which is a number indicating a number of times the decryption key can be supplied to a terminal apparatus connected to a key delivery apparatus via a network, the key supply computer program causing the key delivery apparatus to execute a method comprising:

receiving, from the terminal apparatus, a supply request which is a request for the decryption key, the supply request including one of first information and second information, the first information indicating that the encrypted content is stored in the terminal apparatus, and the second information indicating that the encrypted content is stored on a portable recording medium inserted into the terminal apparatus;

determining, based on the received supply request, whether the terminal apparatus records the encrypted content on the portable recording medium;

determining whether the terminal apparatus is a terminal apparatus of a first-type that manages a content-usage period and whether the terminal apparatus is a terminal apparatus of a second-type that does not manage the content-usage period; and supplying, to the terminal apparatus, when the suppliable number indicates that the decryption key can be supplied, (i) the decryption key and a key-usage period which imposes a restriction on usage of content and is related to the decryption key, when the determining determines that the terminal apparatus is of the first-type, and (ii) the decryption key, without the key-usage period such that a restriction on usage of content is not imposed on the terminal apparatus, when the determining determines that the terminal apparatus is of the second-type, wherein the determining of whether the terminal apparatus is a terminal apparatus of the first-type determines that the terminal apparatus is of the first-type when it is determined that the terminal apparatus records the encrypted content on the portable recording medium.

* * * * *